US 6,636,694 B1

(12) United States Patent
Misumi et al.

(10) Patent No.: US 6,636,694 B1
(45) Date of Patent: Oct. 21, 2003

(54) FACE IMAGE PHOTOGRAPHING APPARATUS AND FACE IMAGE PHOTOGRAPHING METHOD

(75) Inventors: Yoshinori Misumi, Tokyo (JP); Mikio Suga, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/254,867

(22) Filed: Sep. 26, 2002

Related U.S. Application Data

(62) Division of application No. 09/612,239, filed on Jul. 7, 2000, now Pat. No. 6,483,993.

(30) Foreign Application Priority Data

| Sep. 14, 1999 | (JP) | 11-260705 |
| Nov. 26, 1999 | (JP) | 11-336609 |
| Nov. 26, 1999 | (JP) | 11-336610 |
| Nov. 26, 1999 | (JP) | 11-336611 |
| Jun. 28, 2000 | (JP) | 2000-194740 |

(51) Int. Cl.[7] .............................................. G03B 15/00
(52) U.S. Cl. ...................................... 396/1; 348/207.11
(58) Field of Search ......................... 396/1, 2, 51, 18, 396/263; 348/78, 207.11

(56) References Cited

U.S. PATENT DOCUMENTS

| 4,299,464 A | * 11/1981 | Cushman ..................... 396/157 |
| 5,615,398 A | 3/1997 | Matsuyama |
| 5,835,641 A | 11/1998 | Sotoda et al. |
| 5,839,000 A | 11/1998 | Davis, Jr. et al. |
| 5,859,921 A | 1/1999 | Suzuki |
| 5,878,156 A | * 3/1999 | Okumura ..................... 382/118 |
| 5,905,563 A | 5/1999 | Yamamoto |
| 5,926,575 A | 7/1999 | Ohzeki et al. |
| 6,020,948 A | * 2/2000 | Tumidei ....................... 355/27 |
| 6,172,706 B1 | 1/2001 | Tatsumi |

FOREIGN PATENT DOCUMENTS

| CA | 2119112 | 9/1995 |
| EP | 0 485 293 A2 | 5/1992 |
| EP | 0 756 251 A2 | 1/1997 |
| FR | 2 665 812 | 2/1992 |
| JP | 61255331 | 11/1986 |

* cited by examiner

Primary Examiner—David Gray
(74) Attorney, Agent, or Firm—Pillsbury Winthrop LLP

(57) ABSTRACT

In this invention, a camera position display portion for displaying the position of a camera at which a to-be-photographed person looks at the time of photographing by the camera, a confirming process display portion for displaying "wait for photographing" to the to-be-photographed person, an end display portion for displaying "end of photographing" to the to-be-photographed person, and an exit display portion for displaying "traveling direction after the end of photographing" to the to-be-photographed person are provided and display of guidance as to the photographing state (the position at which the to-be-photographed person looks, waiting for photographing, end of photographing, traveling direction after the end of photographing) is made for the to-be-photographed person. Thus, the photographing state can be indicated to the to-be-photographed person and applicants for photographing who make a queue will not be kept waiting for a long time and can be dealt with as efficiently as possible. Further, by use of the above guidance display, not only a normal person but also a person who has difficulty in hearing can be guided without fail.

8 Claims, 40 Drawing Sheets

FACE IMAGE PHOTOGRAPHING APPARATUS AND FACE IMAGE PHOTOGRAPHING METHOD

CROSS-REFERENCE TO RELATED APPLICATIONS

This application is based upon and claims the benefit of priority from the prior Japanese Patent Applications No. 11-260705, filed Sep. 14, 1999; No. 11-336609, filed Nov. 26, 1999; No. 11-336610, filed Nov. 26, 1999; No. 11-336611, filed Nov. 26, 1999; and No. 2000-194740, Jun. 28, 2000, the entire contents of which are incorporated herein by reference. This application is a divisional application of USSN 09/612,239 filed Jul. 7, 2000, now U.S. Pat. No. 6,483,993, the entire contents of which are incorporated herein in its entirety.

BACKGROUND OF THE INVENTION

This invention relates to a face image photographing apparatus and a face image photographing method for photographing at least a face image of a to-be-photographed person to form a certificate photograph attached to an identification card or various types of licenses.

Generally, in this type of face image photographing apparatus, a photographer (photographing operator) provides guidance as to a photographing state and if the photographer cannot provide the guidance, judgement by the to-be-photographed person is required.

However, in the conventional guidance method of the photographing state, there occurs a problem that the load on the photographer (photographing operator) increases. Particularly, when applicants who want to be photographed make a queue waiting for photographing, it is required to efficiently photograph the applicants and enhance the photographing speed.

At this time, if the to-be-photographed person or applicant does not know the photographing state, does not realize that the operation for photographing the to-be-photographed person is terminated and keeps in the way in front of the camera, the process for photographing the applicants is disturbed. Further, if the to-be-photographed person misunderstands that the photographing operation for her is terminated and moves during the photographing process, a desired photographed image cannot be obtained and the photographing operation is effected again, thereby disturbing the process for photographing the applicants.

BRIEF SUMMARY OF THE INVENTION

An object of this invention is to provide a face image photographing apparatus capable of guiding to-be-photographed persons as to the photographing state and dealing with applicants making a queue waiting for photographing as efficiently as possible.

Another object of this invention is to provide a face image photographing method and a face image photographing apparatus capable of automatically recognizing the size of a face of an input face image when at least a face image of a to-be-photographed person is photographed and automatically effecting the zooming process to keep the size of the face of the output image constant.

Still another object of this invention is to provide a face image photographing method and a face image photographing apparatus capable of automatically recognizing the photographing possible state of a to-be-photographed person and automatically effecting the photographing operation.

Another object of this invention is to provide a face image photographing method and a face image photographing apparatus capable of automatically excluding a photograph such as a face image with the eyes closed which is not suitable for an output photograph and always outputting an optimum image.

Still another object of this invention is to provide a face image photographing method and a face image photographing apparatus capable of outputting a good image without calling back a to-be-photographed person and photographing the to-be-photographed person again even if a poor-image photographing operation is effected.

Another object of this invention is to provide a face image photographing apparatus capable of automatically excluding a photograph such as a face image with the eyes closed which is not suitable for an output photograph and always outputting an optimum image by directly indicating the position of the face on the display screen without effecting the complicated operation for trimming the photographed image when at least a face image of the to-be-photographed person is photographed.

Another object of this invention is to provide a face image photographing apparatus capable of always outputting an optimum image by outputting a monitor screen image immediately before confirmation is indicated when at least a face image of the to-be-photographed person is photographed and the monitor display of the photographed images are confirmed.

According to a first aspect of this invention, there is provided a face image photographing apparatus comprising photographing means for photographing at least a face image of a to-be-photographed person; output means for outputting a face image photographed by the photographing means; and guidance display means for displaying a photographing state for guiding the to-be-photographed person when the photographing operation is effected by the photographing means, wherein the guidance display means displays at least a position in which the to-be-photographed person sets an observing point on the photographing means, displays a message instructing the person to wait for photographing, an end of photographing, and a direction in which the person should moves after the end of photographing.

According to a second aspect of this invention, there is provided a face image photographing method comprising the steps of photographing at least a face image of a to-be-photographed person; measuring the size of a face of the to-be-photographed person based on the photographed face image; and obtaining a face image with the constant size by subjecting the photographed face image to the zooming process according to the measured value of the face size measured.

According to a third aspect of this invention, there is provided a face image photographing method comprising the steps of photographing at least a face image of a to-be-photographed person; recognizing that the to-be-photographed person is set in the photographing possible state based on the photographed face image; and selecting the photographed face image as a photographing image when the to-be-photographed person is set in the photographing possible state based on the result of recognition of the photographing possible state.

According to a fourth aspect of this invention, there is provided a face image photographing method comprising the steps of photographing at least a face image of a to-be-photographed person; detecting the position of each pupil based on the photographed face image; recognizing the state of each pupil based on the position of each pupil to determine whether or not each pupil is normally opened; and effecting the face image photographing process, the pupil position detecting process and the determination process for determining whether or not each pupil is normally opened again when it is determined based on the above determination that the pupil is not normally opened.

According to a fifth aspect of this invention, there is provided a face image photographing method comprising the steps of photographing at least face images of a to-be-photographed person and fetching the face images as successive images of a plurality of frames; storing the fetched successive images of the plurality of frames as a backup image; printing and outputting an image of a preset frame among the stored successive images of the plurality of frames; selecting an image of a preset frame suitable for outputting of the face image from the stored successive images of the plurality of frames when the printed and output image is not adequate; and printing and outputting the selected image.

According to a sixth aspect of this invention, there is provided a face image photographing apparatus comprising photographing means for photographing at least a face image of a to-be-photographed person; indicating means for indicating a reference position with respect to the position of each pupil based on the face image photographed by the photographing means; calculating means for calculating a cut-out area of the face image photographed by the photographing means; and image outputting means for outputting a cut-out image of the face image photographed by the photographing means based on the cut-out area calculated by the calculating means.

According to a seventh aspect of this invention, there is provided a face image photographing apparatus comprising fetching means for photographing at least face images of a to-be-photographed person and fetching the face images as successive images of a plurality of frames; display means for displaying the successive images of the plurality of frames fetched by the image fetching means; image selecting means for selecting an image suitable for outputting of the face image from the successive images of the plurality of frames displayed by the displaying means; and output means for outputting an image of a frame displayed by the display means immediately before the image is selected by the image selecting means as an image suitable for outputting of the face image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE INVENTION

There will now be described embodiments of this invention with reference to the accompanying drawings.

Figure 1:
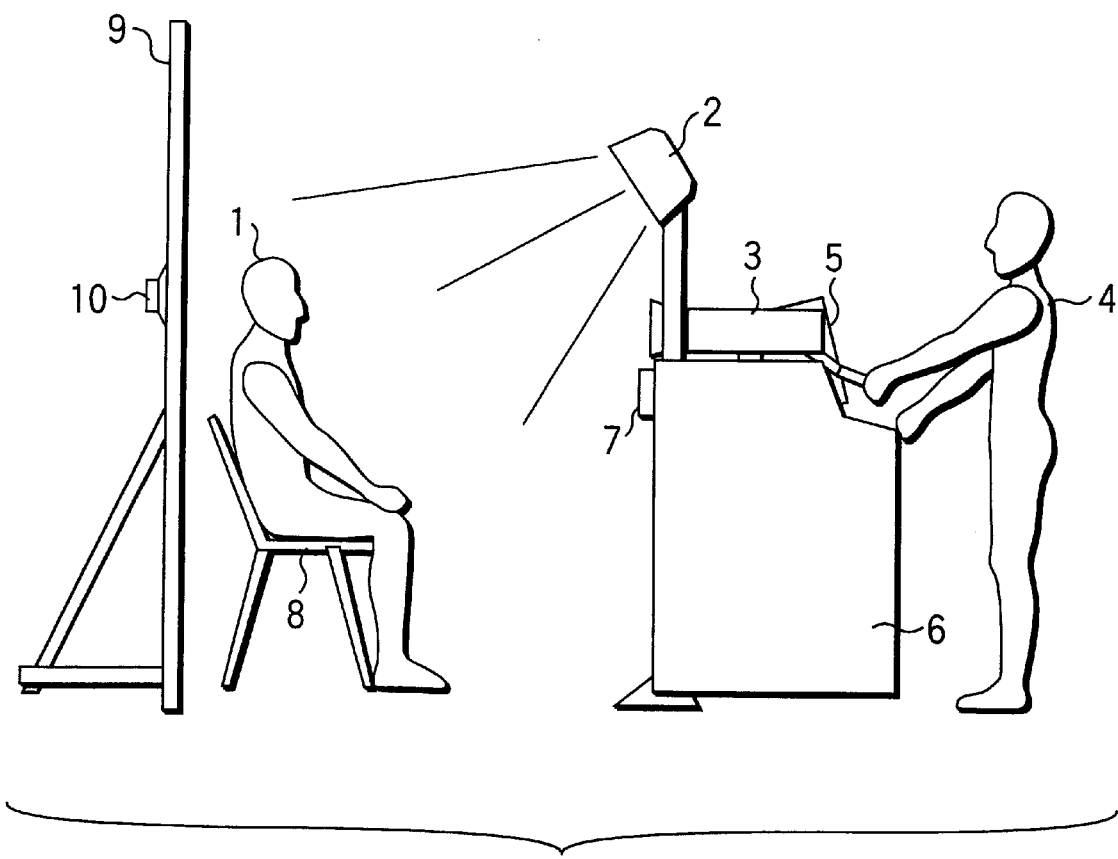
FIG. 1 is a view schematically showing the external construction of a face image photographing system according to one embodiment of this invention.

FIG. 1 is a view schematically showing the external construction of a face image photographing system according to one embodiment of this invention. The face image photographing system includes an illuminator 2 for illuminating a to-be-photographed person 1, a video camera 3 of CCD type used as photographing means for photographing at least a face image of the to-be-photographed person 1, a display (monitor display) 5 for displaying operation information of a photographer (operator) and the photographing state, a control table (control section) 6 for modifying an input image from the camera 3 or outputting the same to the display 5 or a storage section contained therein in response to an operation instruction issued by the photographer 4, a portrait-photographing device having a guidance display section 7 used as guidance means for displaying the photographing state to guide the to-be-photographed person 1, a chair 8 on which the to-be-photographed person 1 sits at the time of photographing, a background plate 9 used as a background of the to-be-photographed person 1 at the time of photographing, and a speaker 10 provided on the rear surface of the background plate 9 and used as guiding means for guiding the to-be-photographed person 1 as to the photographing state and guidance by use of voice.

The video camera 3 outputs a photographing image with each image constructed by 640 pixels×480 lines. Each pixel is constructed by a color sensor of R (red), G (green), B (blue) and data (density) of each color is output for each pixel.

The background plate 9 is formed blue, the background becomes blue when it is photographed by the video camera 3 and thus blue is used as a background color component.

A distance from the image sensing portion of the video camera 3 to the to-be-photographed person 1 is set substantially constant.

That is, the photographing operation is effected by use of the video camera 3 with the photographing distance fixed.

Figure 2:
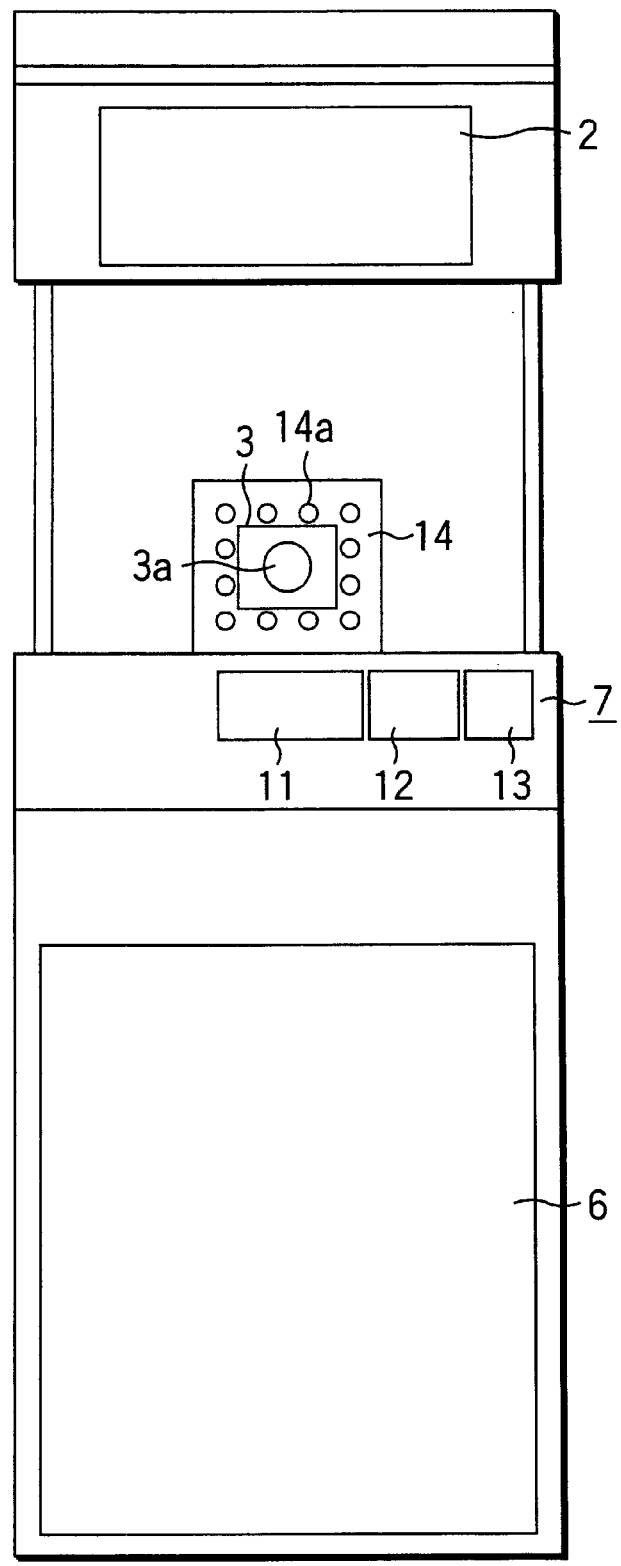
FIG. 2 is a view schematically showing the construction of a guidance display section.

As shown in FIG. 2, the guidance display section 7 includes a confirming process display portion (second display portion) 11 for displaying "wait for photographing" to the to-be-photographed person 1, an end display portion (third display portion) 12 for displaying "end of photographing" to the to-be-photographed person 1, and an exit display portion (fourth display portion) 13 for displaying "direction of traveling after the end of photographing" to the to-be-photographed person 1.

In this case, the confirming process display portion 11 is provided in substantially the central position in the width direction of the present apparatus and in the lower portion of the camera 3 on the front side of the apparatus, the end display portion 12 is provided on the right side of the confirming process display portion 11 in the drawing and the exit display portion 13 is provided on the right side of the end display portion 12 in the drawing.

Further, as shown in FIG. 2, as one of the guidance display means for displaying the photographing state to guide the to-be-photographed person 1, a camera position display portion (first display portion) 14 for displaying a position (in which the observing point is set on the camera 3) in which the to-be-photographed person 1 observes the camera 3 is set around a photographing lens 3a of the camera 3. The camera position display portion 14 has a plurality of LED display elements 14a disposed around the photographing lens 3a and they are controlled to be set into a turn-ON state, flickering state or turn-OFF state as required.

Figure 3:
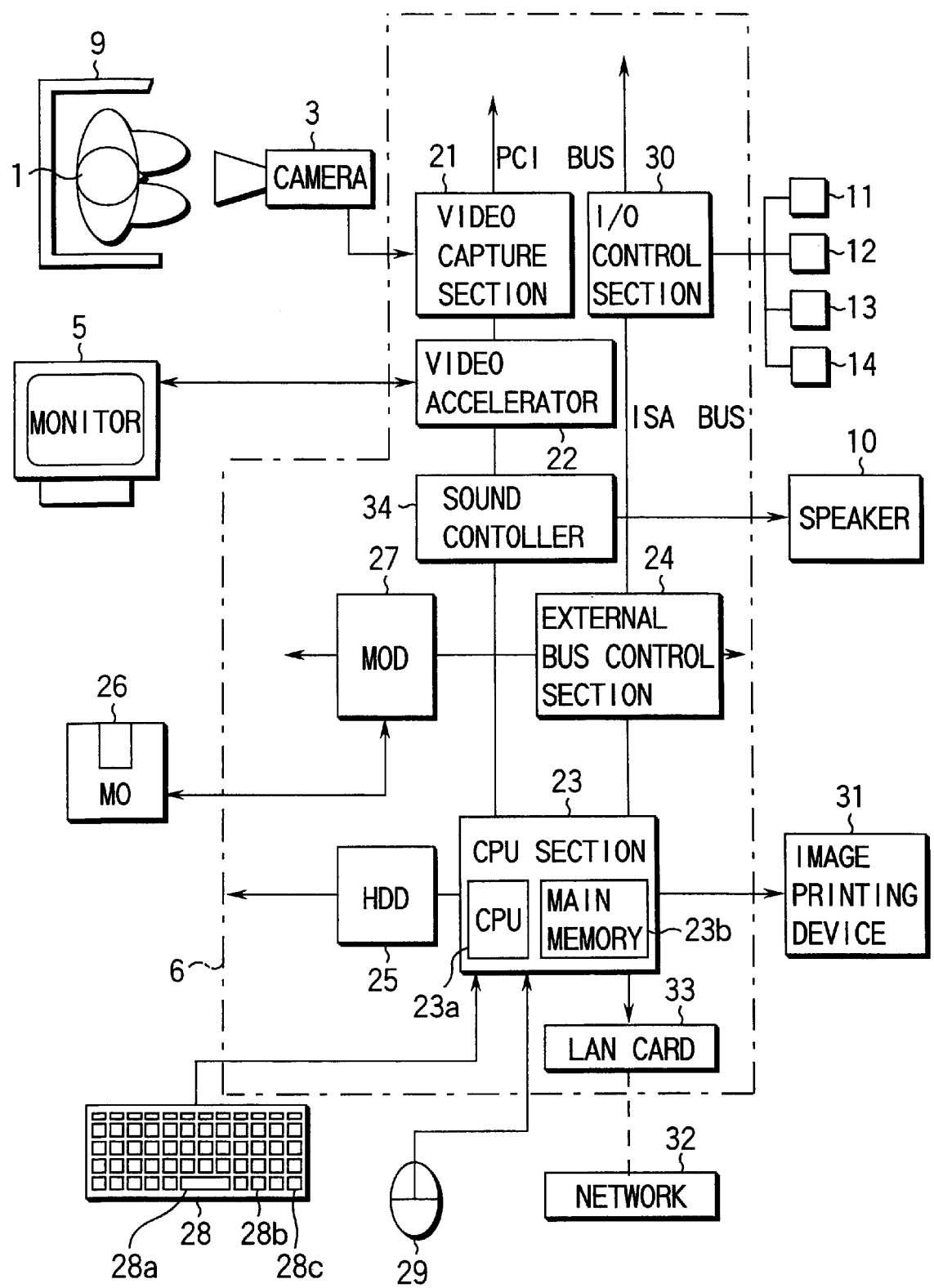
FIG. 3 is a block diagram showing the whole construction of the face image photographing system.

FIG. 3 is a block diagram showing the whole construction of the face image photographing system shown in FIGS. 1 and 2. The control section 6 of the face image photographing system includes a video capture section 21, video accelerator section 22, CPU section 23, external bus control section 24, large-capacity memory device 25, reader/writer section 27, I/O control section 30, network adapter (such as a LAN card) 33 and sound control section 34.

The video capture section 21 converts an analog signal (input image) from the camera 3 into a digital signal on the real-time basis and transfers the digital signal to an MO 26 or main memory 23b used as a video memory which will be described later.

The video accelerator section 22 stores image data from the video capture section 21 into the MO 26 or main memory 23b used as a video memory, effects the image drawing process with respect to image data from the video capture section 21 and controls the display operation of the display 5.

The sound control section 34 controls a guidance voice to the speaker 10.

The CPU section 23 includes a CPU (central processing unit) 23a for effecting various operating processes and various control operations with respect to image data or the like, a main memory 23b for storing image data of plural frames from the video capture section 21 in the unit of frame and temporarily storing operation results and the like and an interface (not shown) for connection with various peripheral devices.

For example, the CPU section 23 is connected to a keyboard 28 and mouse 29 as input devices operated by the operator (photographer) 4 via the interface. On the keyboard 28, a photographing button 28a depressed when it is confirmed that the to-be-photographed person 1 has made preparation for photographing, a photographing determination button 28b depressed when a satisfied photographing image is obtained, and a photographing cancel button 28c depressed when re-photographing becomes necessary are provided.

Icons for the respective photographing button 28a, photographing determination button 28b and photographing cancel button 28c are displayed on the display 5 and the same function as that obtained when one of the photographing button 28a, photographing determination button 28b and photographing cancel button 28c of the keyboard 28 is depressed can be attained by selecting one of the icons by use of a cursor moved by the mouse 29.

Further, the CPU section 23 is connected to an image printing device 31 used as output means, for example, for printing and outputting a photographed face image via the interface.

The external bus control section 24 controls an external bus (such as a SCSI) for connection with various peripheral devices.

The large-capacity memory device 25 stores various OS, applications, control data, image data and is constructed by a hard disk device (HDD), for example.

The reader/writer section (MO driver) 27 reads/writes data with respect to a portable storage medium 26 such as a magnet-optical disk for storing output data from the control table 6.

The I/O control section 30 controls the confirming process display portion 11, end display portion 12, exit display portion 13, camera position display portion 14.

The network adapter (such as a LAN card) 33 is used to make mutual communication with respect to other various devices (such as an image printing device and image filing device) on the same network 32.

Figure 4:
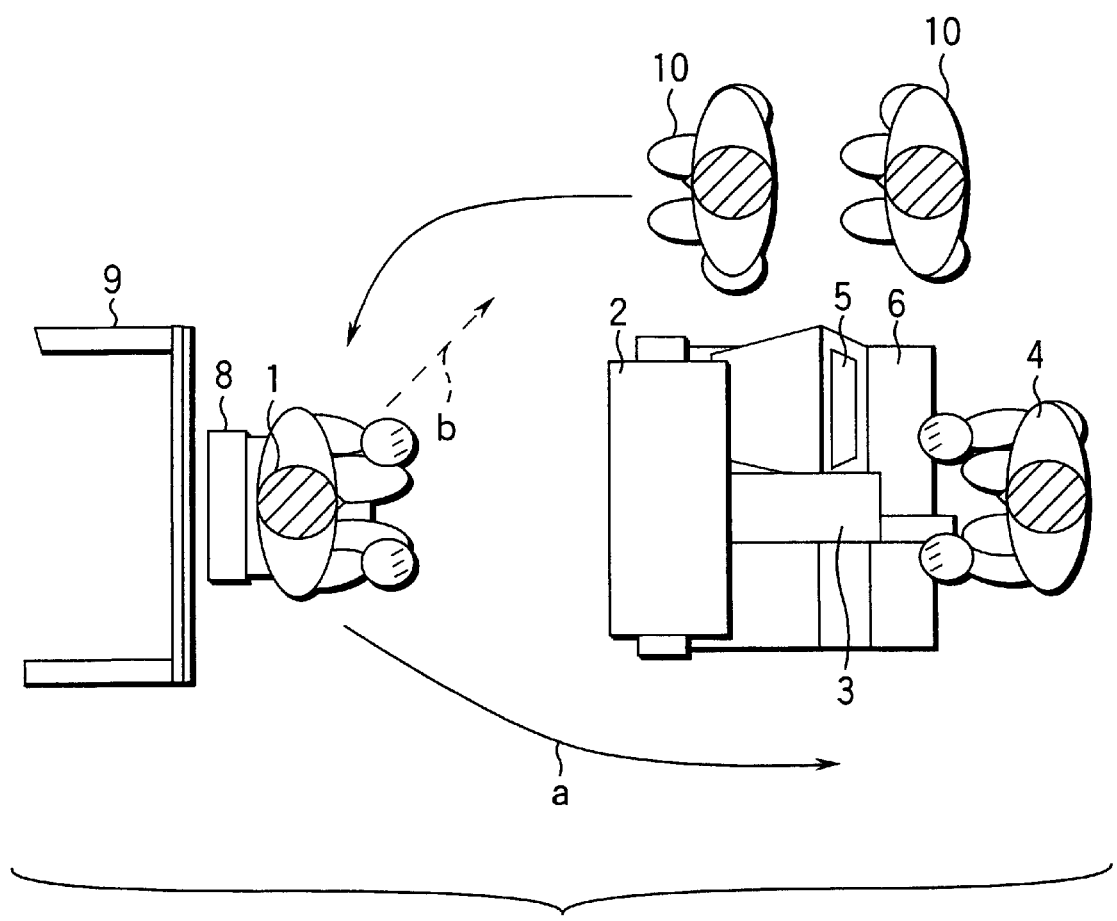
FIG. 4 is a view for illustrating a physical flow of a photographing process between the face image photographing system, to-be-photographed person and applicants for photographing waiting for photographing.

FIG. 4 is a view for illustrating a physical flow of a photographing process between the face image photographing system, to-be-photographed person 1 and applicants 10 for photographing waiting for photographing as viewed from above. Generally, the to-be-photographed person 1 walks (moves) in a direction indicated by an arrow "a" of a solid line shown in FIG. 4 when the photographing operation is terminated, but if she walks in a direction indicated by an arrow "b" of broken lines, a problem occurs when a next applicant 10 for photographing takes a seat for photographing.

First Embodiment

The first embodiment of the invention will be described, in which the person 1 to be photographed is instructed to look at a specific point, requested to keep still, is informed that the photographing has completed, and is instructed to leave in a specific direction.

Figure 5:
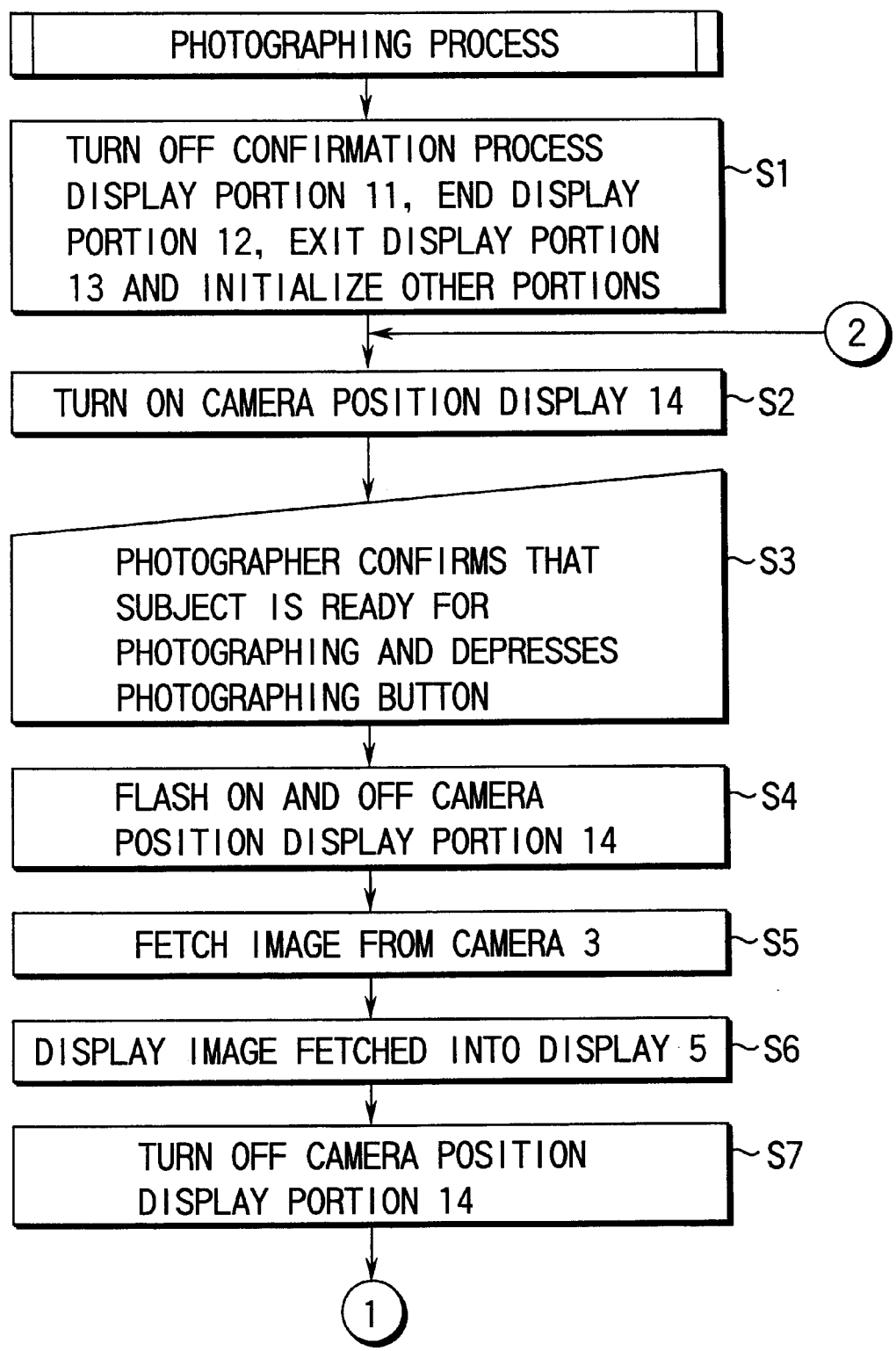
FIGS. 5 and 6 are flowcharts for illustrating the processing operation in the first embodiment.
Figure 6:
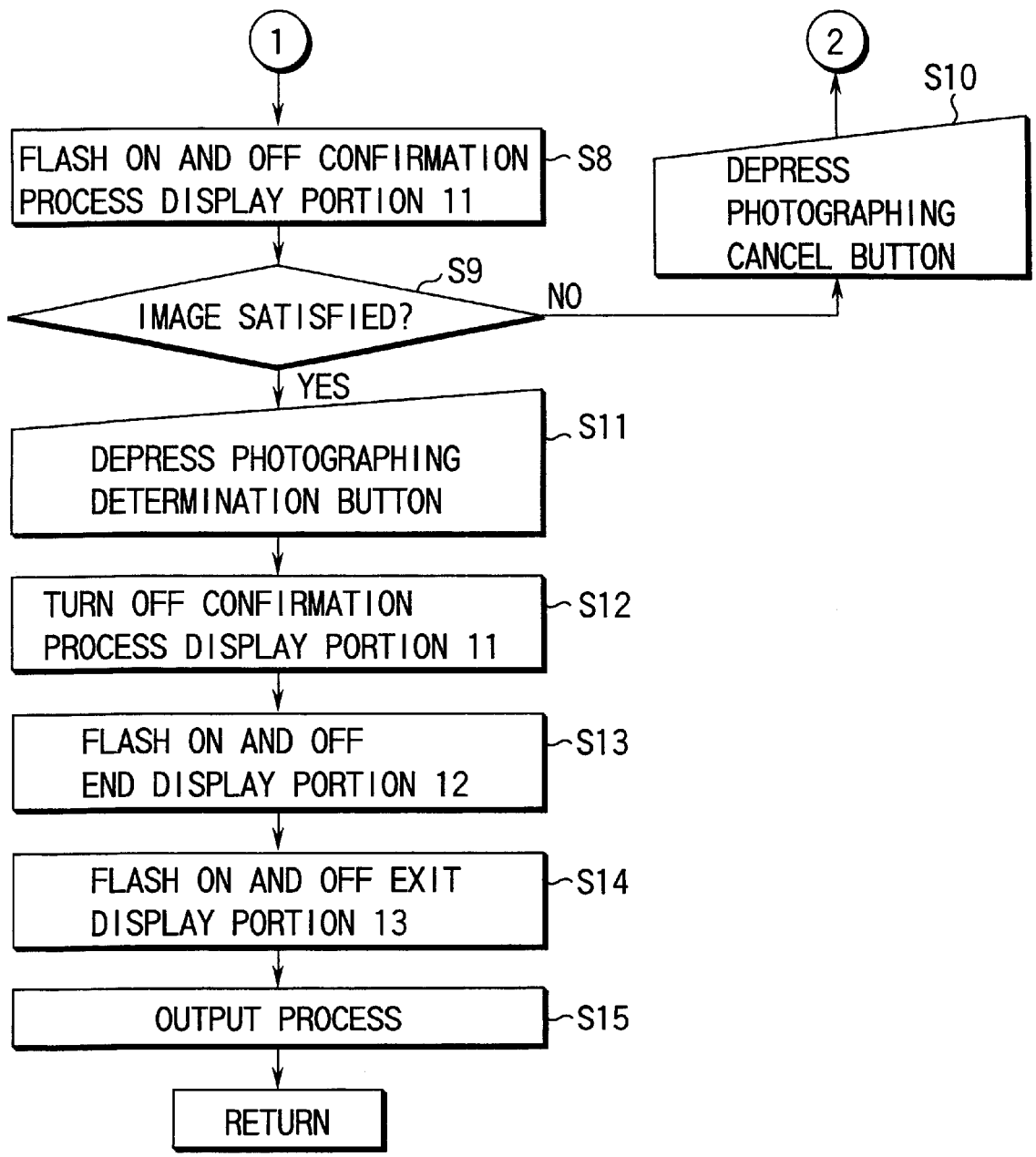

The processing operation of the present apparatus is explained below with reference to the flowcharts shown in FIGS. 5 and 6. The process explained below is mainly effected by the CPU 23a of the CPU section 23.

First, in the step S1, the confirming process display portion 11, end display portion 12, exit display portion 13 are turned OFF, the other portions of the present apparatus are initialized and then the step S2 is effected. In the step S2, the to-be-photographed person 1 is urged to look at the photographing lens 3a of the camera 3, that is, to set the observing point at the photographing lens 3a of the camera 3 by lighting the camera position display portion 14 in red, for example.

Then, in the step S3, the photographer 4 confirms that preparation for photographing of the to-be-photographed person 1 in the step S1 is made and depresses the photographing button 28a. Next, in the step S4, the to-be-photographed person 1 is urged to keep looking at the camera 3 by causing the camera position display portion 14 to flicker, for example, and the step S5 is effected.

In the step S5, a photographed image of the to-be-photographed person 1 is fetched from the camera 3 via the video capture section 21 and temporarily stored into the main memory 23b in the CPU section 23 and the step S6 is effected. In the step S6, an input image stored in the main memory 23b in the CPU section 23 is displayed on the display 5 and the step S7 is effected.

Figure 7:
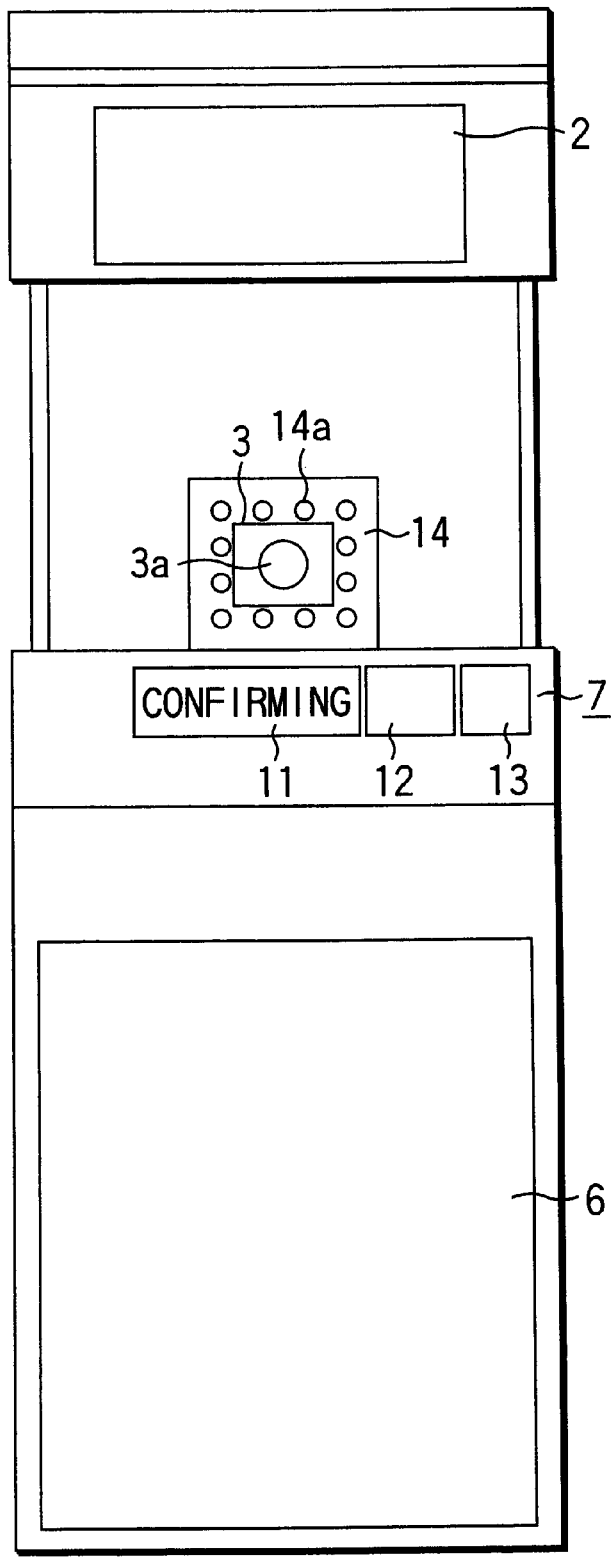
FIGS. 7, 8 and 9 are views showing display examples of the guidance display section of the first embodiment.

In the step S7, since the image fetching process is terminated, the camera position display portion 14 which flickers is turned OFF and the step S8 is effected. In the step S8, the confirming process display portion 11 is set into a flickering state in yellow as shown in FIG. 7 and the step S9 is effected. In the step S9, the photographer 4 determines whether or not re-photographing is necessary by checking whether the eyes are closed or not, the face position is shifted or not while observing the image displayed in the step S6. During this period, the to-be-photographed person 1 is required to wait in preparation for re-photographing. Therefore, in the step S8, the confirming process display portion 11 is set into a flickering state in yellow.

If it is determined in the step S9 that re-photographing is necessary, the step S10 is effected and the photographer 4 depresses the photographing cancel button 28c. As a result, the process returns to the step S2 and the same operation is repeated.

Figure 8:
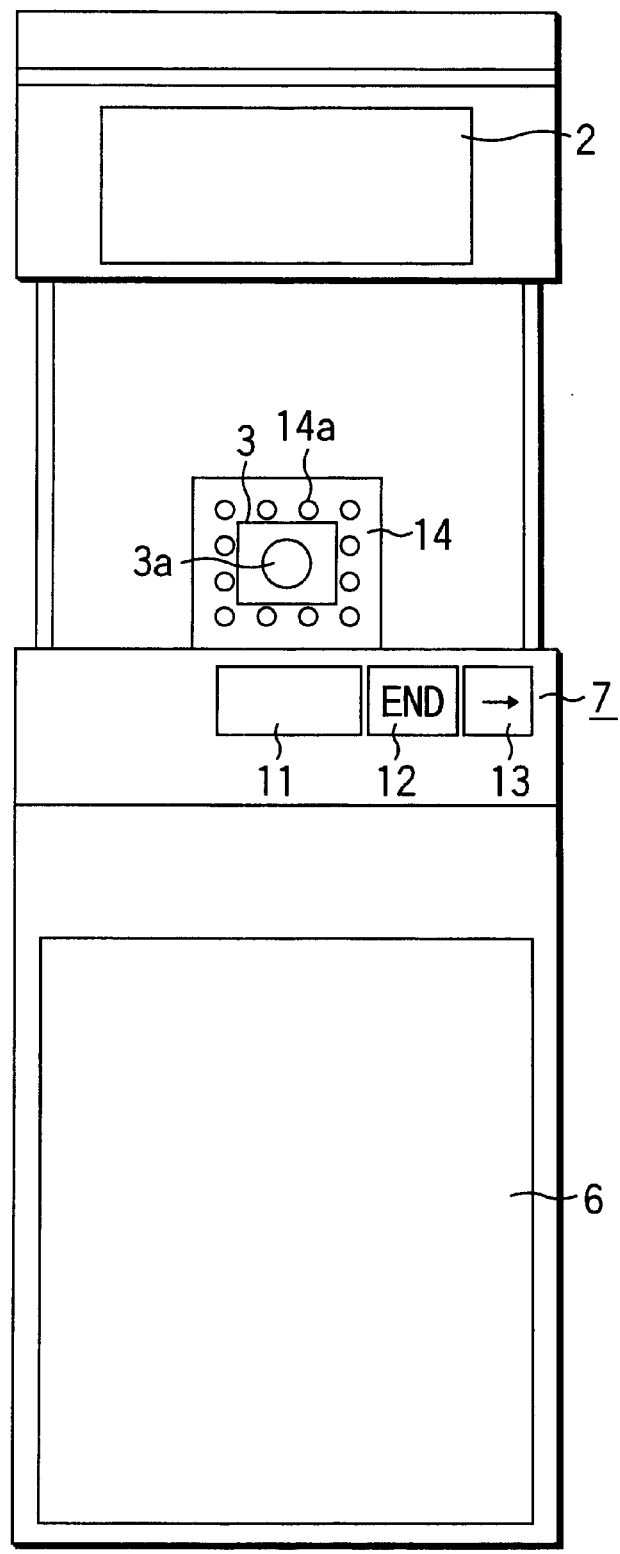

If it is determined in the step S9 that the photographed image is satisfactory, the step S11 is effected and the photographer 4 depresses the photographing determination button 28b. If the photographing determination button 28b is depressed, the step S12 is effected to turn OFF the confirming process display portion 11. Then, in the step S13, the end display portion 12 is set into a flickering state in green as shown in FIG. 8, and at the same time, the exit display portion 13 is set into a flickering state as shown in FIG. 8 so that the to-be-photographed person 1 will be urged to walk towards the exit since the photographing is terminated.

Next, in the step S15, the input image stored in the main memory 23a in the CPU section 23 in the step S6 is converted into an image for outputting and the image is processed according to the purpose of application together with other personal information of the to-be-photographed person 1. For example, the image is printed and output on a recording medium (such as paper, card) by use of the image printing device 31 connected to the CPU section 23 or an image printing device (not shown) connected to the network 32 via the network adapter 33, or stored into an image filing device (not shown) used as image storing means connected to the network 32 or stored into the large-capacity storage device 25, portable storage medium 26 or the main memory 23b in the CPU section 23 by using the same as image storing means. Thus, the whole photographing process for one to-be-photographed person is terminated.

The photographed face image may be printed or stored according to the purpose of application thereof and the outputting method of the face image can be freely selected.

As described above, according to the first embodiment, the camera position display portion 14 for displaying a position in which the to-be-photographed person looks at the camera 3 at the time of photographing by the camera 3, the confirming process display portion 11 for providing display to urge the to-be-photographed person to wait for photographing, the end display portion 12 for displaying "end of photographing" to the to-be-photographed person 1, and the exit display portion 13 for displaying the moving direction after the end of photographing to the to-be-photographed person 1 are provided, the to-be-photographed person 1 can be guided as to the photographing state by displaying the photographing state (the position in which the to-be-photographed person observes the camera 3, waiting for photographing, end of photographing, moving direction after the end of photographing) to guide the to-be-photographed person 1 and the applicants 10 for photographing making a queue will not wait for a long time. Further, by use of the above guidance display, not only a normal person but also a person who has difficulty in hearing can be guided without fail.

The above embodiment of this invention is not limited to the above case and this invention can be variously modified without departing from the technical scope thereof. For example, as shown in FIG. 9, the arrangement of the end display portion 12 and exit display portion 13 can be changed according to the queue making direction of the applicants 10 for photographing and the direction to the exit for the to-be-photographed person 1.

Figure 9:
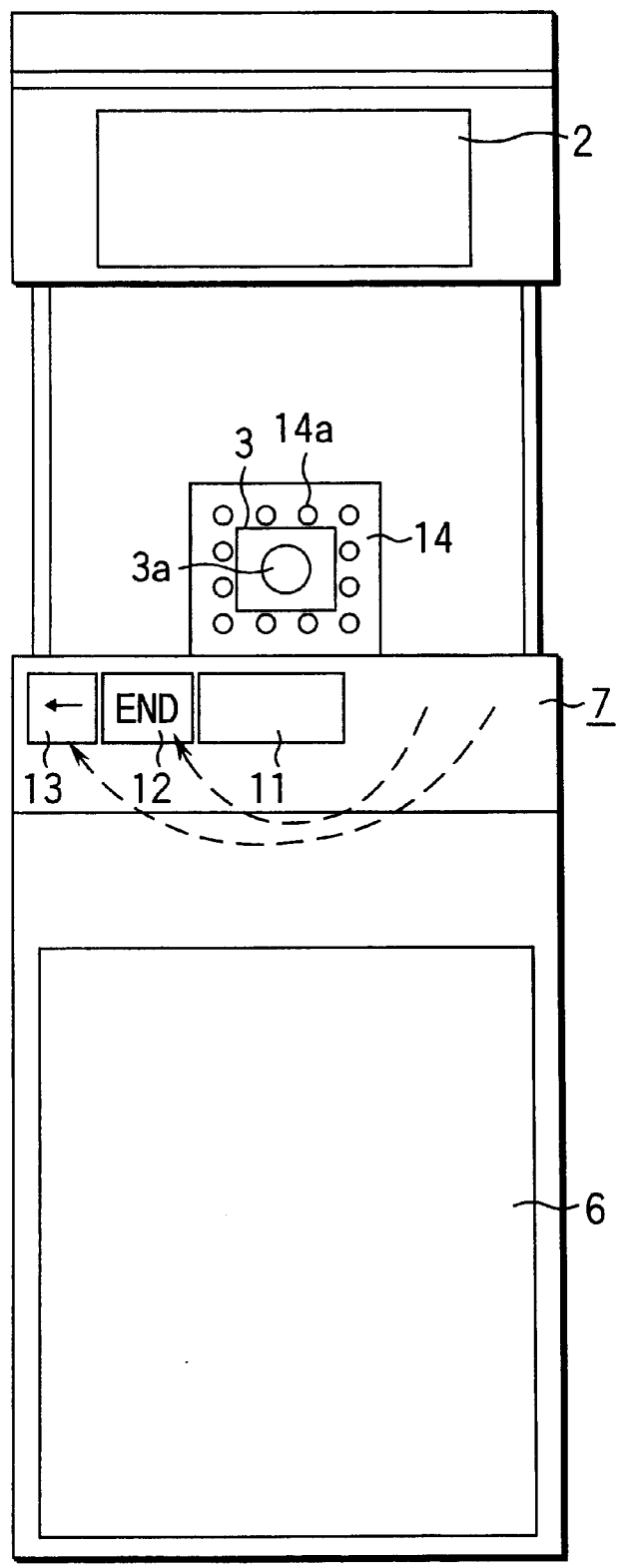

In an example of FIG. 9, the moving direction of the to-be-photographed person 1 after the end of photographing is set in the left direction of this apparatus in the drawing, and in this case, the end display portion 12 is moved to the left side in a horizontal direction and set on the left side of the confirming process display portion 11 in the drawing and the exit display portion 13 is turned by 180 degrees to indicate the opposite direction and set on the left side of the end display portion 12 in the drawing.

Further, the position in which the to-be-photographed person 1 observes the photographing lens 3a of the camera 3 is displayed by use of the camera position display portion 14, but this is not limitative and, for example, the position can be indicated by letters "please look at the photographing lens of the camera" by use of the confirming process display portion 11 or both of them can be used.

Second Embodiment

Next, the second embodiment will be described, in which the size of the face of a to-be-photographed person 1 is measured and a face image of constant size is obtained by zooming the face image of the measured size.

Figure 10:
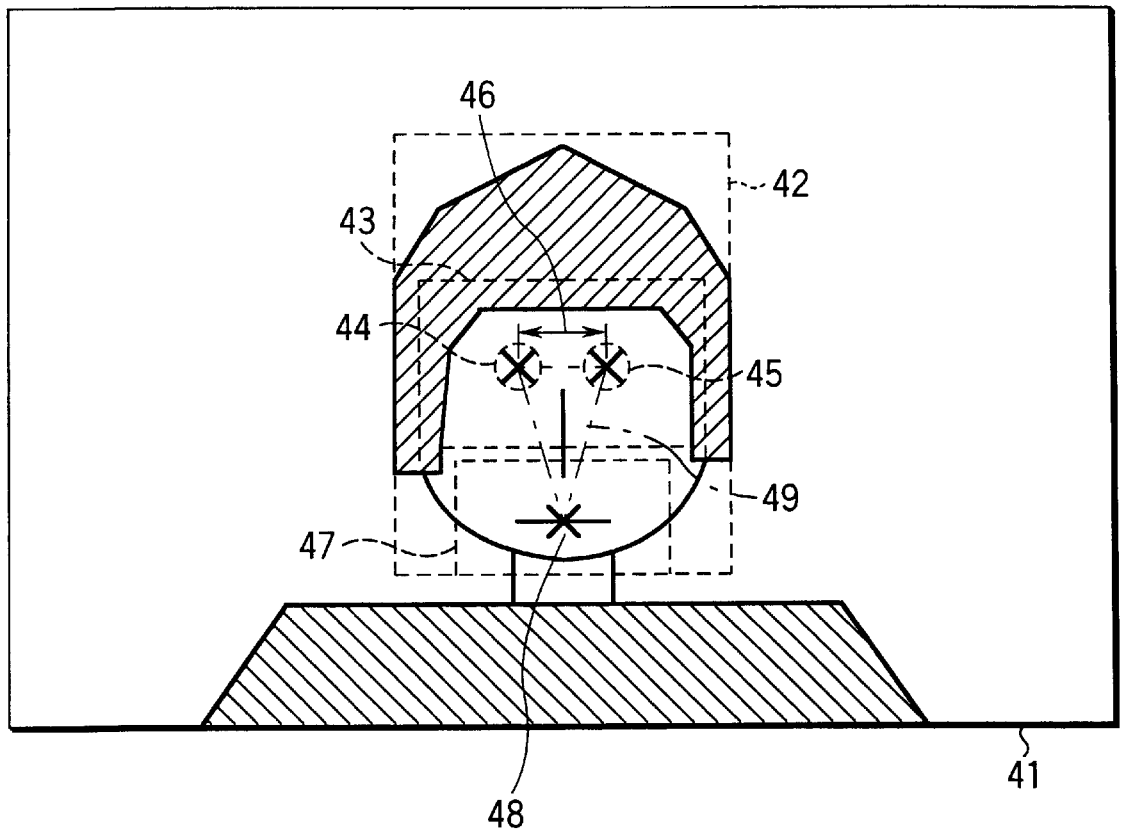
FIG. 10 is a view showing a state in which the contour area of a face is detected from an input image of a camera according to a second embodiment and the size of the face is measured based on the contour area of the face.

FIG. 10 shows a case wherein an input image (face image) 41 is fetched from a camera 3, a contour area 42 of the face is detected from the input image 41 and the size of the face is measured based on the contour area 42 of the face is measured.

Next, the processing operation of the present apparatus is explained with reference to FIG. 10 and the flowchart shown in FIG. 11. The process explained below is mainly effected by the CPU 23a in the CPU section 23.

First, in the step S21, the number of retry processes counted by a counter (not shown) and other data are initialized and the step S22 is effected. In the step S22, the input image (face image of the to-be-photographed person 1) from the camera 3 is fetched via a video capture section 21 and temporarily stored into the main memory 23b of the CPU section 23 and the step S23 is effected. In the step S23, the contour area 42 of the face having a color component different from that of a background plate 9 is detected from the input image 41 stored in the main memory 23b. (The background plate 9 will be described later in detail.) The operation then goes to the step S24.

In the step S24, the face size is measured by the face size (an area, a number of the pixels) measuring process which will be described later based on the face contour area 42 obtained in the step S23 and the step S25 is effected. The process in the step S24 corresponds to measuring means in this invention.

In the step S25, whether or not the face size measurement obtained in the step S24 lies within a specified range (i.e., area 39 that will be later described) is determined. The "specified range" has been derived by the reverse operation based on an input range of the zooming process which will be effected later. If the zooming ratio ranges from 0.5 to 1.5, the face size falls within the specified range when the ratio of the target size to the face size measured is 0.5 to 1.5. The process of the step S25 is effected by the first determining means in this invention.

If it is detected in the step S25 that the face size measurement lies within the specified range, the step S26 is effected. In the step S26, the ratio of the target face size to the face size measurement is derived and the derived ratio is used as a zoom ratio. The target face size is an optimum face size when the face image is output as a photograph and is determined based on the average of face image data items of hundreds of people, for example. The process in the step S26 corresponds to zoom ratio setting means in this invention.

Next, in the step S27, the CPU 23 performs the zooming process on the input image from the camera 3 based on the zoom ratio set in the step S26 and the step S28 is effected. The process in the step S27 corresponds to zoom processing means in this invention.

In this example, a case wherein the zooming process is effected in an electronic manner is explained, but the zooming process may be effected according to the movement of the lens of the camera 3.

In the step S28, the input image stored in the main memory 23a in the CPU section 23 is converted into an image for outputting and the image is processed according to the purpose of application together with other personal information (name, the date of birth, ID number or the like) of the to-be-photographed person 1. For example, the image is printed and output on a recording medium (such as paper, card) by use of the image printing device 31 connected to the CPU section 23 or an image printing device (not shown) connected to the network 32 via the network adapter 33, or stored into an image filing device (not shown) used as image storing means connected to the network 32 or stored into the large-capacity storage device 25, portable storage medium 26 or the main memory 23b in the CPU section 23 by using the same as image storing means. Thus, the whole photographing process for one to-be-photographed person is terminated.

The photographed face image may be stored or printed on an area whose size is set to a preset size such as an identification card according to the purpose of application thereof and the outputting method of the face image can be freely selected.

If it is detected in the step S25 that the face size measurement lies outside the specified range, the retry process is effected. That is, first, in the step S29, the number of retry processes is incremented and the step S30 is effected. In the step S30, whether or not the number of retry processes is smaller than a specified value which is previously set is checked, and if it is smaller than the specified value, the step S31 is effected. The process in the steps S29, S30 corresponds to second determining means in this invention.

If it is detected in the step S31 that the measured face size exceeds the specified range (the face is too big), a message is displayed on the display 5 to urge the to-be-photographed person 1 to move her face farther apart from the camera, and if the measured face size is too small, a message is displayed on the display 5 to urge the to-be-photographed person 1 to move her face closer to the camera, and then the process returns to the step S22 to start the process again from the step S22 as the retry process.

If it is determined in the step S30 that the number of retry processes exceeds the specified value, it is determined that the face image will be inadequate when the face image is output as a photograph, the step S32 is effected to effect an error process and the photographing process is terminated. The process in the step S32 corresponds to error processing means in this invention.

Figure 11:
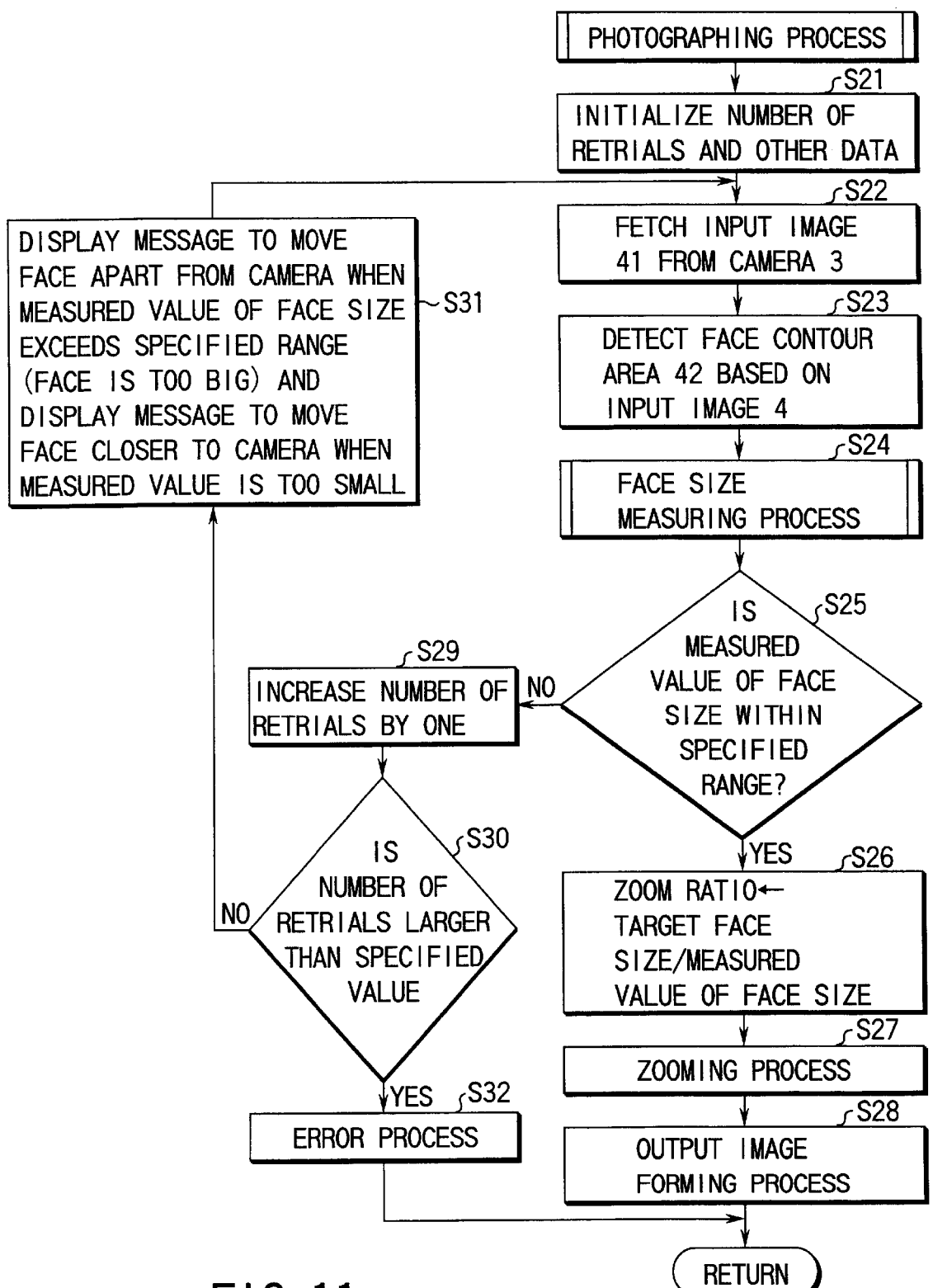
FIGS. 11, 12 and 13 are flowcharts for illustrating the processing operation in the second embodiment.
Figure 12:
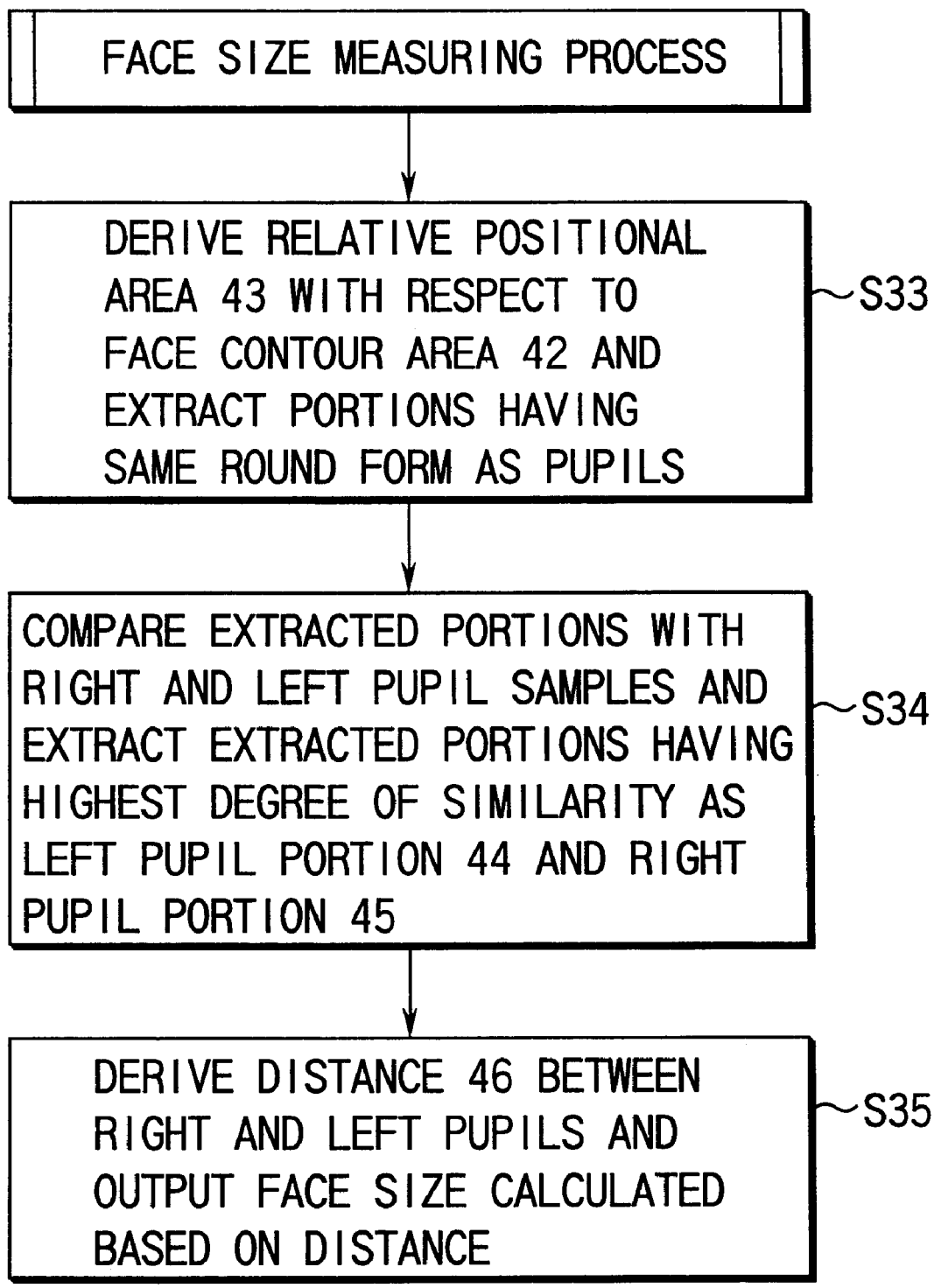

Next, the first embodiment of the face size measuring process in the step S24 of FIG. 11 is explained with reference to FIG. 10 and the flowchart shown in FIG. 12.

First, in the step S33, an area 43 in which both of the pupils will exist without fail is derived as a relative positional area with respect to the face contour area 42 derived in the step S23 and portions of the same shape as the pupil, for example, black portions of round shape are extracted from the derived area 43. The area 43 is derived based on the average of areas in which the pupils exist without fail with respect to the face contour areas in face image data items of hundreds of people, for example.

Next, in the step S34, pupil samples previously registered are compared with the black portions of round shape extracted in the step S32 and the portions having the highest degree of similarity are extracted. Since two pupils exist, the pupil samples are prepared for right and left pupils, the above determination process is effected by comparing the extracted portions with the samples of the right and left pupils and coordinates of a left pupil portion 44 and right pupil portion 45 are derived. It is also possible to prepare pupil samples for the right or left pupil, derive the other side pupil samples by inverting or modifying the above pupil samples, for example, and thus reduce the number of prepared samples.

The sample mentioned above has been prepared by normalizing the images of pupils of hundreds of people, for use in pattern comparison effected to determine the similarity of the pupils of the person to be photographed.

Next, in the step S35, a distance 46 between the centers of the left pupil portion 44 and the right pupil portion 45 derived in the step S33 is derived and the face size is calculated based on the derived distance 46. The face size is derived based on the average of face sizes with respect to the distances between the centers of the right and left pupils in face image data items of hundreds of people, for example.

Figure 13:
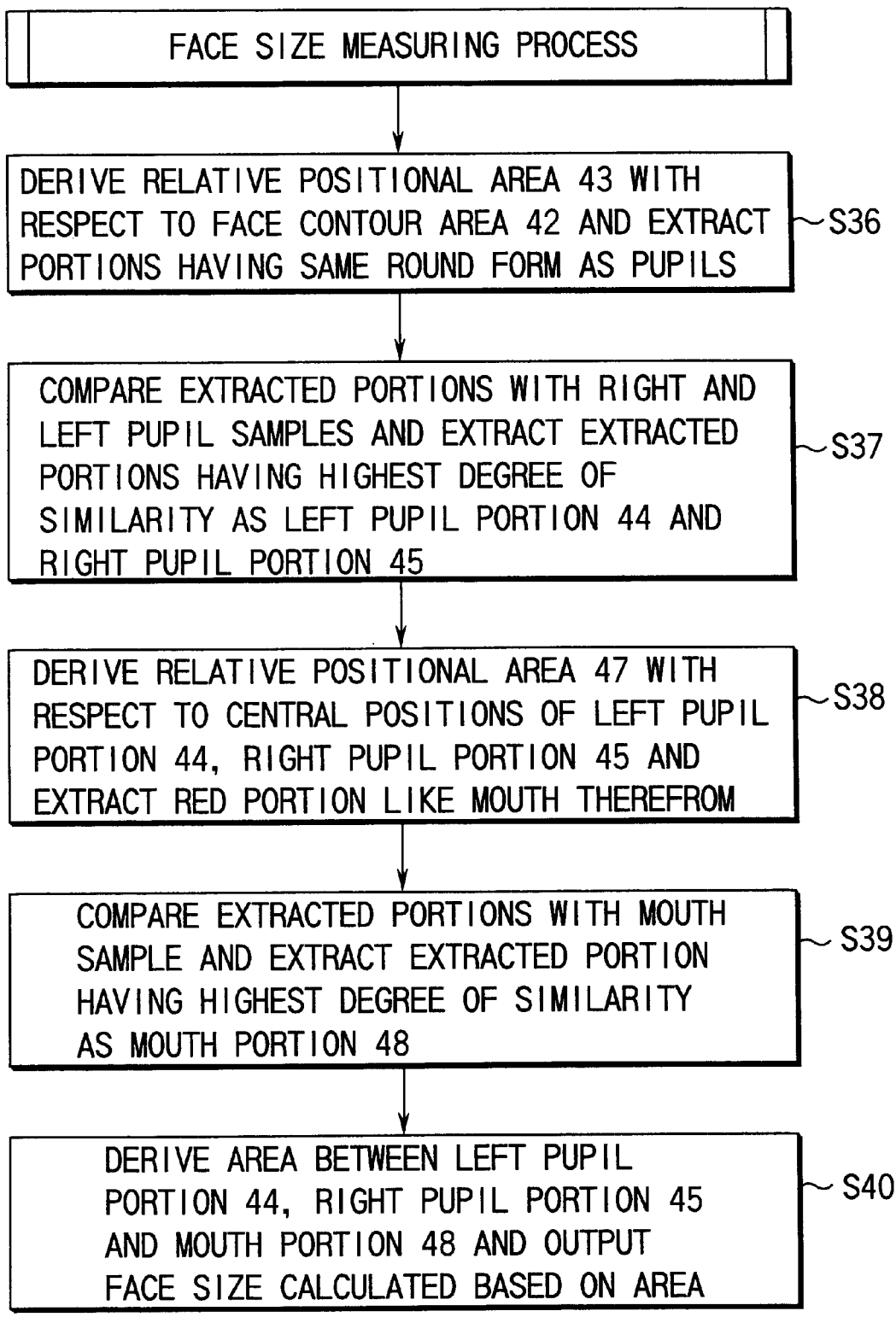

Next, the second embodiment of the face size measuring process in the step S24 of FIG. 11 is explained with reference to FIG. 10 and the flowchart shown in FIG. 13.

First, in the step S36, an area 43 in which both of the pupils will exist without fail is derived as a relative positional area with respect to the face contour area 42 derived in the step S23 and portions of the same shape as the pupil, for example, black portions of round shape are extracted from the derived area 43.

Next, in the step S37, pupil samples previously registered are compared with the black portions of round shape extracted in the step S36 and the portions having the highest degree of similarity are extracted. Since two pupils exist, the pupil samples are prepared for right and left pupils, the above determination process is effected by comparing the extracted portions with the samples of the right and left pupils and a left pupil portion 44 and right pupil portion 45 are derived.

Next, in the step S38, an area 47 in which a mouth will exist without fail is derived as a relative positional area with respect to the central positions of the left pupil 44 and right pupil 45 extracted in the step S37 and a portion containing reddish pixels like the mouth is extracted from the derived area 47.

The area 47 is derived based on the average of areas containing mouths with respect to the central positions between the right and left pupils in face image data items of hundreds of people, for example.

Next, in the step S39, mouth samples previously registered are compared with the portions extracted in the step S38 and a potion having the highest degree of similarity is extracted as a mouth portion 48. Then, in the step S40, an area 49 defined by the left pupil portion 44, right pupil portion 45 extracted in the step S37 and the mouth portion 48 extracted in the step S38 is derived and the face size is derived based on the derived area 49.

The face size is derived based on the average of face sizes with respect to the areas each defined by the right and left pupil portions and mouth portion in face image data items of hundreds of people, for example.

Figure 14:
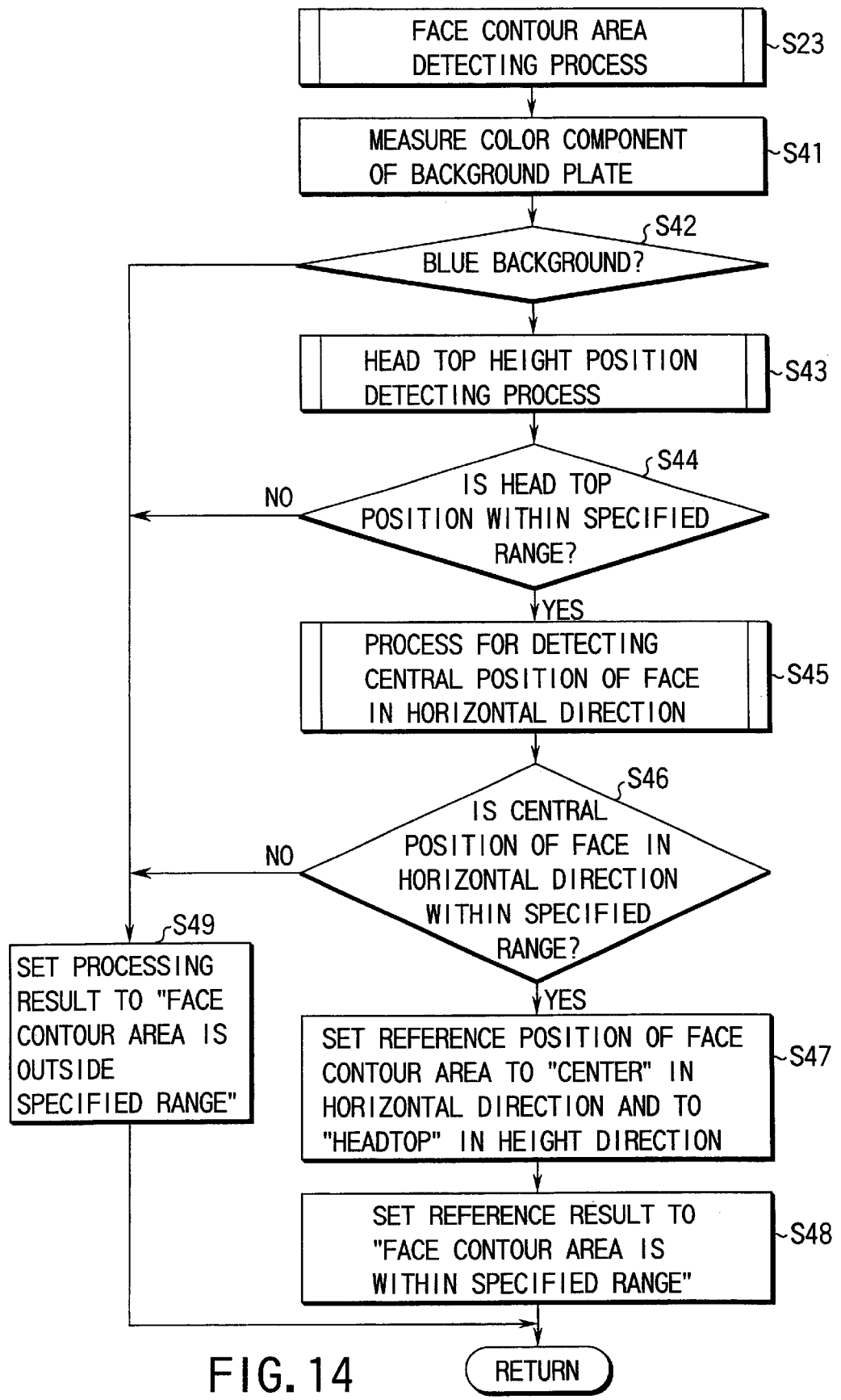
FIG. 14 is a flowchart for illustrating the specified range of the contour area of the face in the second embodiment.
Figure 15:
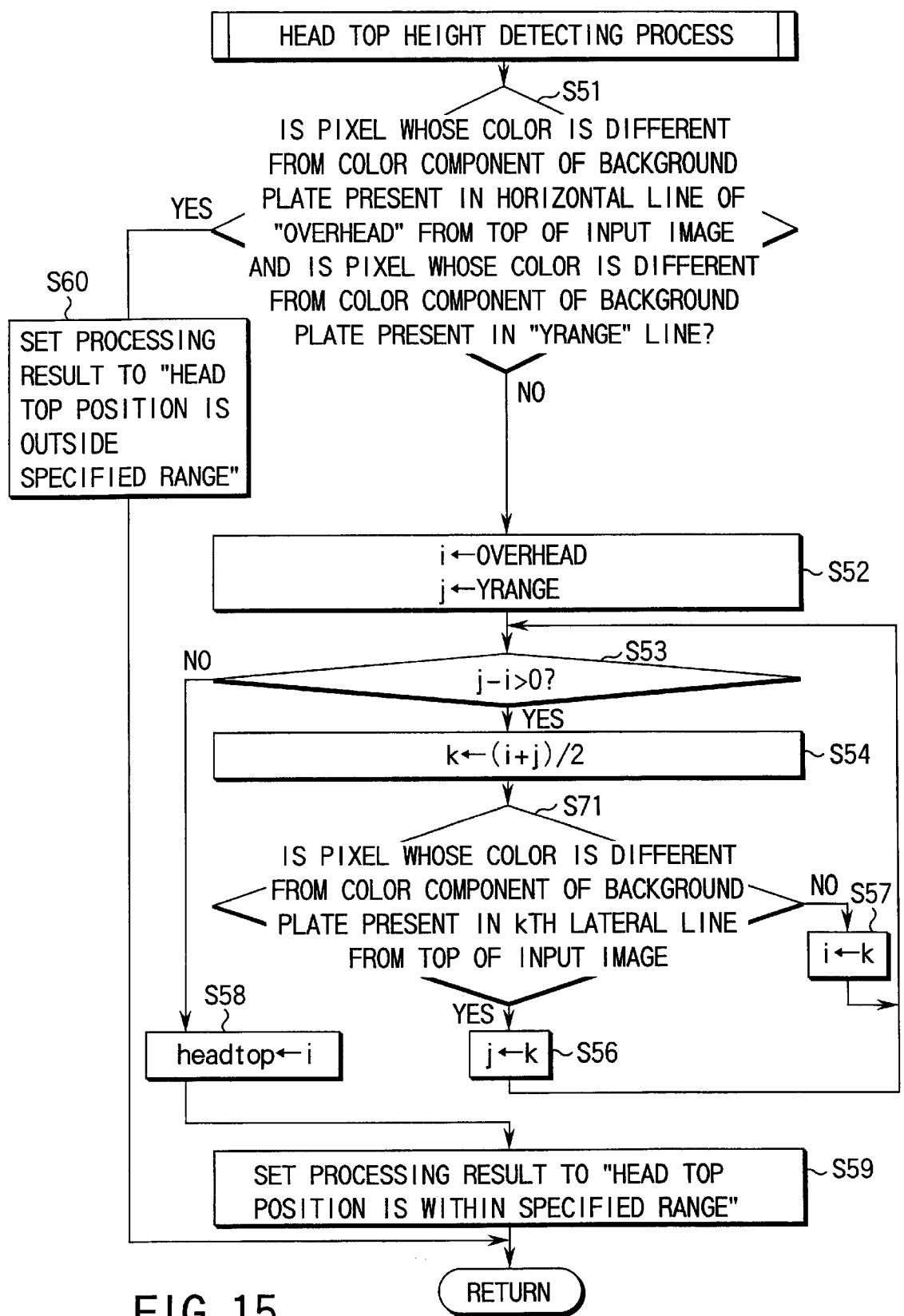
FIG. 15 is a flowchart for illustrating the top-of-head height position detecting process in the second embodiment.
Figure 16:
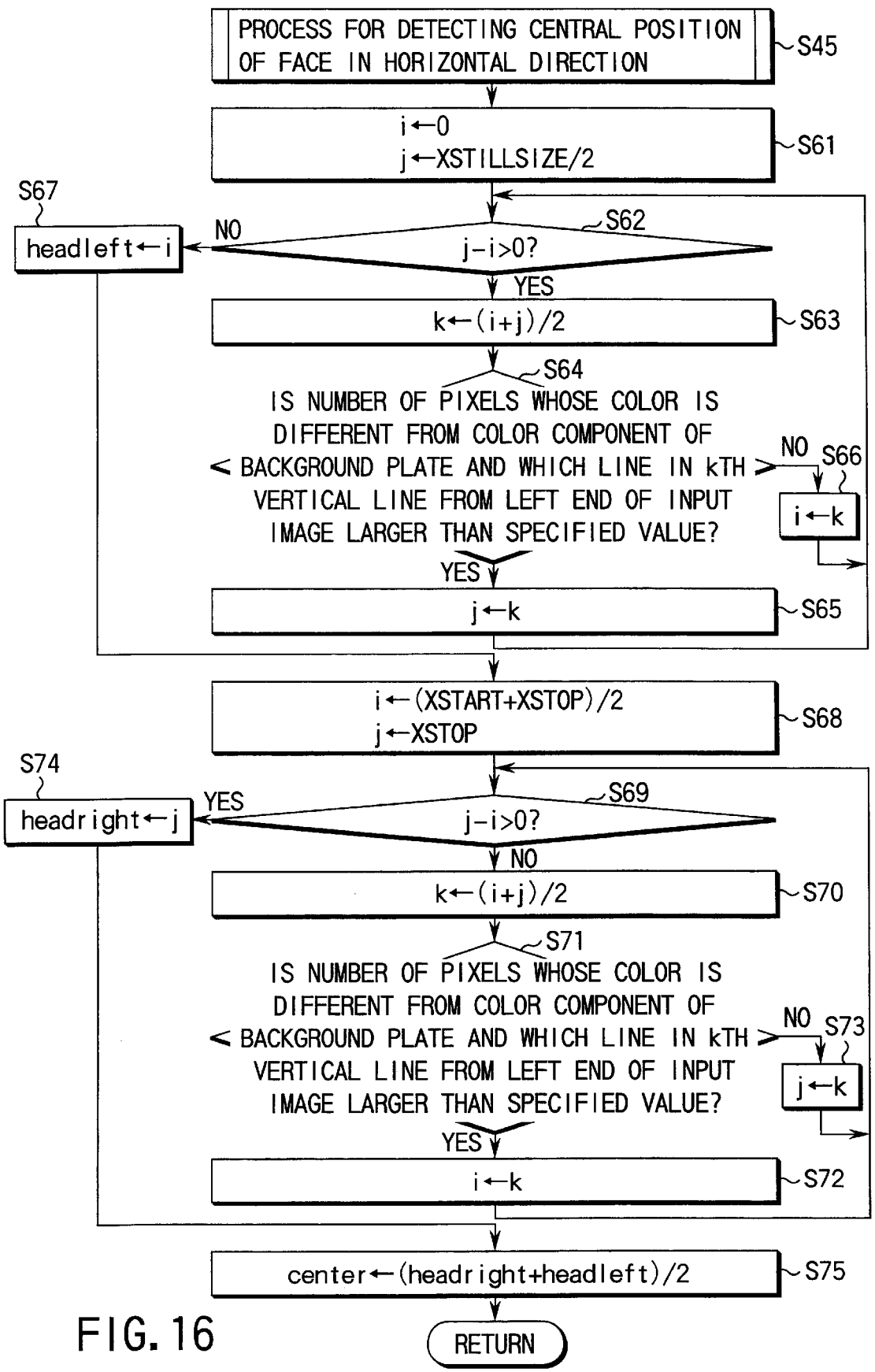
FIG. 16 is a flowchart for illustrating the process for detecting the central position of the face in the horizontal direction in the second embodiment.

How the contour area of the face is detected in the step 23 will be explained with reference to an example of image data of an input image shown in FIGS. 14 to 16 and the flowcharts shown in FIGS. 17 to 25.

The process explained below is mainly effected by the CPU 23a of the CPU section 23.

First, in the step S41, color components of the background plate 9 are measured in a plurality of positions in the areas (searched areas) of the input image stored in the main memory 23b and then the step S42 is effected. In the step S42, whether or not the result of measurement in the step S41 indicates a color component suitable for the background plate 9 is checked and then the step S43 is effected. At this time, a non-bluish background (which is not a blue background) is determined as a portion of a face image of the to-be-photographed person 1.

In the step S43, a head top height position detecting process which will be described later is effected to derive the vertical line number of the vertical head top: "head top" and then the step S44 is effected. In the step S44, whether or not the head top position lies within a specified range is checked and then the step S45 is effected.

In the step S45, the central position of the face in the horizontal direction, which will be described later, is detected from the head left position and the head right position. The horizontal line number of the face center position:"Center" are thereby obtained. The step S46 is then performed. In the step S46, it is determined whether or not the face center position lies within a specified range. The process advances to the step S47. In the step S47, the contour 42 is detected from the head left position, head right position, head top position, and average number of lines (FACE SIZE) of the person photographed.

In the step S47, the intersecting position between the horizontal line number: "Center" and the vertical line number: "head top" is set as the face contour reference position and then the step S48 is effected. In the step S48, the result of the process is set to "the face contour range is within the specified range". The process goes to the step 24.

The results of the processes effected in the steps S42, S44 and S46 are NG. If so, the contour area 42 of the face is found to fall outside the specified range. In this case, the process goes to the step S49.

The detection of the area (i.e., searched area), effected in the step S41, and the detection of the head top position and contour area 42 of the face, performed in the step S43, will be described in greater detail.

Of the input image 41 of the person 1 to be photographed, the face of the person 1 is an upper part unless the person stands on his or her hands. Above the face there is located the upper part of the blue background.

Figure 18:
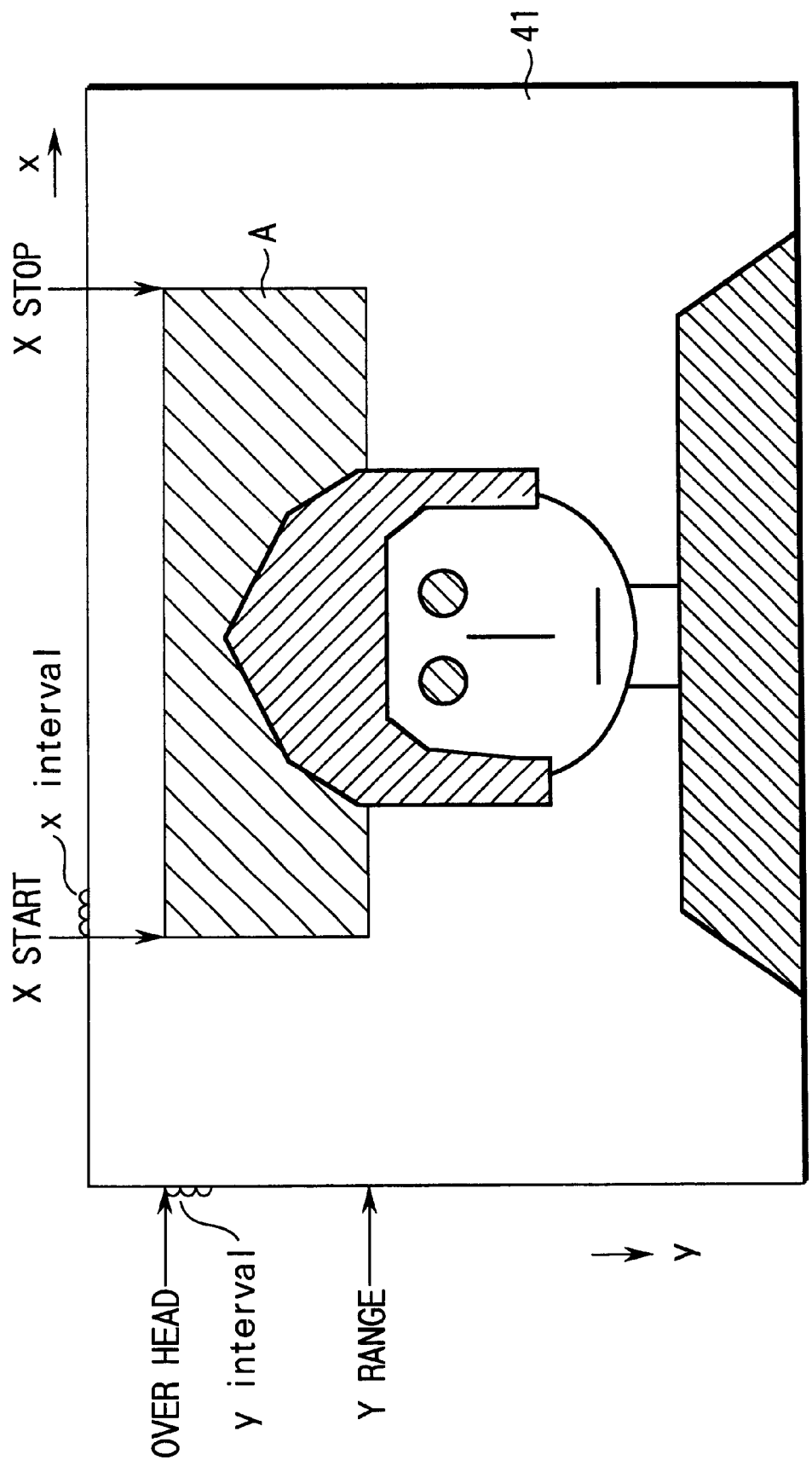
FIG. 18 is a diagram showing a region of an image input to the second embodiment, which is searched for a specific part of the image.

In view of this fact, the upper and lower parts of the input image 41 are excluded from the searched area A. The parameters used to exclude these parts of the image 41 from the area A will be described, with reference to FIG. 18. As shown in FIG. 18, the parameter for excluding the upper part is OVER HEAD, and the parameter for excluding the lower part is Y RANGE.

Since the person 1 is seated in front of the camera 3, a horizontal motion, if any, of the person 1 is small, falling within a range. The left and right end parts of the image 41 are excluded from the searched area A if the image 41 is a landscape one.

The parameter for excluding the left and right end parts of the image 41 will be described, with reference to FIG. 18, too. As shown in FIG. 18, the parameter for excluding the left end part of the image 41 is X START, the parameter for excluding the right end part of the image 41 is X STOP.

The image of the person 1, included in the input image 41, is almost continuous. In view of this, the following parameters are set:

Intervals of searching for pixels in horizontal (X) direction: x interval

Intervals of searching for pixels in vertical (Y) direction: y interval

Figure 19:
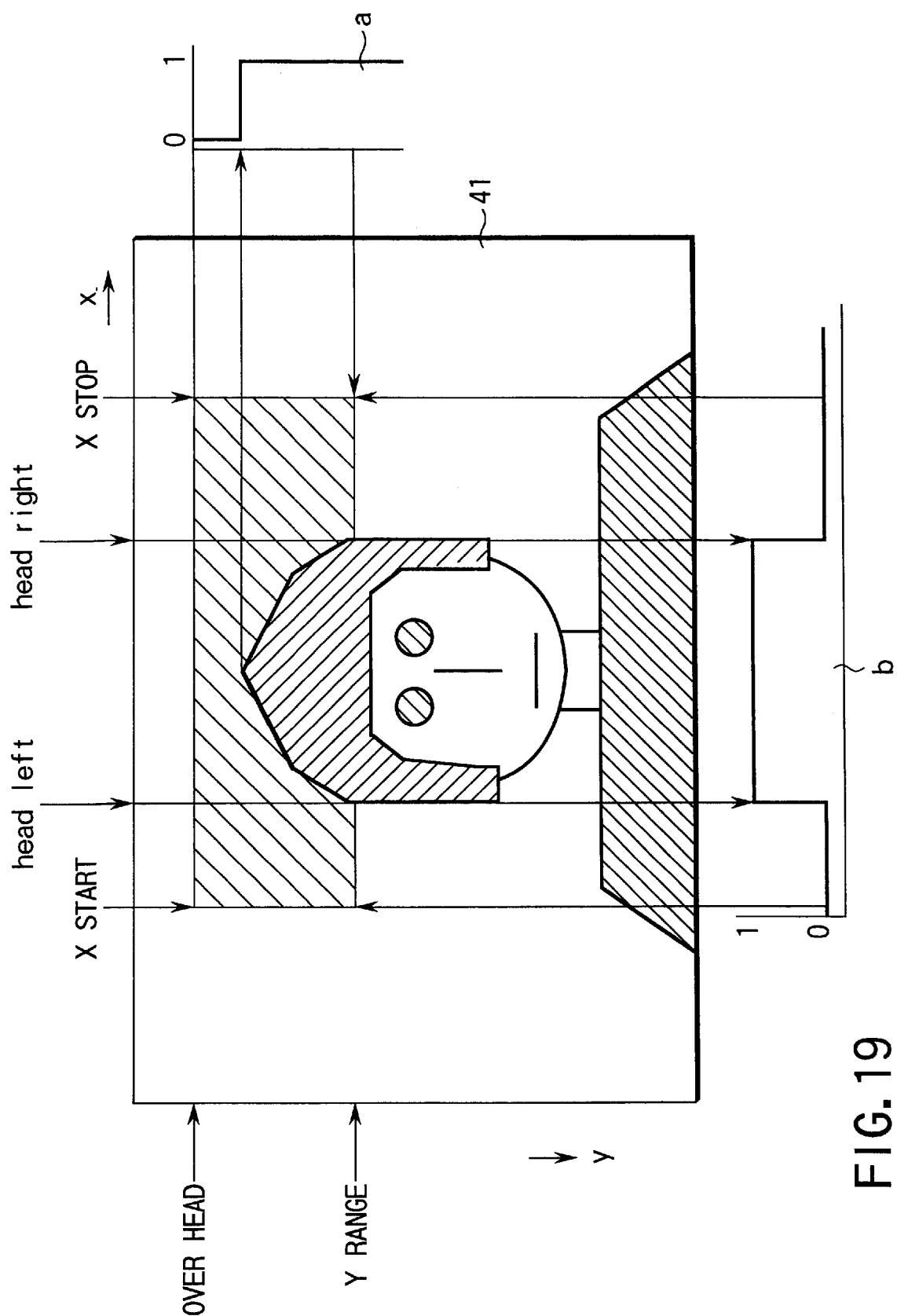
FIG. 19 is a diagram showing a line passing a part of the image of the person to be photographed, and a line not passing any part of the image of that person.

Any line in the area A that does not pass the image of that person 1 has a binary value of "0," and any line in the area A that passes the image of that person 1 has a binary value of "1." Therefore, as shown at "a" in FIG. 19, data of "0, 0, 0, 0 . . . 0, 1, 1, 1, . . . " is obtained, in which bits are arranged in the ascending order of "0" and "1."

The first half of the data can be regarded as one consisting of bits arranged in the ascending order in the horizontal (X) direction. The other half of the data can be regarded as one consisting of bits arranged in the descending order in the horizontal (X) direction. Assume any line in the area A that does not pass the image of that person 1 has a binary value of "0" and that any line in the area A that passes the image of that person 1 *has a binary value of* "1." Then, data of "0, 0, 0, 0 . . . 0, 1, 1, 1, . . . 1, 1, 1, 0, 0, . . . 0, 0, 0" is obtained, as is illustrated at b in FIG. 19.

Figure 20:
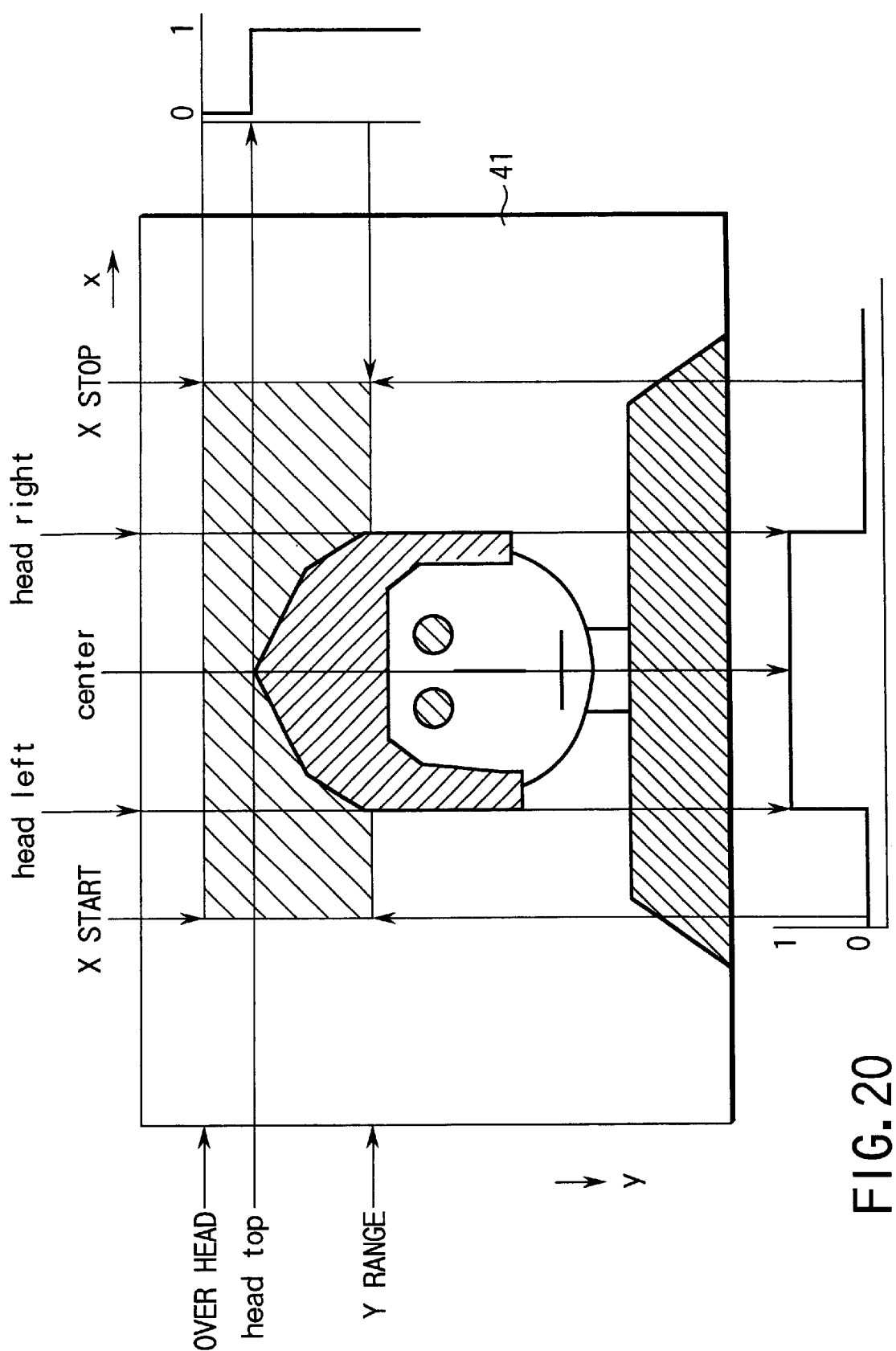
FIG. 20 is a diagram showing the top and left side of the head of the person to be photographed, and the center of the face of that person, all included in the image input to the second embodiment.

As a result, as sown in FIG. 20, the line on which the binary value changes from "0" to "1" in the Y direction is detected as the head top (the position of the head: head-top vertical line number). The vertical line on which the binary value changes from "0" to "1" in the X direction is detected as the left side of the head (head left). The vertical line on which the binary value changes from "1" to "0" in the X direction is detected as the right side of the head (head right).

The vertical line that passes the midpoint between the vertical lines detected as the left and right sides of the heat is detected as one that passes the center of the face.

Any line on which the binary value changes can be detected by searching the area A, from one side thereof. The area A may be divided into two halves, and these halves may be searched at the same time, because the data, which is searched for, consists of bits arranged in the ascending (or descending) order of the binary value. In this case, the line can be detected with higher efficiency.

Figure 21:
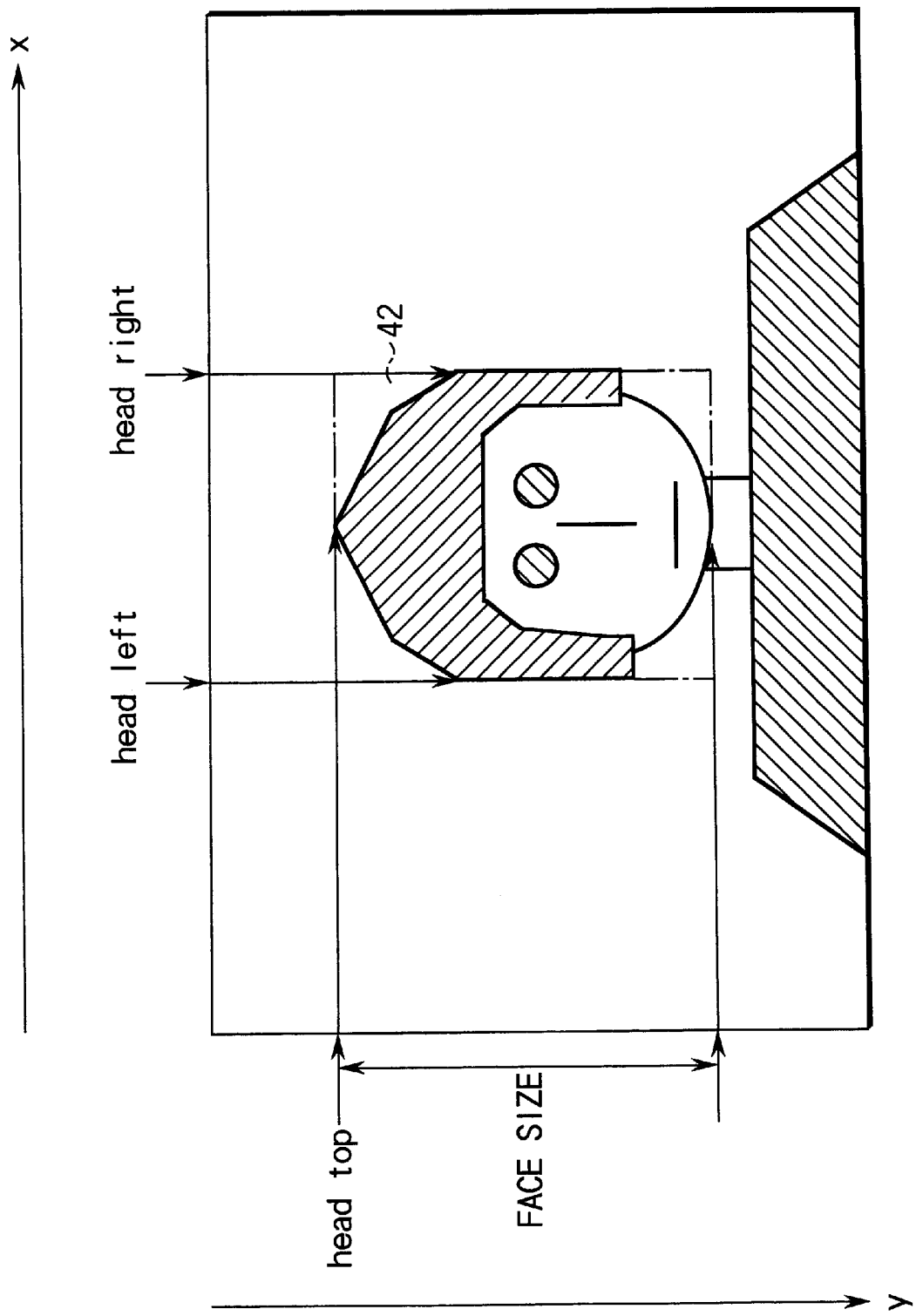
FIG. 21 is a diagram showing the face region of the image input to the second embodiment.

The face contour area 42 is detected from the left side of the head (head left), the right side of the head (head right), the top of the head (head top), and the FACE SIZE (i.e., the average number of lines of the face length of people), as is illustrated in FIG. 21.

The specified range of the face contour area 42 is determined based on the values of the horizontal line number: "Center" and the vertical line number: "head top" for defining the face contour reference position and is a range from which the trimming size can be acquired as a photograph size with the face set at the center and it can be expressed as follows.

$X$ FMG SISE/2<center<($X$ STILL SISE–$X$ FMG SISE/2)

OVER HEAD<head top<($Y$ STILL SISE–$Y$ FMG SISE+OVER HEAD)=$Y$ RANGE

Figure 22:
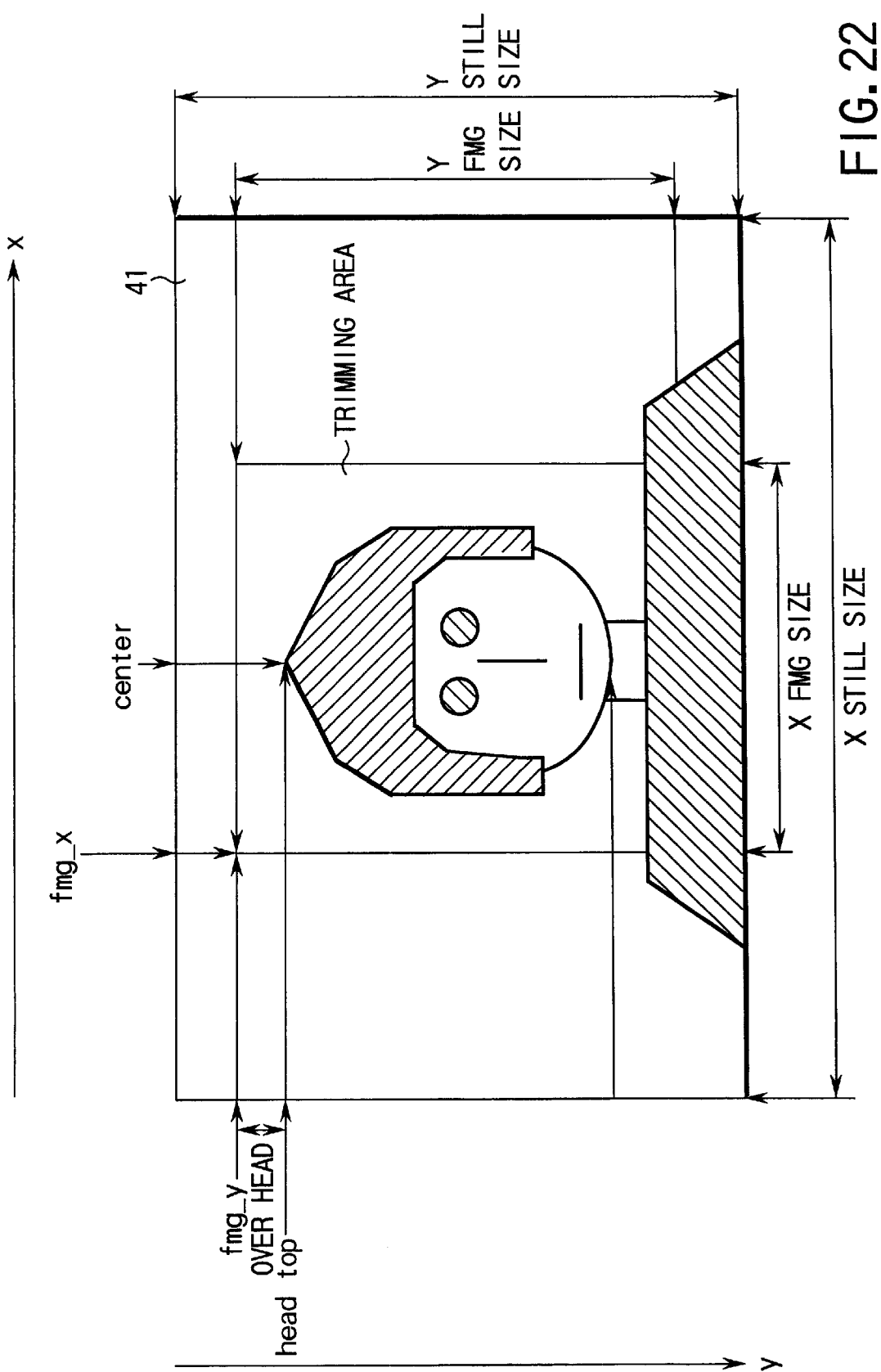
FIG. 22 is a diagram explaining how to define the face region of the image input to the second embodiment.

That is, as shown in FIG. 22, the center of the face (center) exists in an area the left side of which is half the framing area (trimming area) X FMG SIZE from the left side of the input image 41 and the right side of which is half the difference between the line number X STILL SIZE and the framing area X FMG SIZE from the right side of the input image 41. Further, as shown in FIG. 22, too, the top of the head (head top) exists in an area the upper side of which is the line number OVER HEAD from the upper side of the input image 41 and the lower side of which is the difference between the line number Y STILL SIZE and the framing area Y FMG SIZE from the lower side of the input image 41.

In FIG. 22, fmg-x and fmg-y are the X-ordinate Y-ordinate of the upper-left trimming corner of the input image 41, respectively.

Next, the head top height position detecting process in the step S43 will be explained with reference to the image data shown in FIG. 23.

First, in the step S51, it is confirmed that the head top portion of the to-be-photographed person 1 lies within the specified range ("OVER HEAD+1 line" to "Y RANGE line") in which at least the head top portion of the to-be-photographed person 1 may exist.

The number of pixels (that is, the face portion of the to-be-photographed person 1) whose color is different from the color component of the background plate 9 among the pixels constituting the horizontal line of the vertical line number: "OVER HEAD" of the input image is counted and whether or not the counted number is larger than a specified value is checked.

Likewise, whether or not the number of pixels whose color is different from the color component of the background plate 9 among the pixels constituting the horizontal line of "Y RANGE" is larger than a specified value is checked and it is confirmed that the number of pixels whose color is different from the color component of the background plate 9 and which lie on the OVER HEAD line is smaller than the specified value and the number of pixels whose color is different from the color component of the background plate 9 and which lie on the Y RANGE line is equal to or larger than the specified value.

The specified value is set to such a numerical value that an unusual portion can be neglected in a case where the to-be-photographed person 1 has her hair disordered in the horizontal direction or a foreign matter whose color is different from the color of the background plate 9 is attached thereto.

The vertical line number: "OVER HEAD" in the input image is set to i, "Y RANGE" is set to j and then the step S52 is effected. In the step S52, "OVER HEAD" is set to i, "Y RANGE" is set to j and the step S53 is effected.

If it is confirmed in the step S53 that at least one line exists between the i line and the j line, the step S54 is effected. In the step S54, the central line (i+j)/2 between the i line and the j line is set to k and then the step S55 is effected.

In the step S55, the number of pixels whose color is different from the color component of the background plate 9 among the pixels constituting the kth horizontal line is counted and whether or not the counted number is equal to or larger than a specified value is determined. The specified value is set to such a numerical value that an unusual portion can be neglected in a case where the to-be-photographed person 1 has her hair disordered in the horizontal direction or a foreign matter whose color is different from the color of the background plate 9 is attached thereto.

If the result of determination in the step S55 is "YES", k is set to j in the step S56 and the process returns to the step S53. If the result of determination in the step S55 is "NO", k is set to i in the step S57 and the process returns to the step S53.

Thus, the searching area is halved for each processing loop starting from a searching area from the "OVER HEAD" of the input image to "Y RANGE" and then the step S58 is effected when (j–i) becomes smaller than 1 (when the difference in line number decreases to zero). That is, when the result of determination in the step S53 is "NO", the process goes to the step S58.

In the step S58, i of the head-top X line (X coordinate) at the left end of the face is set to "head top" and the step S59 is effected. In the step S59, the head top position is set within the specified range as the result of the process. The process goes to the step S44.

If the result of determination in the step S51 is "YES", the step S60 is effected. In the step S60, the head top position is set outside the specified range as the result of the process. The process goes to the step S44.

Figure 17:
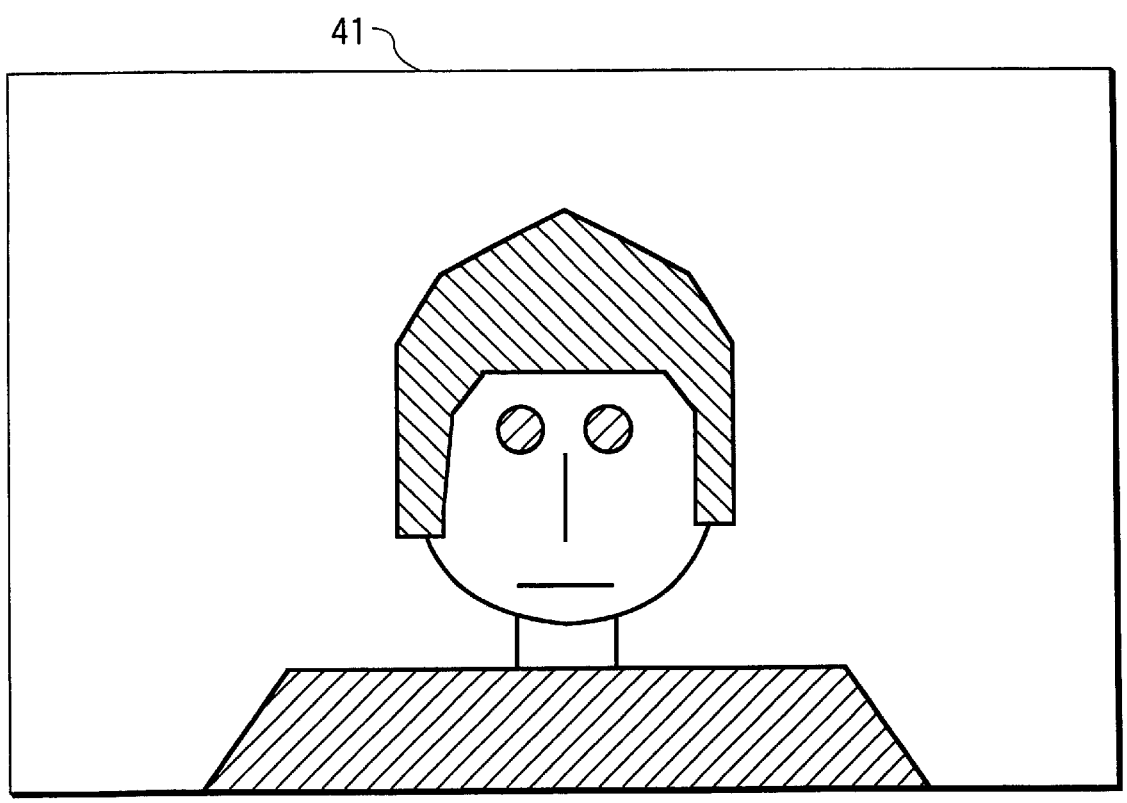
FIG. 17 is a diagram illustrating an image represented by the image data input to the second embodiment.
Figure 24:
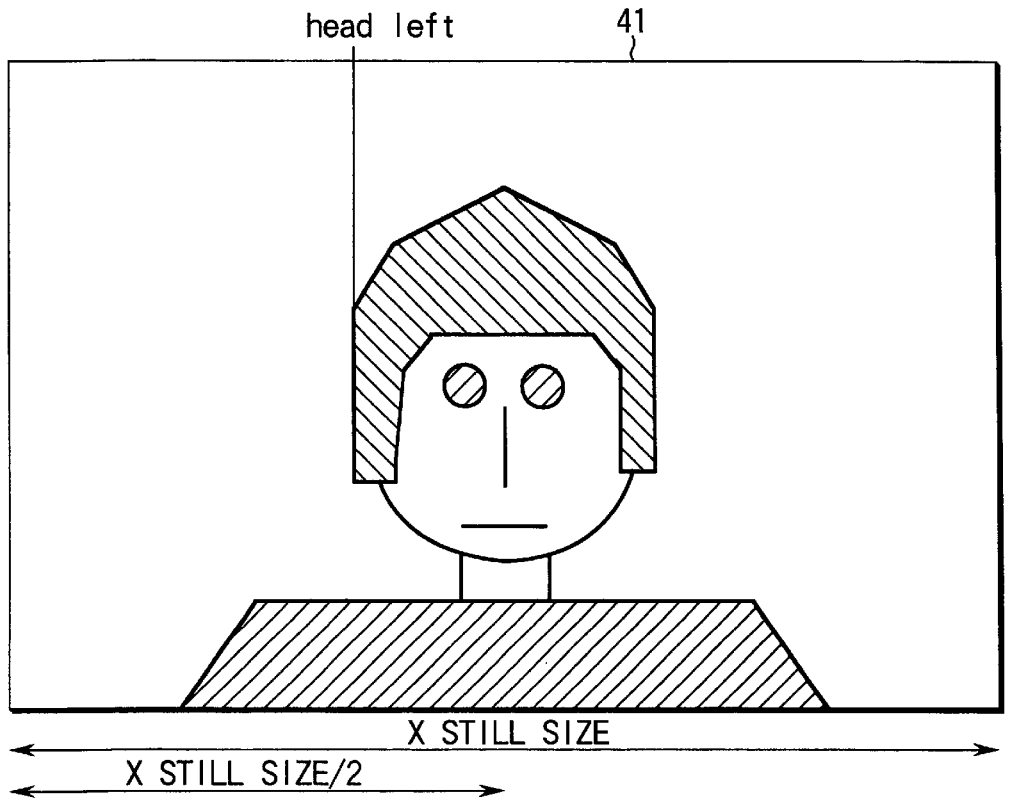
FIG. 24 is a diagram explaining the process of detecting a vertical line (head left) extending along the left side of the head of the person to be photographed, included in the image input to the second embodiment.

Next, a process for detecting the central position of the face in the horizontal direction in the step S45 is explained with reference to the flowchart shown in FIG. 17 and the image data shown in FIGS. 24 to 26.

First, in the step S61, the vertical line number "0" at the left end of the input image is set to i, the vertical line number (X STILL SIZE/2) at the center of the input image is set to j and then the step S62 is effected. In the step S62, whether or not at least one line exists between the i line and the j line is determined, and if the result of determination is "YES", the step S63 is effected.

In the step S63, the vertical line (i+j)/2 at the center between the i line and the j line is set to k and then the step S64 is effected. In the step S64, the number of pixels whose color is different from the color component of the background plate 9 measured in the step S41 among the pixels constituting the kth vertical line is counted and whether or not the counted value is equal to or larger than a specified value is determined. The specified value is set to such a numerical value that an unusual portion can be neglected in a case where the to-be-photographed person 1 has her hair disordered in the horizontal direction or a fine foreign matter whose color is different from the color of the background plate 9 is attached thereto.

If the result of determination in the step S64 is "YES", k is set to j in the step S65 and the process returns to the step S62. If the result of determination in the step S64 is "NO", k is set to i in the step S66 and the process returns to the step S62.

Thus, the searching area is halved for each processing loop starting from a searching area of the left half of the input image and then the step S67 is effected when (j–i) becomes smaller than 1, that is, when the result of determination in the step S62 is "NO".

In the step S67, i is set to the vertical line at the left end of the face: "head left" when it is determined in the step S62 that (j–i) becomes smaller than 1 and the step S68 is effected.

Figure 25:
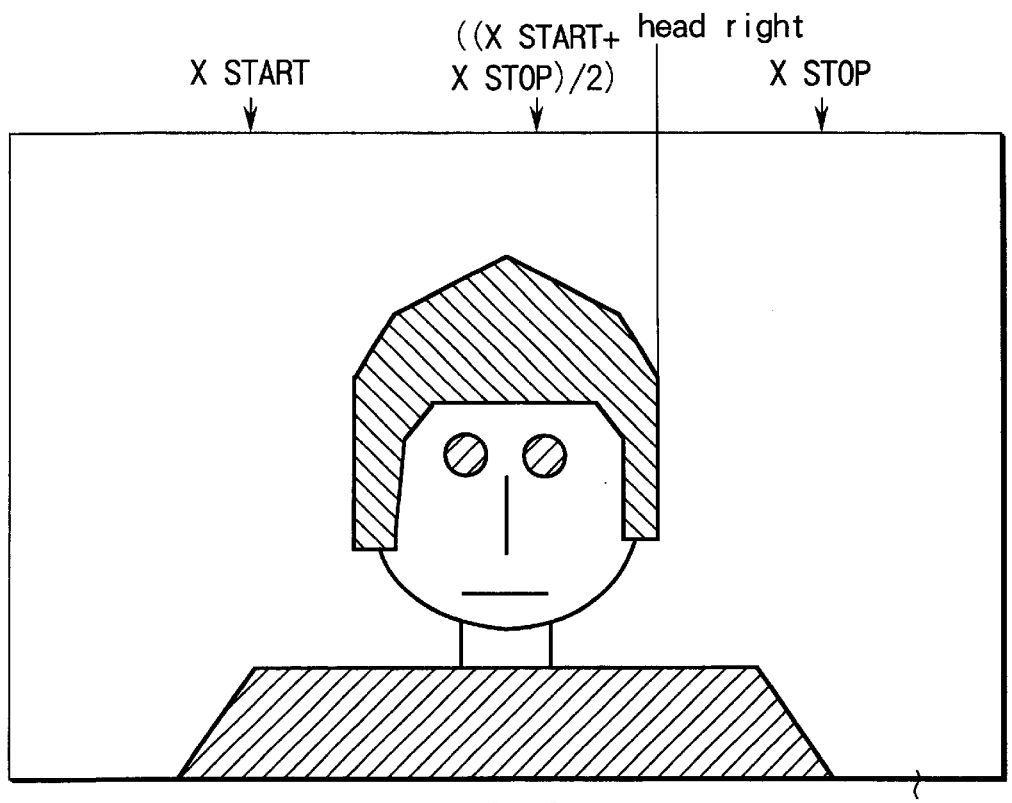
FIG. 25 is a diagram explaining the process of detecting a vertical line (head right) extending along the right side of the head of the person to be photographed, included in the image input to the second embodiment.
Figure 26:
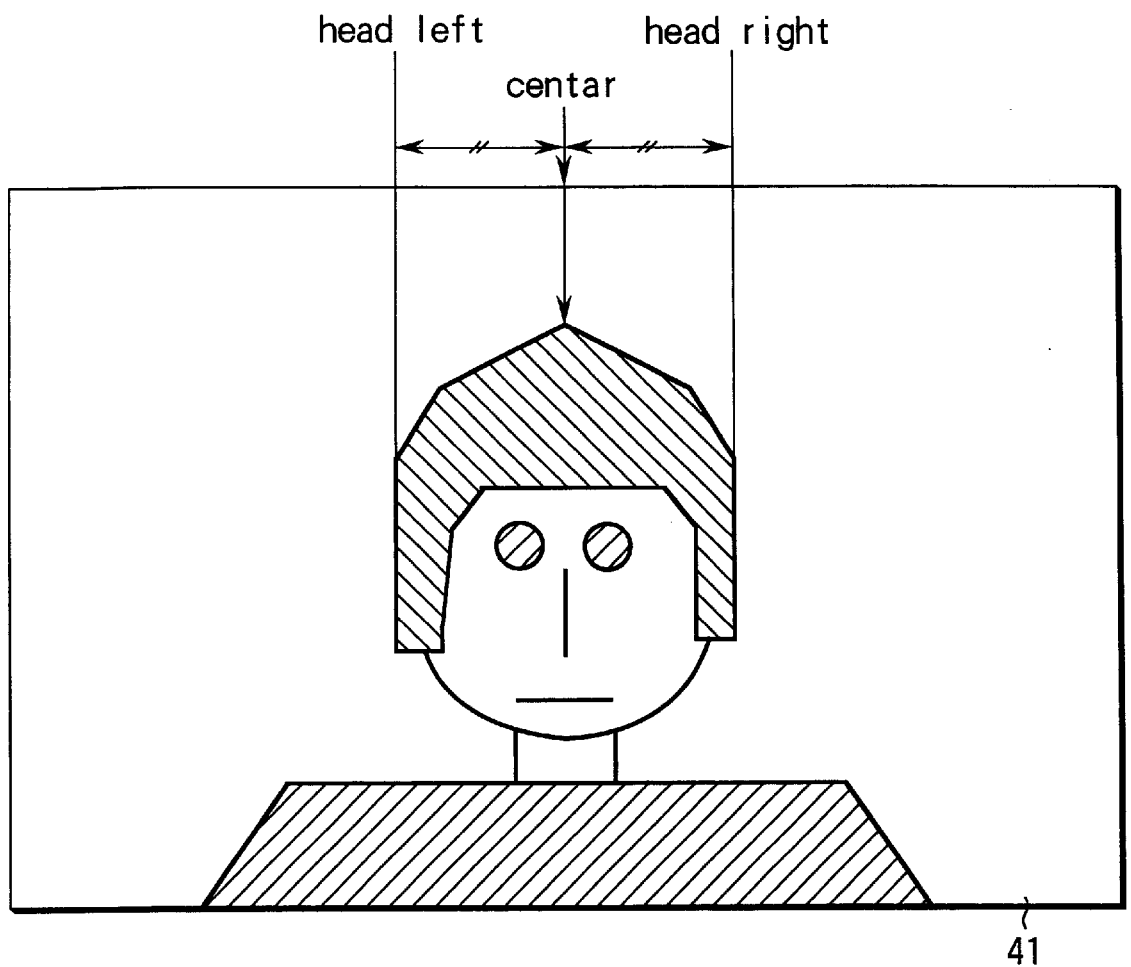
FIG. 26 is a diagram explaining the process of detecting the center of the face of the person to be photographed, included in the image input to the second embodiment.

In the step S68, the vertical line number at the center of the input image ((X START+X STOP)/2) shown in FIG. 25 is set to i, the vertical line number at the right end of the input image (X STOP) is set to j and the step S69 is effected. In the step S69, whether or not at least one line exists between the i line and the j line is determined, and if the result of determination is "NO", the step S70 is effected.

In the step S70, the vertical line (i+j)/2 at the center between the i line and the j line is set to k and then the step S71 is effected. In the step S71, the number of pixels whose color is different from the color component of the background plate 9 measured in the step S41 among the pixels constituting the kth vertical line is counted and whether or not the counted value is equal to or larger than a specified value is determined. The specified value is set to such a numerical value that an unusual portion can be neglected in a case where the to-be-photographed person 1 has her hair disordered in the horizontal direction or a fine foreign matter whose color is different from the color of the background plate 9 is attached thereto.

If the result of determination in the step S71 is "YES", k is set to i in the step S72 and the process returns to the step S69. If the result of determination in the step S71 is "NO", k is set to j in the step S73 and the process returns to the step S69.

Thus, the searching area is halved for each processing loop starting from a searching area of the right half of the input image and then the step S74 is effected when (j–i) becomes smaller than 1, that is, when the result of determination in the step S69 is "YES".

In the step S74, i is set to the vertical line at the right end of the face: "head right" when it is determined in the step S69 that (j–i) becomes smaller than 1 and the step S75 is effected. In the step S75, as shown in FIG. 26, the central position is derived based on "head left" set in the step S67 and "head right" set in the step S74, the derived value is set as a value of "center". The process goes to the step 46.

The face contour area 42 containing the hair style of the to-be-photographed person 1 detected in the step S23 is determined by the contour reference position ("center", "head top") of the face, "head left": the left side position of the head, "head right": the right side position of the head, "FACE SIZE": the average number of lines of the longitudinal lengths of the faces of a plurality of to-be-photographed persons 1.

Figure 27:
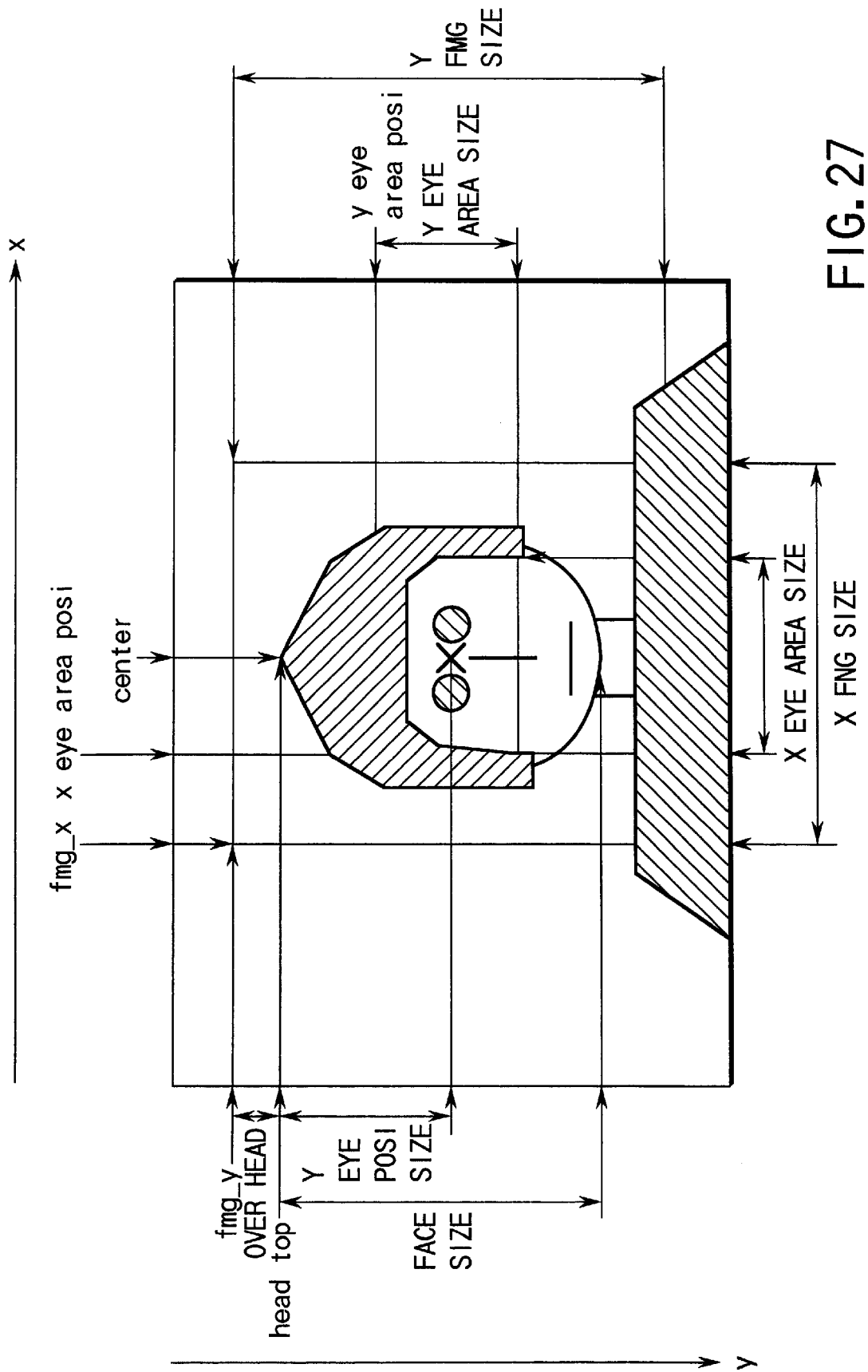
FIG. 27 is a view showing a range in which both of the pupils will exist based on the contour reference position of the face with respect to the input image in the second embodiment.

As shown in FIG. 18, as the area 43 in which both of the pupils will exist without fail in the step S21, an area defined as shown in FIG. 27 by an x-coordinate: "x eye area posi" and y-coordinate: "y eye area posi" which indicate the left top point, the size in the horizontal direction: "X EYE AREA SISE" and the size in the vertical direction: "Y EYE AREA SISE" based on the contour reference position ("center", "head top") of the face is derived. The x-coordinate: "x eye area posi" and y-coordinate: "y eye area posi" are expressed by the following equations.

$$x \text{ eye area posi} = \text{center} - (X \text{ EYE AREA } SISE/2)$$

$$y \text{ eye area posi} = \text{head top} + Y \text{ EYE POSI SIZE} - (Y \text{ EYE AREA } SISE/2)$$

That is, the X-direction ordinate (x eye area posi) of the left side of the face contour area 42 is obtained by subtracting half the width (the line number: X EYE AREA SIZE) of the area 42, which is a known value, from the center (i.e., the X-direction ordinate of the face contour reference position). The Y-direction ordinate (y eye area posi) of the upper side of the face contour area 42 is obtained by adding the average number of lines (Y EYE POSI SIZE), existing between the top of the head and the pupils, to the head top (i.e., the Y-direction ordinate of the face contour reference position) and by subtracting, from the sum, half the height of the area 43 (i.e., the line number: Y EYE AREA SIZE), which is a known value.

In the above embodiment, a case wherein the positions of both of the pupils and mouth in the face of the to-be-photographed person 1 are detected based on the photographed face image and the size of the face is measured according to the relation between the detected positions of both of the pupils and the mouth is explained, but this invention is not limited to this case, and it is possible to detect the positions of both of the pupils, nose and mouth in the face of the to-be-photographed person 1 based on the photographed face image and measure the size of the face according to the relation between the detected positions of both of the pupils, nose and mouth.

With the conventional face image photographing apparatus, the photographer determines whether the face of a person to be photographed is larger or smaller than the standard size. If the face is larger or smaller than the standard size, the photographer performs zooming, adjusting the image of that person's face to the standard size.

In the case where the photographing cycle is as short as few seconds, it would be hard for the photographer to adjust the size of the image of the face within such a short time. He or she may likely make an error in determining the size of the face image in comparison with the standard size.

If the photographer makes such an error and prints out the photograph on which the face image is too large or too small, he or she needs to call the person, who has already gone, back to the photographing room, so as to take a picture of the person again. This results in wasting of time and material (photographic paper, etc.).

The second embodiment of the invention, described above, is free of the problems inherent in the conventional face image photographing apparatus. The second embodiment determines the size of the face image included in the input image of the person 1 and automatically perform zooming, if necessary, to adjust the size of the face image to the standard size.

Third Embodiment

Next, as a third embodiment, a case wherein the photographing possible state is recognized by monitoring the states of the eyes and mouth of a to-be-photographed person 1 and the automatic photographing operation is effected is explained. In this embodiment, the process for deriving the face contour area in the second embodiment is also effected.

Figure 28:
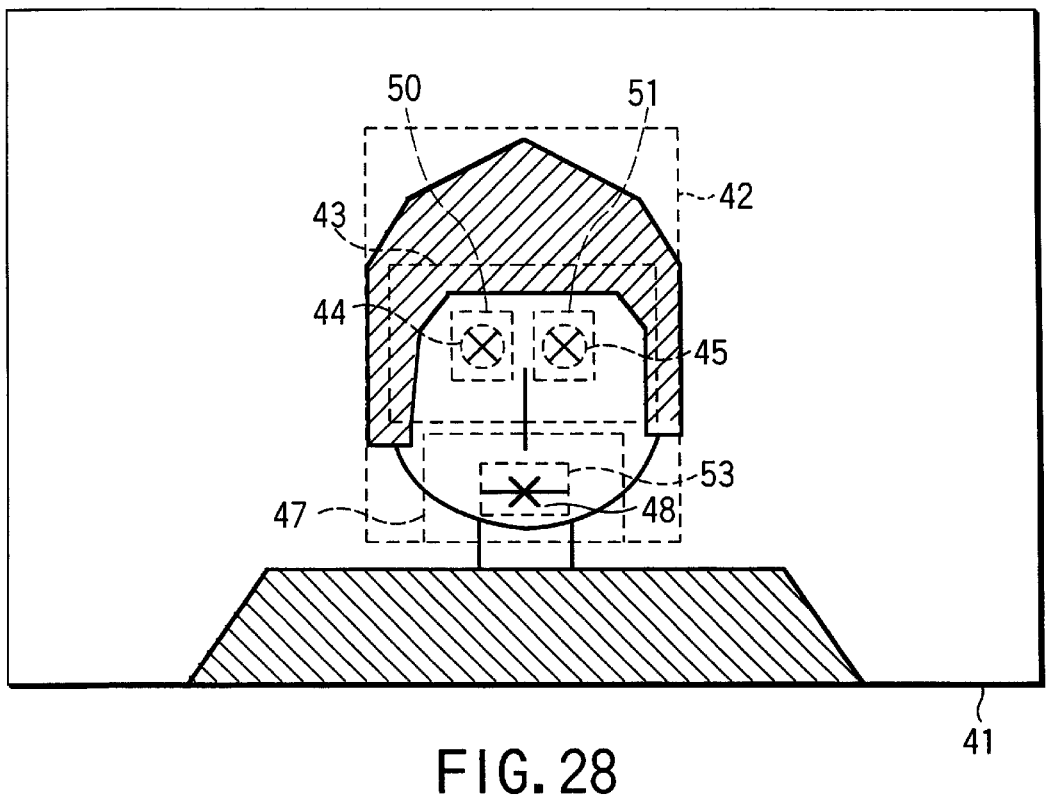
FIGS. 28 and 29 are views showing an input image from a camera in a third embodiment, and areas and coordinates used in each processing time during the photographing process.
Figure 29:
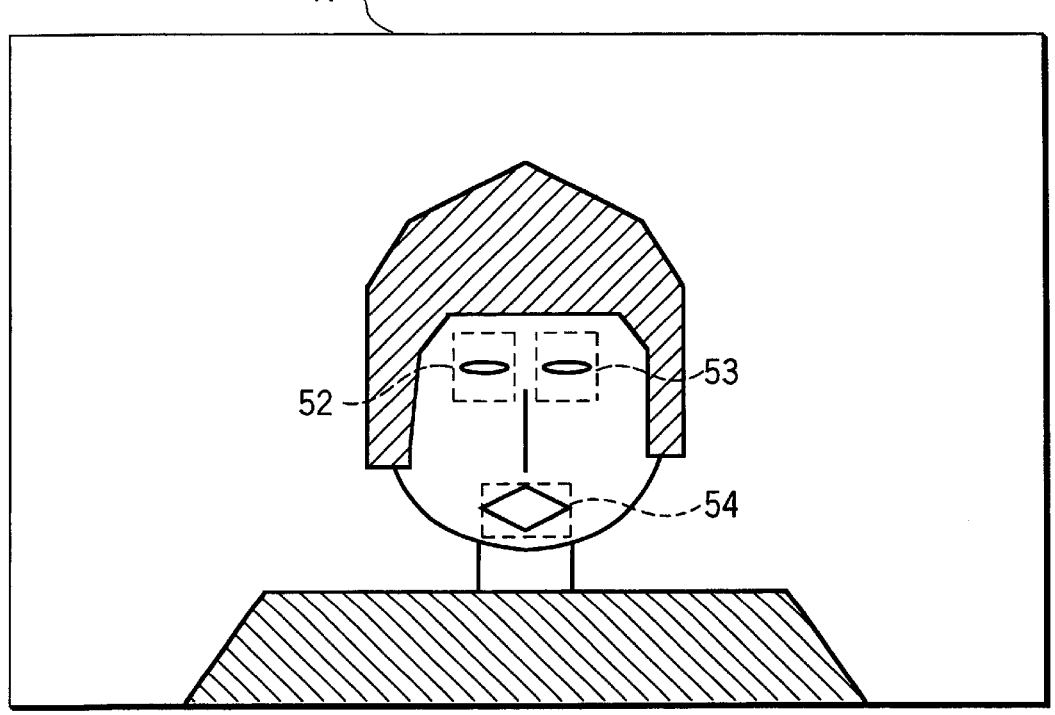

FIGS. 28 and 29 show an input image (face image) from a camera 3 and areas and coordinates used in processes effected in the photographing process.

Figure 30:
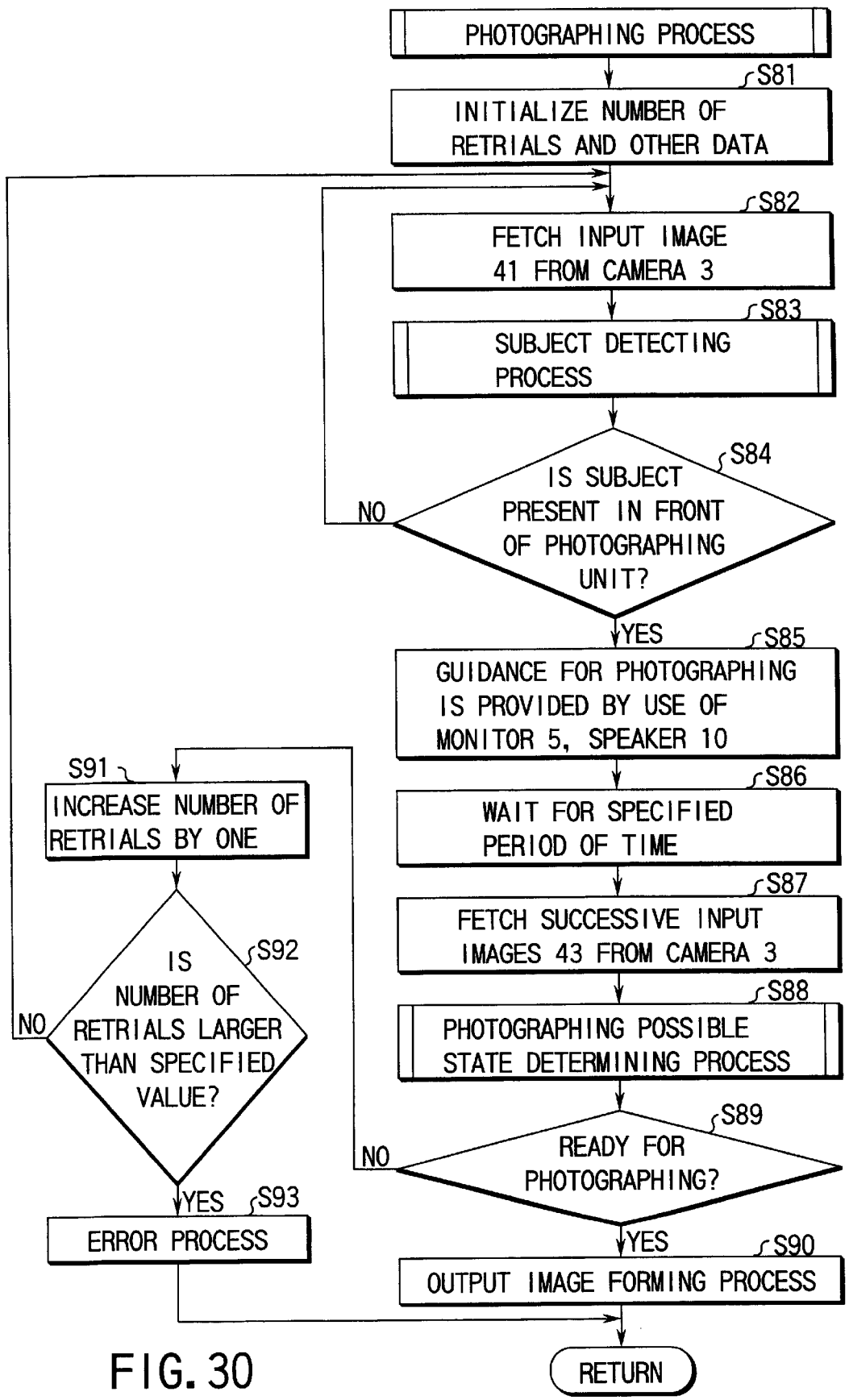
FIG. 30 is a flowchart for illustrating the processing operation in the third embodiment.

The processing operation of the present apparatus is explained with reference to FIGS. 28 and 29 and the flowchart of FIG. 30. The process explained below is mainly effected by the CPU 23*a* of the CPU section 23.

First, in the step S81, the number of retry processes counted by a counter (not shown) and other data are initialized and the step S82 is effected. In the step S82, an input image 41 from the camera 3 is fetched via a video capture section 21 and temporarily stored into the main memory 23*b* of the CPU section 23 and the step S83 is effected.

In the steps S83, S84, the detecting process for detecting whether the to-be-photographed person 1 exists in front of the camera 3 is effected based on the input image 41 in the main memory 23*b*. That is, for example, whether the to-be-photographed person 1 exists or not and whether or not the position of a face contour area 42 containing the hair style of the to-be-photographed person 1 is set within an adequate range for outputting are determined by searching for an area (that is, an area of the to-be-photographed person 1) having pixels whose color is different from the background color in the input image 41. The process of the steps S83, S84 corresponds to to-be-photographed person detecting means in this invention.

If the to-be-photographed person 1 does not exist in front of the camera 3 or if the position of the face contour area 42 lies in an inadequate range, the process returns to the step S82 and the above-described operation is repeated. If the to-be-photographed person 1 exists in front of the camera 3 and the position of the face contour area 42 lies in an adequate range, the step S85 is effected. In the step S85, a guidance message is output by use of a display 5 and speaker 10 to urge the to-be-photographed person 1 in front of the camera 3 to make preparation for photographing and then the step S86 is effected. The process of the step S85 corresponds to photographing guiding means in this invention.

In the step S86, after the image 41 is input, a stand-by state is maintained for a specified period of time which is required for determining whether or not the to-be-photographed person 1 stands still (makes preparation for photographing) in a process for determining the photographing possible state which will be described later and then the step S87 is effected.

In the step S87, an input image 41' which follows the input image 41 is fetched from the camera 3 and temporarily stored into the main memory 23*b* of the CPU section 23 and the step S88 is effected.

In the steps S88, S89, whether or not the to-be-photographed person 1 can make preparation for photographing is determined by effecting the photographing possible state determining process by use of the input images 41 and 41' in the main memory 23*b*. The detail of the photographing possible state determining process is explained later. The process of the steps S88, S89 corresponds to recognizing means in this invention.

If the result of the above determination indicates that the to-be-photographed person 1 is ready for photographing, the step S90 is effected to select one of the input images 41 and 41' which is suitable for outputting of the face image and stored in the main memory 23b of the CPU section 23 and convert the selected image into an image for outputting. The thus obtained image is processed according to the purpose of application together with other personal information of the to-be-photographed person 1. For example, the image is printed and output on a recording medium (such as paper, card) by use of an image printing device 31 connected to the CPU section 23 or an image printing device (not shown) connected to a network 32 via a network adapter 33, or output and stored into an image filing device (not shown) used as image storing means connected to the network 32 or stored into a large-capacity storage device 25, portable storage medium 26 or the main memory 23b in the CPU section 23 by using them as image storing means. Thus, the whole photographing process for one to-be-photographed person is terminated. The process of the step S90 corresponds to selecting means in this invention.

The photographed face image may be printed or stored according to the purpose of application thereof and the outputting method of the face image can be freely selected.

If the result of the above determination indicates that the to-be-photographed person 1 is not ready for photographing, the step S91 is effected and the retry process is effected. First, in the step S91, the number of retry processes is incremented and then the step S92 is effected. In the step S92, whether or not the number of retry processes is smaller than a specified value previously set is determined and if it is smaller than the specified value, the process returns to the step S82 and the process starting from the step S82 is effected as the re-trail process again. The process of the steps S91, S92 corresponds to determining means in this invention.

If the result of determination in the step S92 indicates that the number of retry processes exceeds the specified value, it is determined that the image will be an inadequate image when it is output as an output photograph, the step S93 is effected to effect the error process and the photographing process is terminated. The process of the step S93 corresponds to error processing means in this invention.

Figure 31:
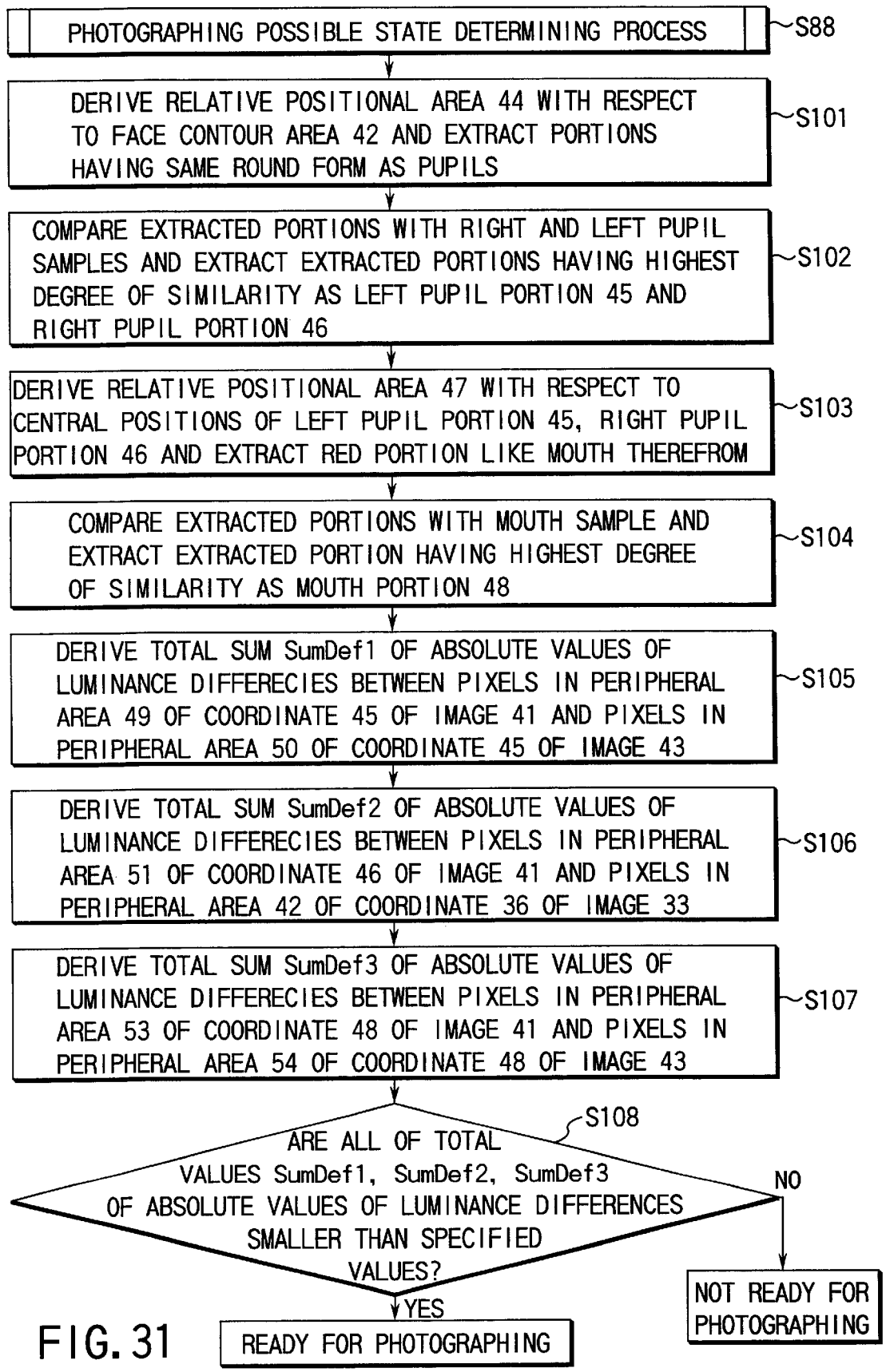
FIG. 31 is a flowchart for illustrating the determination process for the photographing possible state in the third embodiment.

The process of determining the photographing possible state in the steps S88 and S89 (FIG. 21) will explained with reference to FIGS. 28 and 29 and the flowchart of FIG. 31.

First, in the step S101, an area 43 in which both of the pupils will exist without fail is derived as a relative positional area with respect to a face contour area 42 and portions of the same shape as the pupils, for example, black portions of round shape are extracted from the derived area 43.

The area 43 is derived from the average of areas in which both of the pupils exist without fail in face contours in face image data items of hundreds of people, for example.

Next, in the step S102, pupil samples previously registered are compared with the black portions of round shape extracted in the step S101 and the portions having the highest degree of similarity among those which have degrees of similarity larger than a specified value are extracted. Since two pupils exist, the pupil samples are prepared for right and left pupils, the above determination process is effected by comparing the extracted portions with the samples of the right and left pupils and a left pupil portion 44 and right pupil portion 45 are derived.

Next, in the step S103, an area 47 in which a mouth will exist without fail is derived as a relative positional area with respect to the central positions of the left pupil 44 and right pupil 45 extracted in the step S102 and a portion containing reddish pixels like the mouth is extracted from the derived area 47.

The area 47 is derived from the average of areas containing mouths with respect to the central positions between the right and left pupils in face image data items of hundreds of people, for example.

Next, in the step S104, mouth samples previously registered are compared with the portions extracted in the step S103 and a potion having the highest degree of similarity among those which have degrees of similarity larger than a specified value is extracted as a coordinate 48 of a mouth portion. Then, in the step S105, the absolute values of luminance differences between pixels in a specified peripheral area 50 on the left pupil coordinate 44 in the input image 41 of FIG. 28 and an area 52 of the same size on the same coordinate in the input image 41' of FIG. 29 are derived and the total sum SumDef1 in the whole portion of the area is derived.

Then, in the step S106, the absolute values of luminance differences between pixels in a specified peripheral area 51 on the right pupil coordinate 45 in the input image 41 of FIG. 28 and an area 53 of the same size on the same coordinate in the input image 41' of FIG. 29 are derived and the total sum SumDef2 in the whole portion of the area is derived.

Next, in the step S107, the absolute values of luminance differences between pixels in a specified peripheral area 53 on the mouth portion coordinate 48 in the input image 41 of FIG. 28 and an area 54 of the same size on the same coordinate in the input image 41' of FIG. 29 are derived and the total sum SumDef3 in the whole portion of the area is derived.

Next, in the step S108, the total values SumDef1, SumDef2, SumDef3 of the luminance difference absolute values derived in the steps S105 to S107 are compared with specified values respectively set therefor and whether or not they are all equal to or smaller than the respective specified values is determined. If the result of the above determination indicates that all of the three numerical values are equal to or smaller than the respective specified values, it is determined that the photographing possible state is set up, and if at lest one of the three numerical values exceeds the corresponding specified value, it is determined that the photographing possible state is not set.

Since the face and the eyes and mouth which are moving portions in the face are at rest if preparation of the to-be-photographed person 1 for photographing is completed, the above three numerical values are smaller than the respective specified values. On the other hand, if the face moves, the above three numerical values are larger than the respective specified values. If the person blinks, the numerical values SumDef2, SumDef3 are larger than the corresponding specified values. If the to-be-photographed person speaks or the mouth moves, the numerical value SumDef3 is larger than the corresponding specified value.

The specified period of time in the step S86 is movement monitoring time required for the above three numerical values to be numerically expressed when the to-be-photographed person 1 cannot prepare for photographing and some movement occurs.

With the conventional face image photographing apparatus, the photographer determines whether or not the person to be photographed is in a condition to be photographed. If the photographer determines that the person is ready to be photographed, he or she starts photographing that person.

If the photographing cycle is as short as few seconds, however, it would be difficult for the photographer to look at the person while operating the apparatus to determine within such a short time whether or not the person is ready to be photographed. He or she may likely make an error in determining if the person can be photographed.

If the photographer makes such an error and prints out the photograph on which the face image is too large or too small, he or she needs to call the person, who has already gone, back to the photographing room, so as to take a picture of the person again. This results in wasting of time and material (photographic paper, etc.).

The third embodiment of the invention, described above, is free of the problems inherent in the conventional face image photographing apparatus. The third embodiment determines whether or not the person is ready to be photographed, by continuously monitoring the eyes and mouth in a plurality of images obtained by continuously photographing the person. That is, whether the person can be photographed is automatically determined, not by a photographer.

In the above embodiment, a case wherein the photographing possible state of the to-be-photographed person is recognized by monitoring the eyes and mouth of the face of the to-be-photographed person by use of a plurality of fetched images is explained, but this invention is not limited to the above case and it is possible to recognize the photographing possible state of the to-be-photographed person by monitoring the eyes, nose and mouth of the face.

Fourth Embodiment

Next, a case wherein the state of the pupils of a to-be-photographed person 1 is recognized based on a photographed image to determine whether or not the pupils are normally opened is explained as a fourth embodiment. The present embodiment relates to a process effected after the photographing operation. In this embodiment, the process for deriving the face contour area explained in the second embodiment is also effected.

Figure 23:
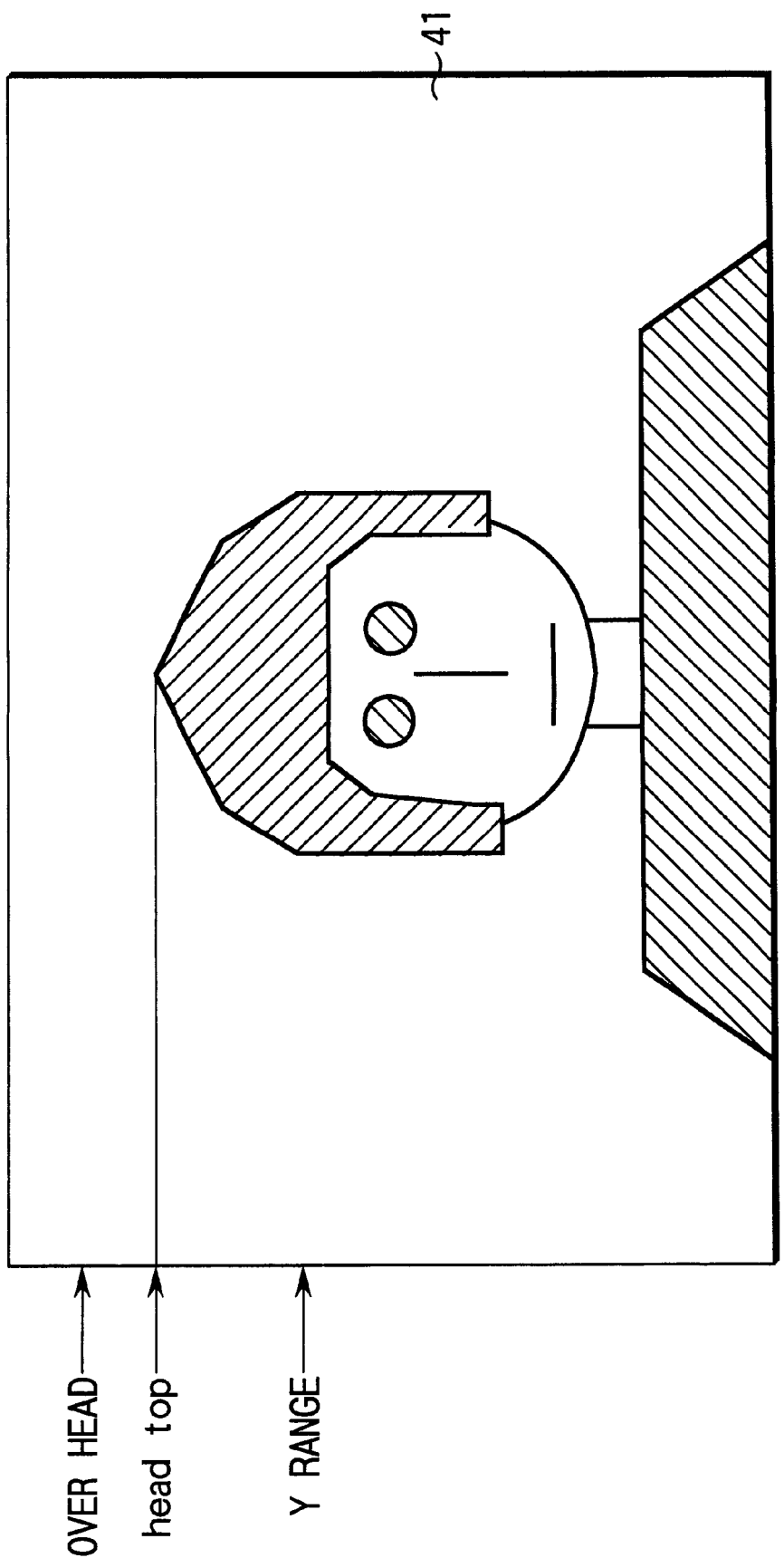
FIG. 23 is a diagram explaining the process of detecting the height of the top of the head of the person to be photographed, included in the image input to the second embodiment.

FIG. 23 shows a state in which an input image (face image) 61 from a camera 3 and an approximate positional area 63 of pupils (eyes) which will lie in a relative position with respect to a contour position 62 of a face in the input image 61 are specified and positional areas 64, 65 of both pupils are extracted from the approximate positional area 63.

Figure 32:
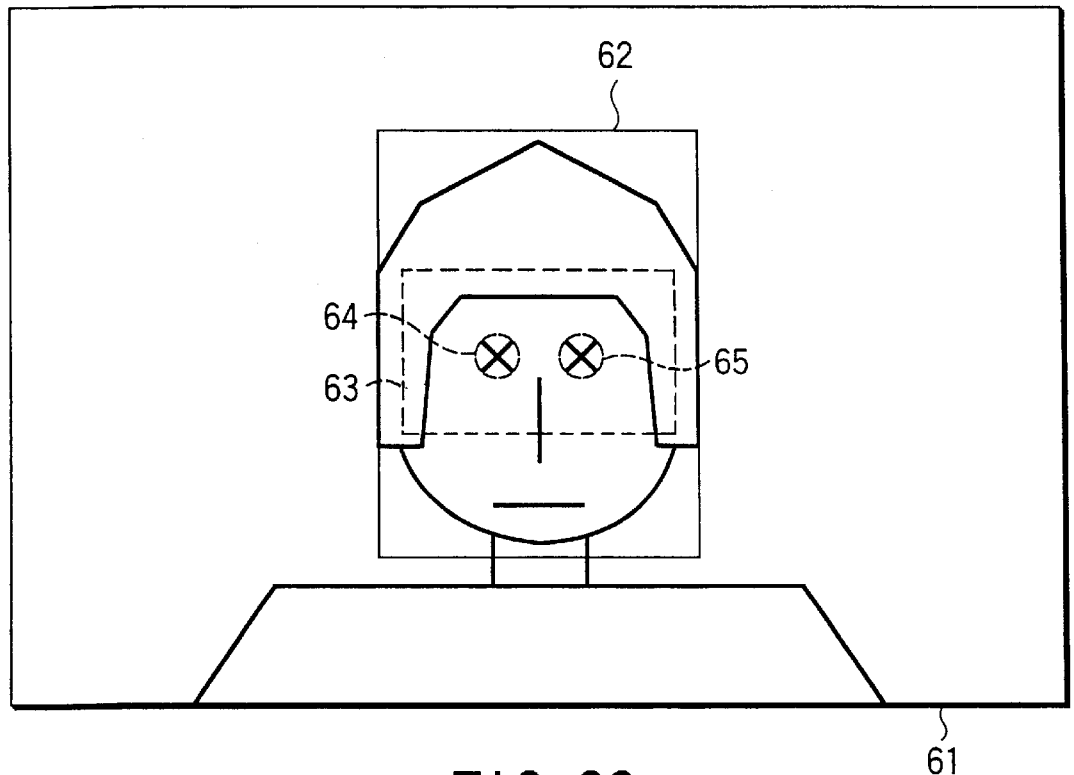
FIG. 32 is a view showing a state in which an input image from a camera and the approximate positional areas of pupils (eyes) which are relative positions with respect to the contour position of a face in the input image in a fourth embodiment are specified and the positional areas of both of the pupils are extracted from the approximate positional areas.
Figure 33:
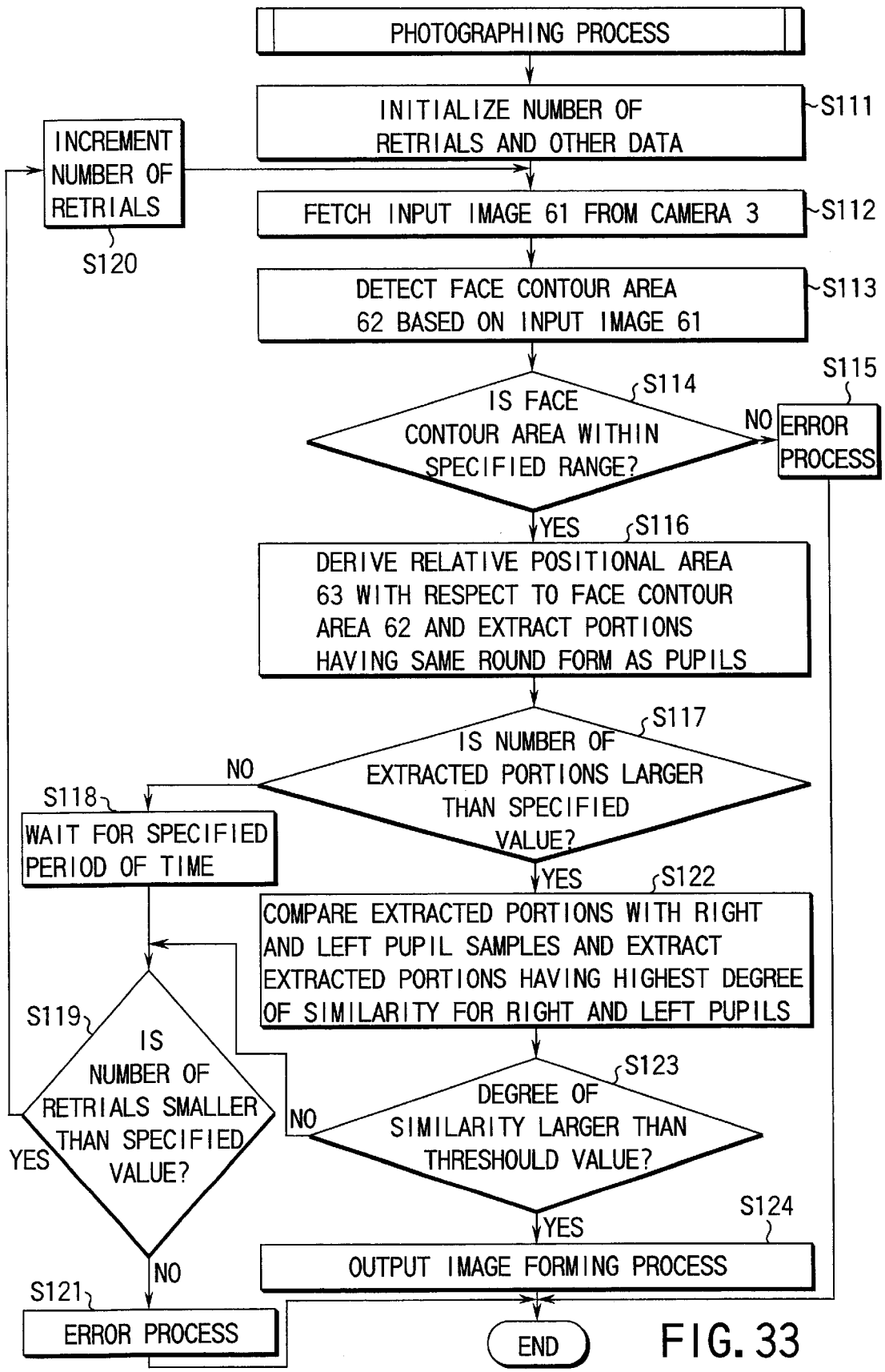
FIG. 33 is a flowchart for illustrating the processing operation in the fourth embodiment.

The processing operation of the present apparatus is explained with reference to FIG. 32 and the flowchart of FIG. 33. The process explained below is mainly effected by the CPU 23a of the CPU section 23.

First, in the step S111, the number of retry processes and other data are initialized and the step S112 is effected. In the step S112, an input image (face image) 61 from the camera 3 is fetched via a video capture section 21 and temporarily stored into a main memory 23b of the CPU section 23 and the step S113 is effected. In the step S113, the face contour area 62 containing the hair style is detected in the input image 61 in the main memory 23b and then the step S114 is effected.

In the step S114, whether or not the detected face contour position 62 lies within a preset specified range is checked and if it lies outside the specified range, the step S115 is effected to effect the error process and the state is returned to the initialized state.

If it is detected in the step S114 that the face contour position lies within the specified range, the step S116 is effected. In the step S116, the approximate positional area 63 of pupils (eyes) which lie in a relative position with respect to the face contour position 62 is derived and the positional areas (64, 65) having the same round form as the pupils are extracted from the approximate positional area 63 and then the step S117 is effected.

The approximate positional area 63 is derived based on the average of areas in which both of the pupils exist without fail with respect to the face contour areas in face image data items of hundreds of people, for example.

In the step S117, whether or not the number of extracted positional areas of round form is equal to or larger than a preset specified value (two) is checked and if the number is smaller than the specified value, it is determined that the pupil is not normally opened and the step S118 is effected. In the step S118, a standby state is maintained for a preset specified period of time (approx. 0.1 second) and then the step S119 is effected.

In the step S119, whether or not the number of retry processes is smaller than a preset specified value is checked and if it is smaller than the specified value, the step S120 is effected. In the step S120, the number of retry processes is incremented and the process returns to the step S112. That is, if the number of retry processes is smaller than the specified value, a standby state is maintained for a specified period of time (approx. 0.1 second) and then the process returns to the step S112 to input a face image as the retry process again.

If it is determined in the step S119 that the number of retry processes is larger than the specified value, the step S121 is effected to effect the error process and the state is returned to the initialized state.

If it is determined in the step S117 that the number of positional areas is not smaller than the specified value, it is determined that the pupils are normally opened and the step S122 is effected. In the step S122, the shapes of the peripheral portions of the extracted positional areas 64, 65 are compared with sample data items of the pupils stored in the main memory 23b in the CPU section 23 to extract the extracted portions having the highest degree of similarity for the right and left pupils and then the step S123 is effected.

In the step S123, whether or not the degree of similarity of the portion having the highest degree of similarity and extracted in the step S122 is higher than a preset threshold value is checked and if it is smaller than the preset threshold value, the step S119 is effected and the retry process which is the same as described before is effected. If it is detected in the step S123 that it is larger than the threshold value, it is determined that the pupils are normally opened and the step S124 is effected.

In this case, since two pupils exist, pupil sample data is prepared for right and left pupils, the above determination process is effected by comparison with the samples of the right and left pupils to recognize the states of the right and left pupils.

In the step S124, the input image fetched or obtained in the step S112 is converted into an image for outputting and processed according to the purpose of application together with other personal information of the to-be-photographed person 1. For example, the image is printed and output on a recording medium (such as paper, card) by use of an image printing device 31 connected to the CPU section 23 or an image printing device (not shown) connected to a network 32 via a network adapter 33, or stored into an image filing device (not shown) used as image storing means connected to the network 32 or stored into a large-capacity storage device 25, portable storage medium 26 or the main memory 23b in the CPU section 23 by using them as image storing means. Thus, the whole photographing process is terminated.

The face image may be printed or stored according to the purpose of application thereof and the outputting method of the face image can be freely selected.

If the to-be-photographed person 1 blinks or closes her eyes when the to-be-photographed person 1 is photographed, this state is determined in the process of the steps S116, S117 and a standby state is maintained until the pupils are opened while the retry process is being effected.

Further, in a case where the to-be-photographed person 1 opens her pupils but the pupils are not normally opened, for example, she looks aside or does not directly look at the camera, this state is determined in the process of the steps S122, S123 and a standby state is maintained until the pupils are normally opened. Further, the process of the steps S122, S123 is effected as a correction process for erroneous determination made in the process of the steps S116, S117. In addition, the process of the steps S122, S123 is effected for unusually opened pupils (surprisingly big round eyes) which cannot be determined in the process of the steps S116, S117 to effect the retry process.

With the conventional face image photographing apparatus, the photographer examines the image to see if the person's pupils were opened or the person blinked at the moment of photographing. If the image is found to be an undesirable one, the photographer has to repeat the photographing process.

If the photographing cycle is as short as few seconds, however, it would be difficult for the photographer to examine the image within such a short time. He or she may likely make an error in examining the image.

If the photographer makes such an error and prints out a photograph showing the person blinking, he or she needs to call the person, who has already gone, back to the photographing room, so as to take a picture of the person again. This results in wasting of time and material (photographic paper, etc.).

The fourth embodiment of the invention, described above, is free of the problems inherent in the conventional face image photographing apparatus. The fourth embodiment determines whether or not the image is an undesirable one because, for example, the person blinked when photographed, and automatically discard any image found to be undesirable. Thus, the fourth embodiment outputs the best possible images.

As described above, it is possible to automatically remove an image which contains closed eyes and is not adequate as an output photograph and always output the best image.

Fifth Embodiment

Next, a case wherein some image data items of a plurality of successive frames are stored and one image from the stored images is selected as the result of photographing is explained as a fifth embodiment.

Figure 34:
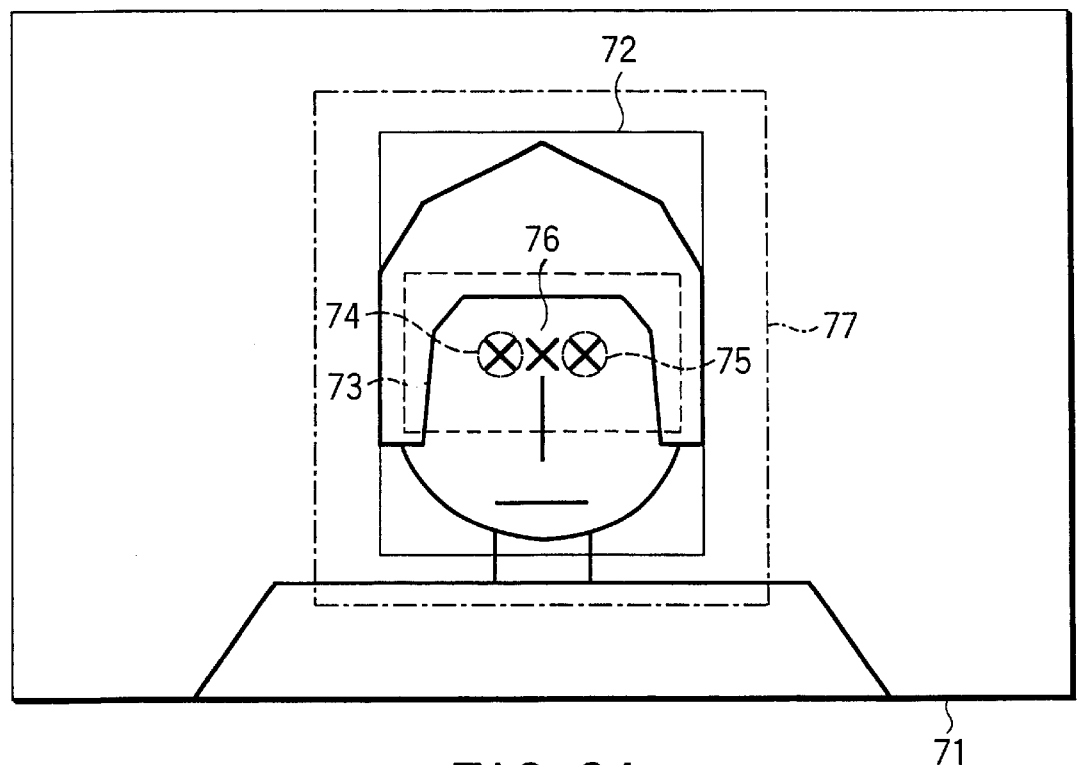
FIG. 34 is a view showing a state in which an input image from a camera and the approximate positional areas of pupils (eyes) which are relative positions with respect to the contour position of a face in the input image in a fourth embodiment are specified, the positional areas of both of the pupils are extracted from the approximate positional areas, and an image cut-out area is determined based on the relative position with respect to the central position (coordinates) of the positional areas of the pupils.

FIG. 34 shows a state in which an input image (face image) 71 from a camera 3 and an approximate positional area 73 of pupils (eyes) which lie in relative positions with respect to a face contour position 72 in the input image 71 are specified, positional areas 74, 75 of the pupils are extracted from the approximate positional area 73, and an image cut-out area 77 is determined based on the relative position with respect to a central position (coordinates) 76 of the positional areas 74, 75 of the pupils.

Figure 35:
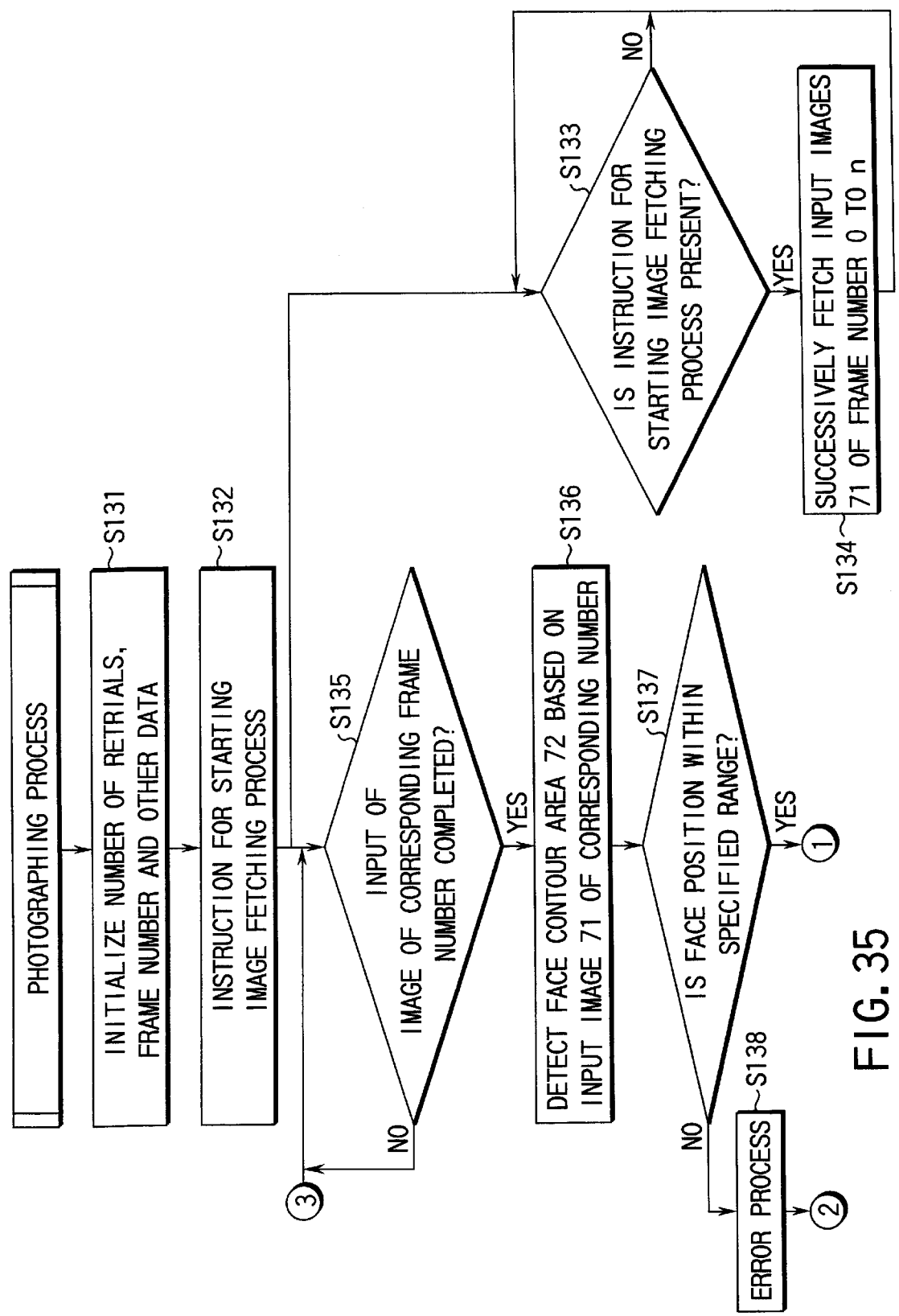
FIGS. 35 and 36 are flowcharts for illustrating the processing operation in the fifth embodiment.
Figure 36:
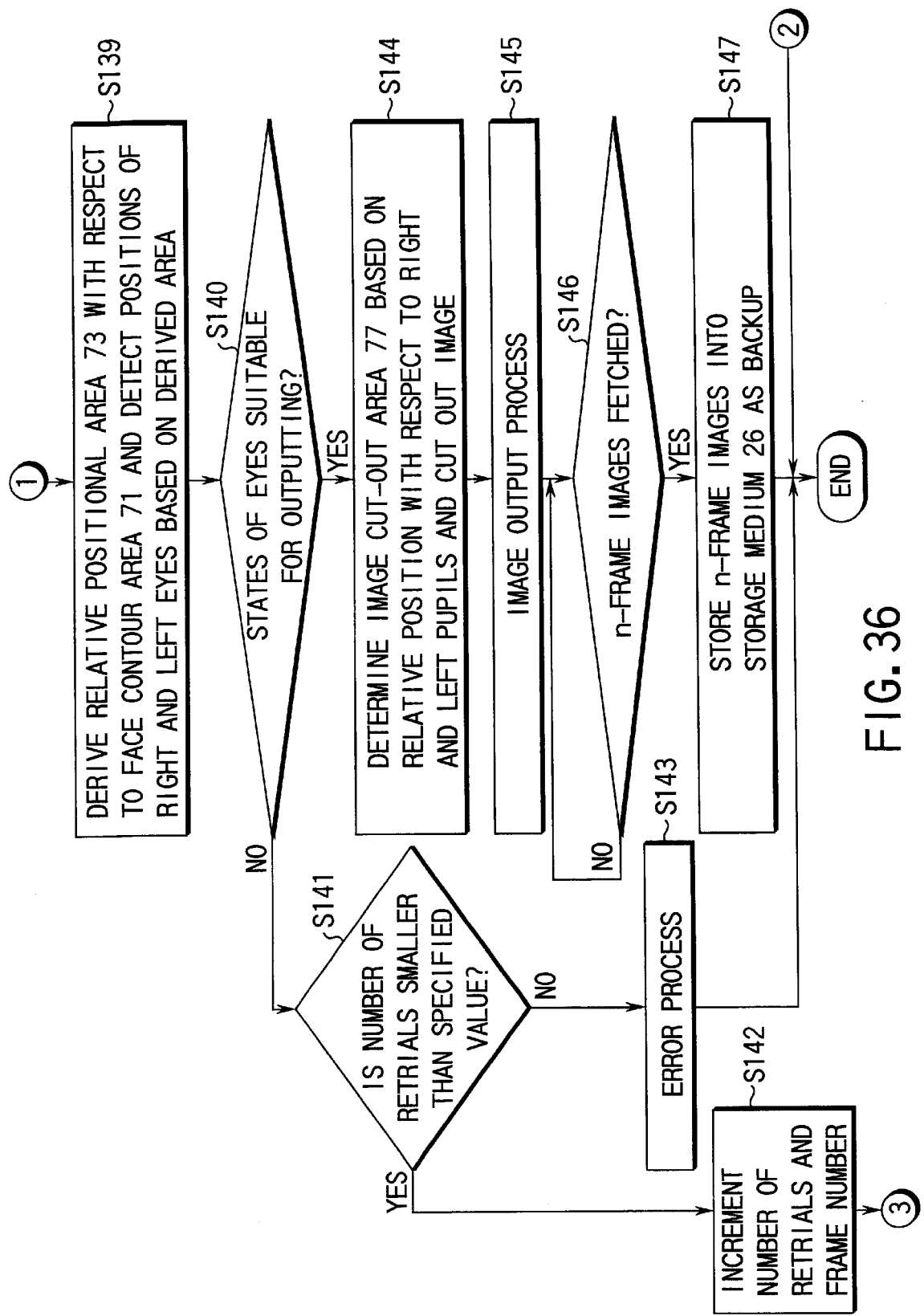

The processing operation of the present apparatus is explained with reference to FIG. 34 and the flowcharts of FIGS. 35 and 36. The process explained below is mainly effected under control of the CPU 23a of the CPU section 23.

A photographer (operator) 4 waits for a to-be-photographed person 1 to make preparation for photographing and then the photographing process of the present apparatus is started by depressing a photographing button 28a on a keyboard 28 when the to-be-photographed person 1 has made preparation for photographing.

If the photographing process is started, the number of retry processes, the frame number and other data items are initialized in the step S131 and then the step S132 is effected. In the step S132, a start instruction for the image fetching process is issued and the steps S133, S135 are effected. In the step S133, it is confirmed that the start instruction for the image fetching process is issued and the step S134 is effected.

In the step S134, input images (face images) 71 with the frame number "0" to "n" are successively fetched from the camera 3 via a video capture section 21 and temporarily stored as successive images (moving picture) of a plurality of frames into a main memory 23b used as a work memory in the CPU section 23. The image fetching process is effected while the image fetching process starting instruction is being issued. That is, issuance of the image fetching process starting instruction is interrupted when the images of the frame number "0" to "n" are fetched.

In the step S135, a standby state is maintained until fetching of an image of a corresponding frame number (for example, the frame number "0" which is initially set in the step S131) is completed in parallel to the process of the steps S133, S134 and when the image fetching process is completed, the step S136 is effected. In the step S136, a face contour position 72 containing the hair style is detected in the input image 71 of the frame number "0" stored in the main memory 23b of the CPU section 23 and the step S137 is effected.

In the step S137, whether or not the detected face contour position 72 is within a preset specified range is checked and if it is outside the specified range, the step S138 is effected to effect the error process and the state is returned to the initialized state.

If it is within the specified range, the step S139 is effected. In the step S139, an approximate positional area 73 of pupils (eyes) which lie in relative positions with respect to the face contour position 72 is specified, positional areas 74, 75 having the same round form as the pupils are extracted from the approximate positional area 73 and the step S140 is effected.

The area 73 is derived based on the average of areas in which both of the pupils exist without fail with respect to the face contour areas in face image data items of hundreds of people, for example.

In the step S140, whether or not the images (pupils) of the extracted positional areas 74, 75 of round form are suitable for printing and outputting is checked and if the images are not suitable for printing and outputting because of the blinked or closed eyes, the step S141 is effected.

In the step S141, whether or not the number of retry processes is smaller than a preset specified value is checked and if it is smaller than the specified value, the step S142 is effected. In the step S142, the number of retry processes and the frame number are incremented and the process returns to the step S135. That is, if the number of retry processes is smaller than the specified value, the process returns to the step S135 and the retry process is effected for an image with the next frame number "1".

If it is detected in the step S141 that the number of retry processes is larger than the specified value, the step S143 is effected to effect the error process and the state is returned to the initialized state.

If it is detected in the step S140 that the image contains no blinked or closed eyes and is suitable for printing and outputting, the step S144 is effected. In the step S144, a central position (coordinate) 76 between the positional areas 74 and 75 is derived based on the positional areas 75, 76 of the pupils extracted in the step S139, an image cut-out area 77 is determined based on the relative position with respect to the central position 76, an image in the image cut-out area 77 is cut out from the input image and the step S145 is effected.

The area 77 is derived based on the average of image cut-out areas with respect to the central positions of the right and left pupil portions in face image data items of hundreds of people, for example.

In the step S145, the image cut out in the step S144 is processed according to the purpose of application together with other personal information of the to-be-photographed person 1. For example, the image is printed and output on a recording medium (such as paper, card) by use of a printing section (not shown) connected to a network 32 via a LAN card 33, or output to a storage device such as an image filing device (not shown) connected to the network 32 or stored into a large-capacity storage device 25 such as an HDD, portable storage medium 26 or the main memory 23b in the CPU section 23 and then the step S146 is effected. In the step S146, the standby state is maintained until the image fetching process of the frame number "n" is terminated and then the step S147 is effected when the image fetching process is terminated.

In the step S147, the successive images of n frames temporarily stored in the main memory 23b of the CPU section 23 are stored as backup images into the large-capacity storage medium 25 and the process is terminated.

Figure 37:
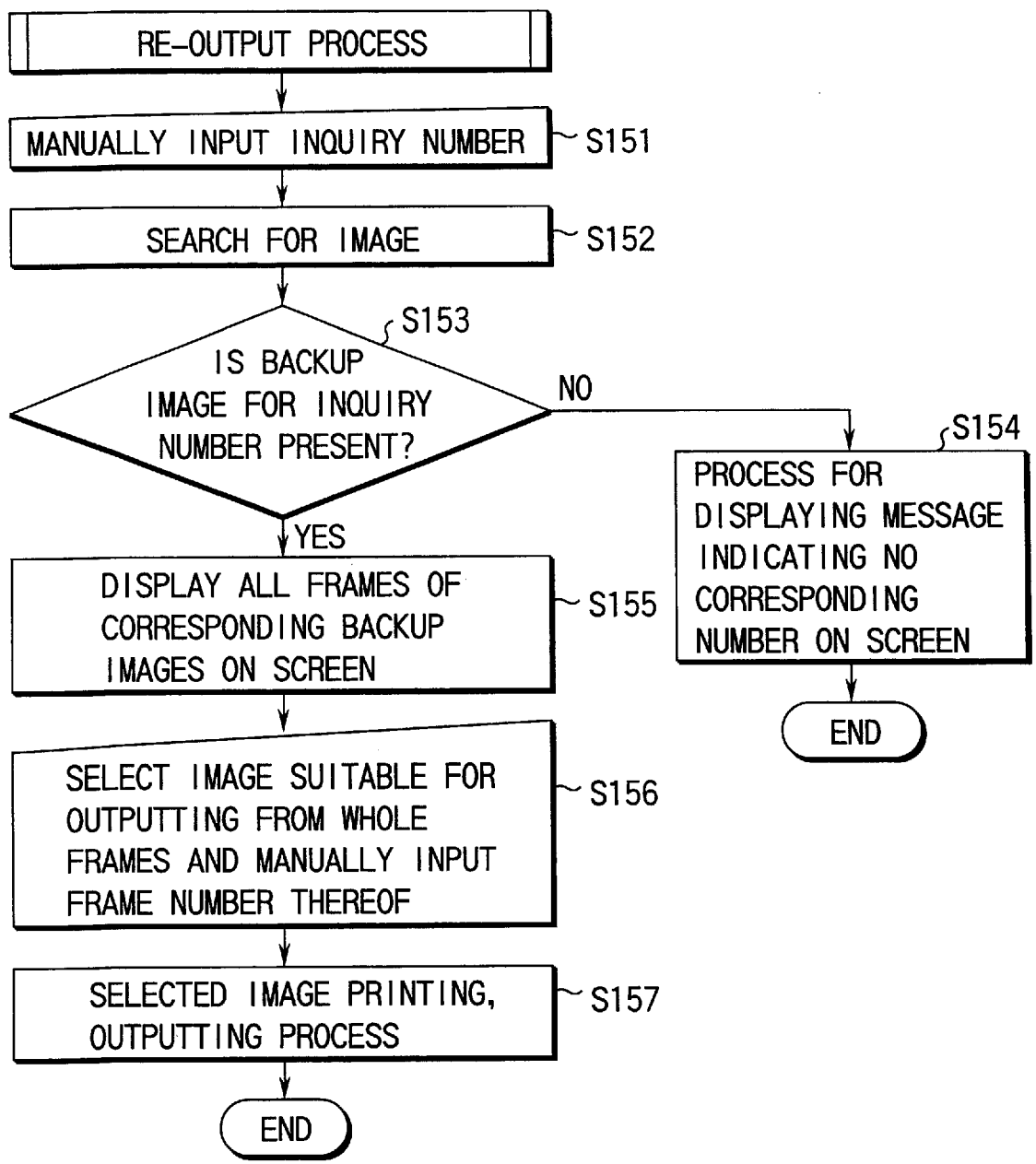
FIG. 37 is a flowchart for illustrating a re-output process in the fifth embodiment.

As the result of printing and outputting in the step S145, if the photographer 4 determines that the image is not adequate as a certificate photograph because the to-be-photographed person 1 opens the mouth or looks the other way or the erroneous determination is made in the process of the steps S139, S140, the photographer selects an adequate one of the successive images of n frames backed up and outputs the selected image. The process is explained in detail below with reference to the flowchart of FIG. 37.

First, in the step S151, the photographer 4 inputs an inquiry number of re-output objects registered at the time of photographing via a keyboard 28 to effect the step S152 and search for backup images corresponding to the inquiry number in the large-capacity storage medium 25. By the searching process, if it is detected that no corresponding images are present (S153), the step S154 is effected to display a message indicating that the image corresponding to the inquiry number is not present on the display 5 and the process is terminated.

By the above searching process, if it is detected that corresponding images are present (S153), the step S155 is effected to read out all of the corresponding backup images and display them on the display 5 and then the step S156 is effected. In the step S156, the photographic selects an image suitable for a certificate photograph from the images of all of the frames displayed on the display 5, then the frame number thereof is input via the keyboard 28 and the step S157 is effected.

In the step S157, an image corresponding to the frame number input via the keyboard 28 is searched for in and read out from the large-capacity storage medium 25, the thus readout image is subjected to the same process as the step S15 and printed and output and then the re-output process is terminated.

With the conventional face image photographing apparatus, the photographer examines the image to determine whether it is a desirable one or not. If the image is found to be an undesirable one because, for example, it shows the person blinking, the photographer has to repeat the photographing process.

If the photographing cycle is as short as few seconds, however, it would be difficult for the photographer to examine the image within such a short time. He or she may likely make an error in examining the image.

If the photographer makes such an error and prints out a photograph showing the person blinking, he or she needs to call the person, who has already gone, back to the photographing room, so as to take a picture of the person again. This results in wasting of time and material (photographic paper, etc.).

The fifth embodiment of this invention, described above, is free of the problems inherent in the conventional face image photographing apparatus. The fifth embodiment determines whether or not the image is an undesirable one because, for example, the person blinked when photographed. It automatically discards any image found to be undesirable and, therefore, always outputs good images.

The re-output process program is explained on the assumption that it is provided in the present apparatus, but it is possible to provide the same in a terminal device exclusively used for the re-output process and connected to the network 32 via the network adapter 33 and the present apparatus.

Further, the successive images of n frames stored or backed up in the large-capacity storage medium 25 are erased when information of completion of issuance is acquired from a certificate photograph issuing management system separately installed on the network, for example.

Sixth Embodiment

Next, a case wherein a face image is extracted by clicking the position of the glabella set as a reference position in photographed image data is explained as a sixth embodiment.

Figure 38:
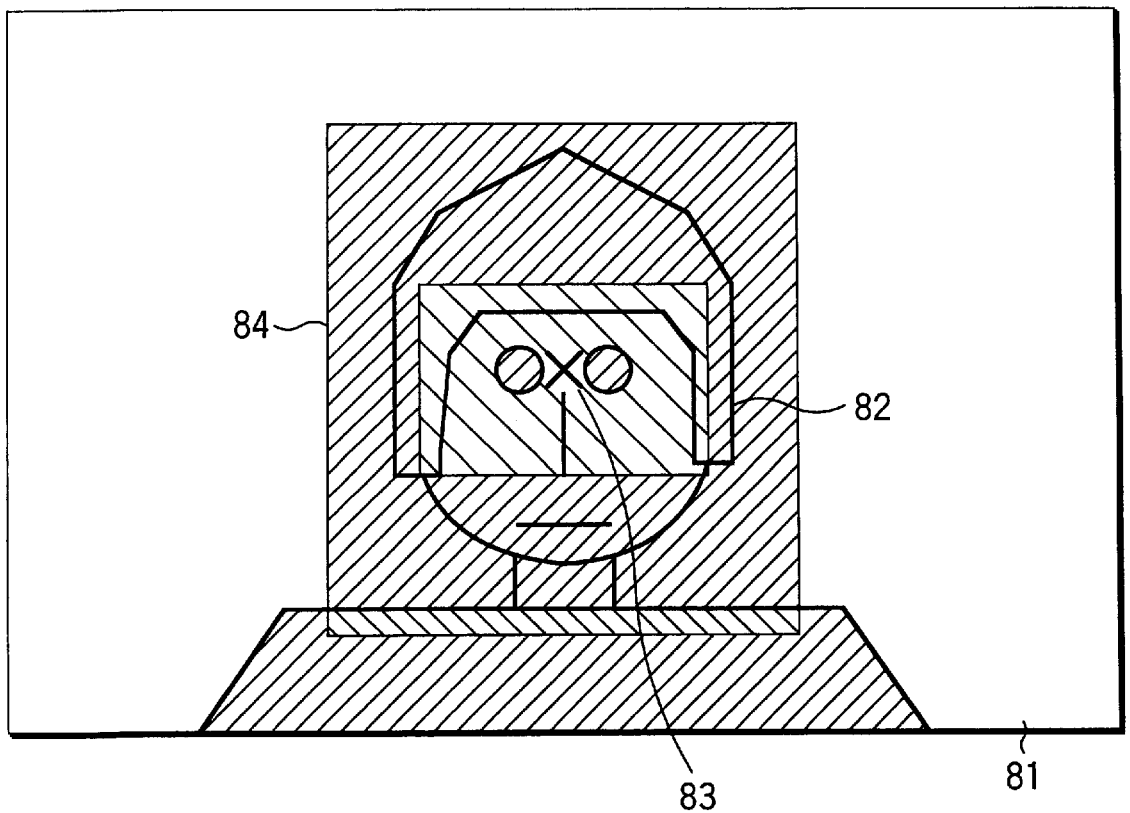
FIG. 38 is a view showing a state in which an input image from a camera in a sixth embodiment and areas in which pupils will exist while the coordinate of the glabella set as the center of the face in the input image is set as a reference are extracted and an image area of the output photograph size is extracted.

FIG. 38 shows a state in which an input image (face image) 81 from a camera 3 and an area 82 in which pupils will exist while the coordinate of the glabella 83 set as the center of the face in the input image 81 is set as a reference are extracted and an image area 84 of the output photograph size is extracted.

Figure 39:
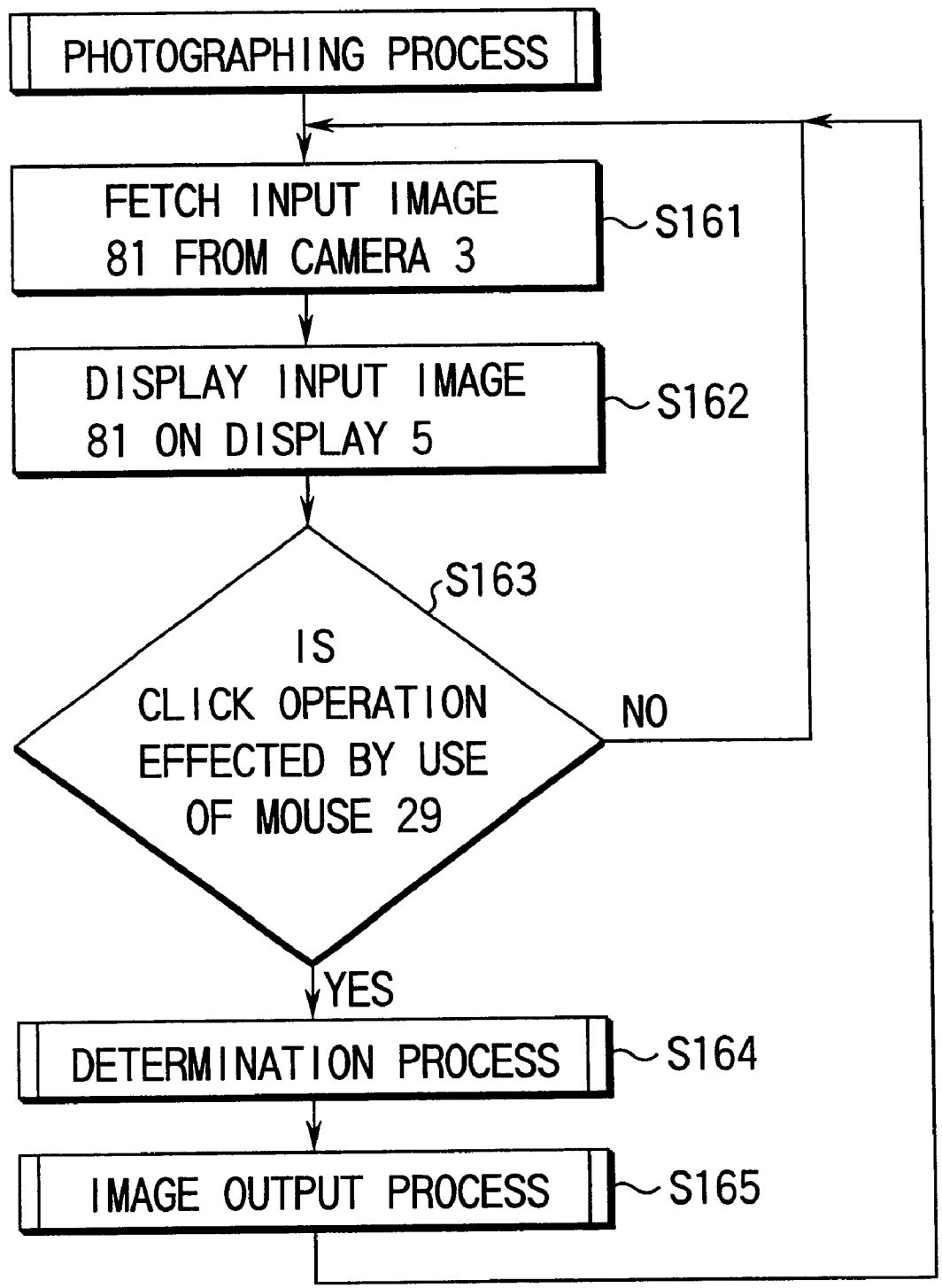
FIG. 39 is a flowchart for illustrating the processing operation in the sixth embodiment.
Figure 40:
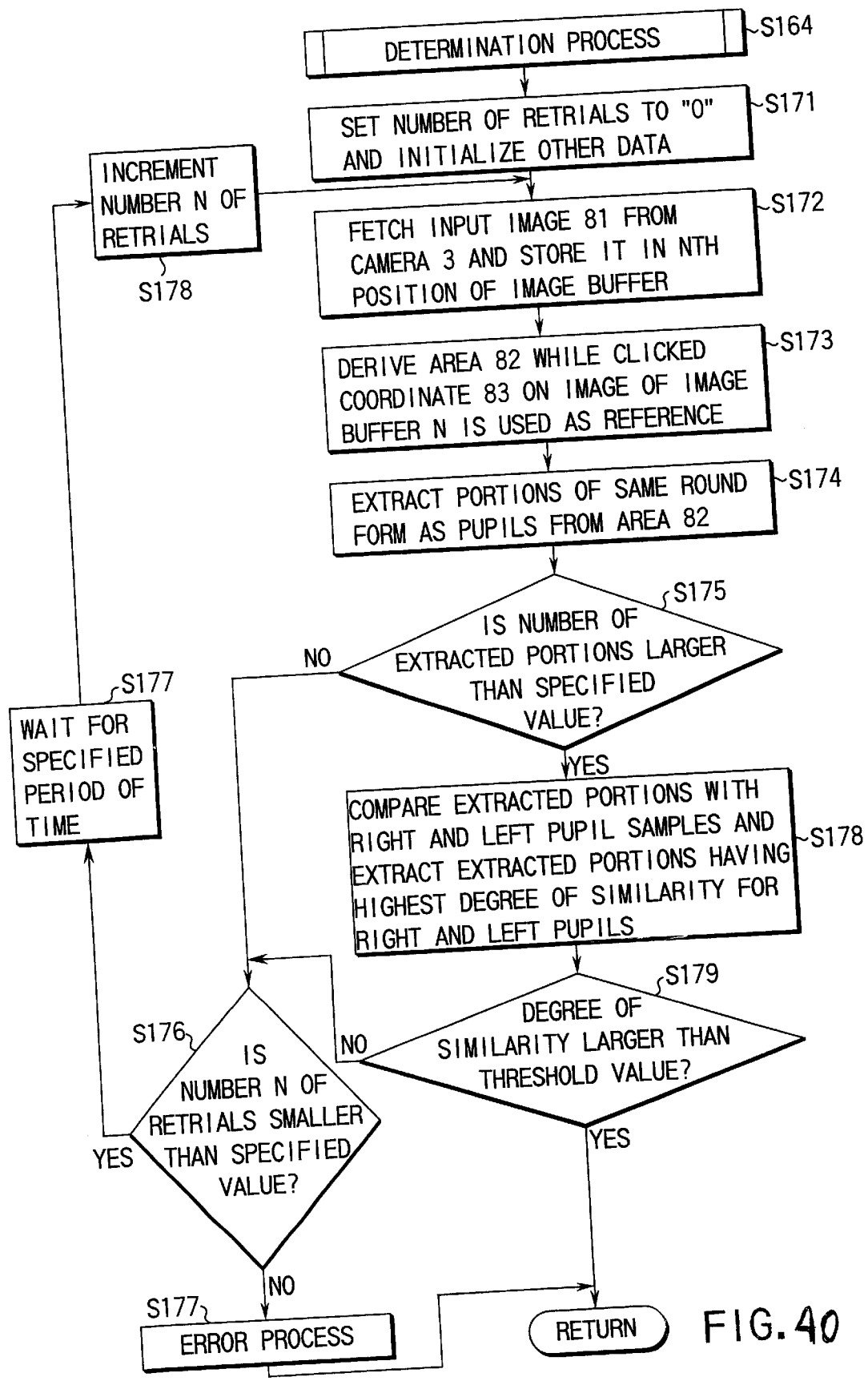
FIG. 40 is a flowchart for illustrating a determination process in the sixth embodiment.

The processing operation of the present apparatus is explained with reference to FIG. 38 and the flowcharts of FIGS. 39, 40 and 41. The process explained below is mainly effected by the CPU 23a of the CPU section 23.

In this embodiment, a process for photographing by clicking the glabella portion in the face of the displayed image instead of using the photographing button 28a is explained.

First, in the step S161, an input image (face image) 81 is fetched from a camera 3 via a video capture section 21 and the step S162 is effected.

In the step S162, the input image 81 is displayed on a display 5 via a video accelerator section 122 and the step S163 is effected. In the step S163, whether or not a click operation is effected by use of a mouse 29 is checked, and if it is determined that no click operation is effected, the process returns to the process S161. That is, if the click operation is not effected, the input image is displayed on the display 5 in a state similar to the display state of a moving picture.

Figure 41:
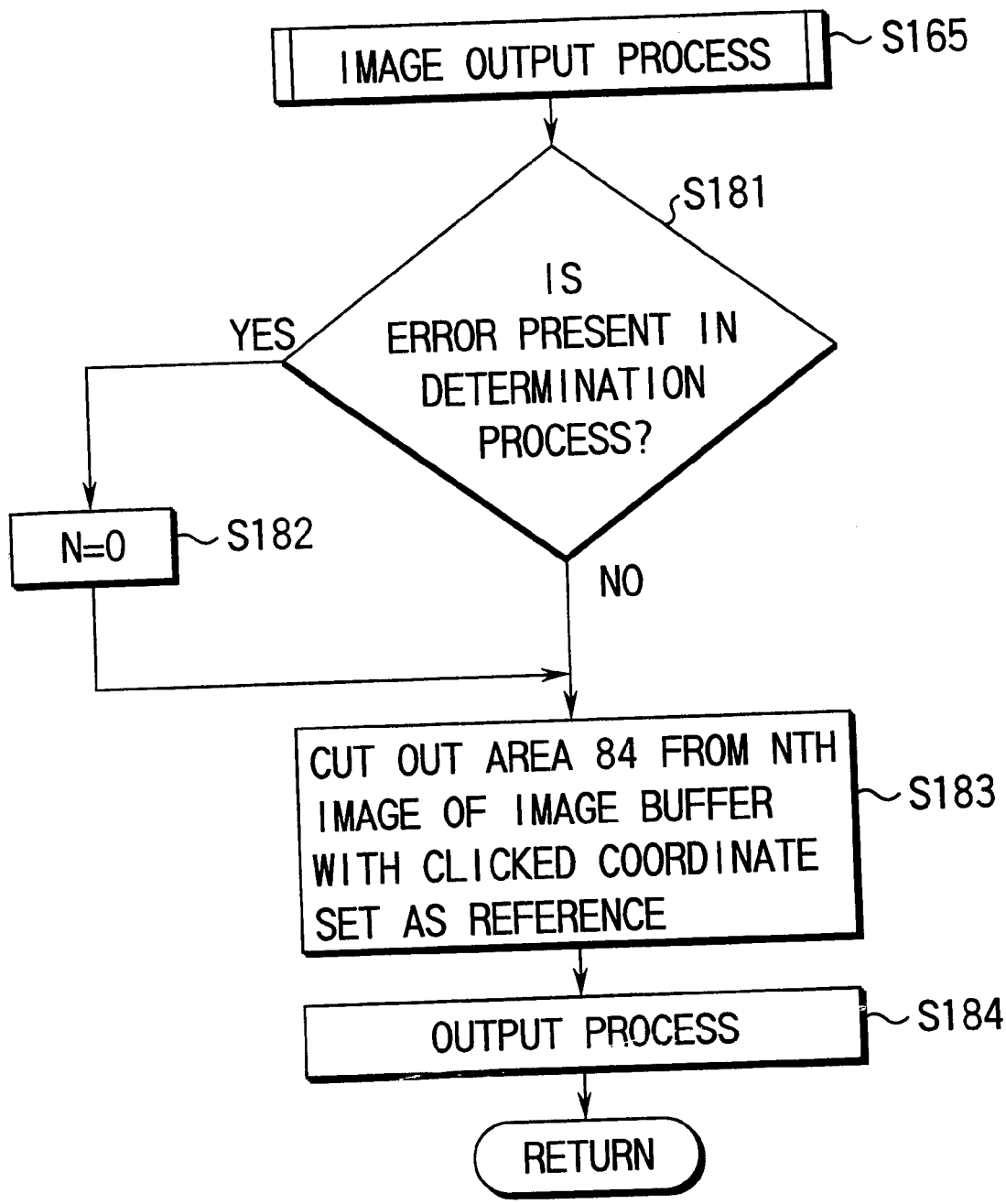
FIG. 41 is a flowchart for illustrating an image output process in the sixth embodiment.

If it is determined in the step S163 that the click operation is effected, a determination process (S164) which will be explained with reference to FIG. 40 and an image outputting process (S165) which will be explained with reference to FIG. 41 are effected and then the process returns to the process S161.

The step S164 is a process for determining whether or not the image contains a closed-eye image when the click operation is effected by use of the mouse 29 and is explained below with reference to FIG. 40.

First, in the step S171, the number of retry processes and other data items are initialized and the step S172 is effected. In the step S172, the input image 81 fetched from the camera 3 is temporarily stored into a main memory 23b of a CPU section 23 (in a position of a buffer number corresponding to the number of retry processes) and then the step S173 is effected.

In the step S173, an area 82 in which the pupils will exist is derived while a coordinate 83 of the glabella which is clicked on the image in the Nth image buffer by use of the mouse 29 is used as a reference and then the step S174 is effected. The approximate positional area 82 of the pupils (eyes) which lie in relative positions with respect to the coordinate 83 of the position of the glabella is derived based on the coordinate 83 of the glabella. In the step S174, positional areas (84, 85) having the same round form as the pupils are extracted from the area 82 and the step S175 is effected.

The area 82 is derived based on the average of areas in which the pupils exist without fail with respect to the coordinate of the position of the glabella in face image data items of hundreds of people, for example.

In the step S175, whether or not the number of extracted positional areas of round form is equal to or larger than a preset specified value (two) is checked, and if it is smaller than the specified value, it is determined that the pupils are not normally opened (the to-be-photographed person 1 blinked or closed her eyes when she was photographed) and the step S176 is effected.

In the step S176, whether or not the number of retry processes is smaller than a preset specified value is checked, and if it is smaller than the specified value, the step S177 is effected. In the step S177, a standby state is maintained for a preset specified period of time (approx. 0.1 second) and then the step S178 is effected.

In the step S178, the number of retry processes is incremented and the process returns to the step S172. That is, if the number of retry processes is smaller than the specified number of times, the standby state is maintained for the specified period of time (approx. 0.1 second) and then the step S172 is effected again to input a face image as the retry process.

Thus, if the to-be-photographed person 1 blinks or closes her eyes when she is photographed, this state is determined in the process of the step S175 and the CPU waits for her to open her eyes while effecting the retry process.

If the to-be-photographed person does not normally open her eyes, for example, if she opens her eyes but looks aside or does not directly look at the camera, this state is determined in the step S177 and the CPU waits for her to normally open her eyes. Further, the process of the step S177 is effected as a correction process for erroneous determination made in the process of the step S175.

In addition, the process of the step S177 is effected for unusually opened pupils (surprisingly big round eyes) which cannot be determined in the process of the step S175 to effect the retry process.

If it is detected in the step S176 that the number of retry processes is larger than the specified value, the step S177 is effected to effect the error process and the state is returned to the initialized state.

If it is detected in the step S175 that the number of extracted portions is equal to or larger than the specified value, it is determined that the pupils are normally opened and the step S178 is effected. In the step S178, the forms of the peripheral portions of the positional areas 84, 85 are compared with sample data of pupils previously stored in the Nth image buffer of the main memory 23b of the CPU section 23 and the extracted portions having the highest degree of similarity are extracted for the right and left pupils and then the step S179 is effected.

In the step S179, whether or not the degree of similarity of the extracted portion detected to have the highest degree of similarity in the step S178 is larger than a preset threshold value is checked, and if it is smaller than the threshold value, the step S176 is effected to effect the retry process which is the same as described before. As the result of the above checking process, if it is detected to be larger than the threshold value, it is determined that the pupils are normally opened and the image outputting process of the step S165 is effected.

In this case, since two pupils exist, the sample data items are prepared for right and left pupils, the above determination process is effected by comparing the extracted portions with the sample data items of the right and left pupils to recognize the states of the right and left pupils.

Next, the image outputting process of the step S165 effected after the above determination process is explained with reference to FIG. 41.

First, in the step S181, whether or not an error is present in the result of the determination process effected in an immediately preceding cycle is determined. If it is detected that an error is present in the result of the determination process, the buffer number is set to "0", that is, the image buffer in which an image closest to the timing of clicking for photographing is recorded is selected (step S182) and the step S183 is effected.

Further, if it is detected in the step S181 that no error is present in the result of the determination process effected in an immediately preceding cycle, the image buffer of the buffer number now registered is selected and the step S183 is effected.

In the step S183, an image area 84 of output size is cut out from an image of the image buffer selected in the step S181 or S182 with the clicked coordinate set as a reference and the step S184 is effected.

In the step S184, the cut-out image is subjected to the compression process if necessary, stored into a large-capacity storage medium 25 or portable storage medium 26, or output to a printer (not shown) or filing device (not shown) on a network 32 via a network adapter 33.

In the above embodiment, the mouse is used as a pointing device, but a method using a touch panel for directly clicking the screen may be used.

With the conventional face image photographing apparatus, the photographing button is depressed, an image covering a large area and including the image of the face is input, the data representing the image is stored into a storage medium, the image is trimmed to remove parts around the face, and the image thus trimmed is output. This sequence of processes is long and complex. Inevitably, it takes much time to output the image after the photographing button is pushed.

By contrast, with the sixth embodiment of the invention it is unnecessary to the complicated process of trimming the photographed image. From the image displayed on a screen it is determined whether or not the image is a desirable one or not. The sixth embodiment automatically discards any image found to be undesirable and, thus, always outputs good images.

Seventh Embodiment

A case wherein photographed image data is monitored and displayed and when an instruction for fetching the image is issued based on the monitored and displayed image, the image monitored and displayed immediately before issuance of the instruction is selected is explained as a seventh embodiment.

Figure 42:
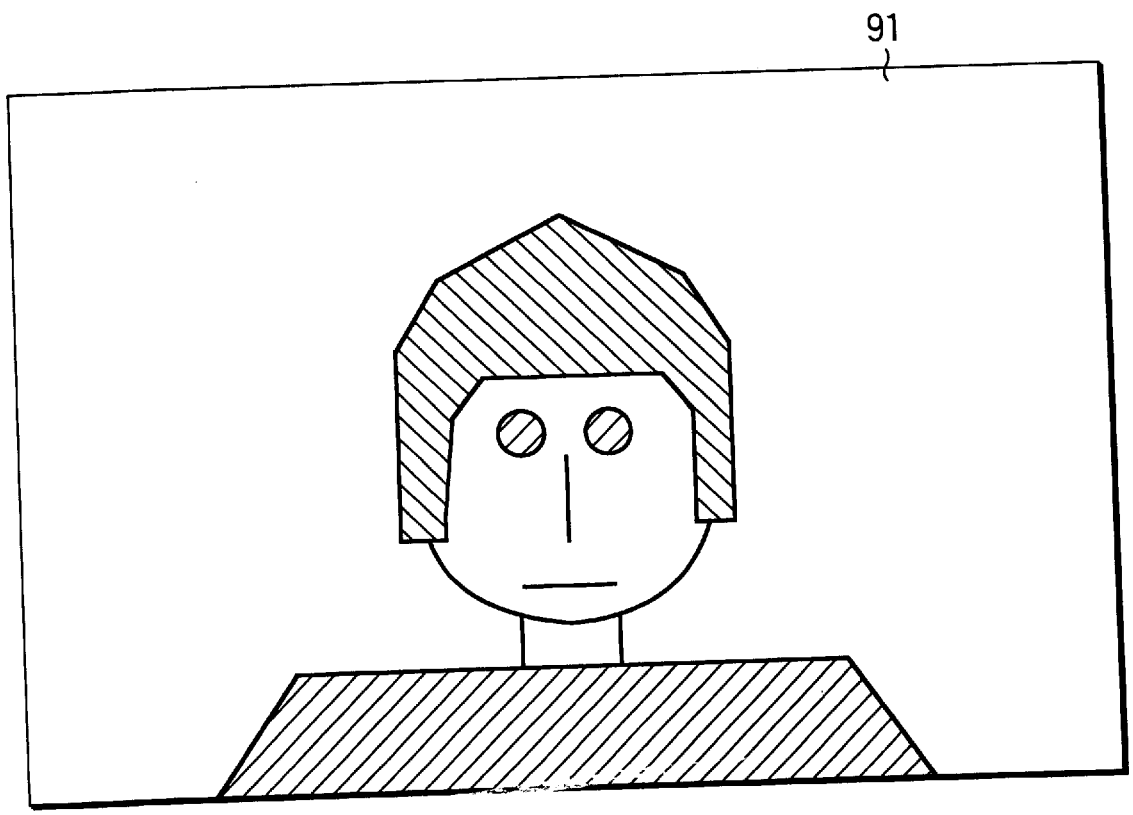
FIG. 42 is a view showing an input image from a camera in a seventh embodiment.

FIG. 42 shows an input image (face image) 91 from a camera 3.

Figure 43:
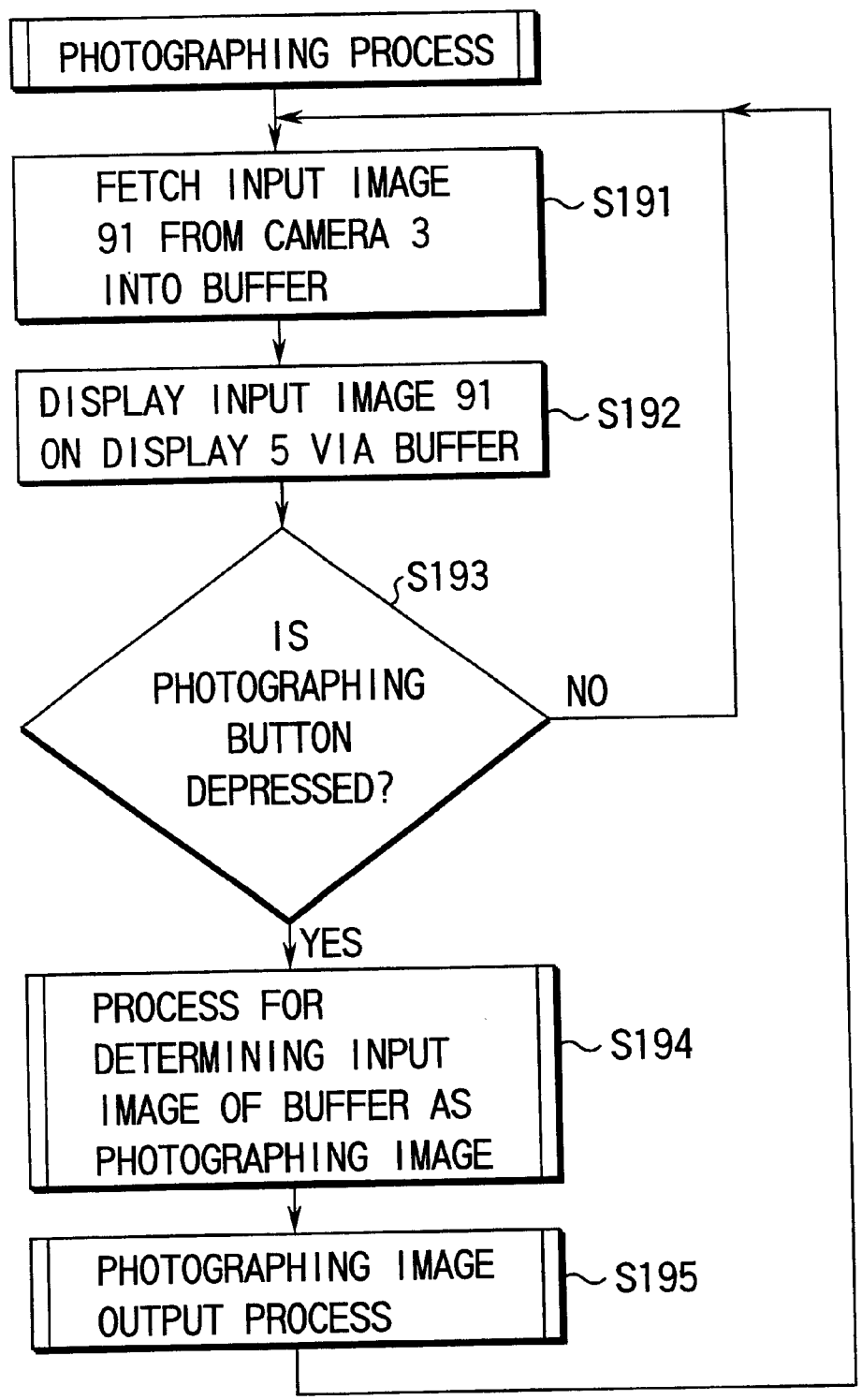
FIG. 43 is a flowchart for illustrating the processing operation in the seventh embodiment.

The processing operation of the present apparatus will be explained with reference to FIG. 42 and the flowchart of FIG. 43. The process explained below is mainly effected by the CPU 23a of the CPU section 23.

In this embodiment, a process for outputting a monitored image immediately before depression of a photographing button 28a in response to the depression of the photographing button 28a is explained.

First, in the step S191, the input image (face image) 91 is fetched from the camera 3 via a video capture section 21, the input image 91 is supplied to and stored in a buffer section of the main memory 23b of the CPU section 23 via a video accelerator 22 and the step S192 is effected. In the step S192, the input image 91 is displayed on a display 5 and the step S193 is effected. In the step S193, whether or not the photographing button 28a of the keyboard 28 is depressed is checked, and if it is determined that the photographing button 28a is not depressed, the process returns to the process S191. That is, if the photographing button 28a is not depressed, the input image is displayed on the display 5 in a state similar to the display state of a moving picture. In this case, images obtained before the present photographing image are recorded in the buffer section of the main memory 23a.

If it is determined in the step S193 that the photographing button 28a is depressed, an image stored in the buffer section and displayed on the display 5 when the photographing button 28a is depressed is determined as a photographing image (step S194). The image determined as the photographing image is stored into a large-capacity storage medium 25 or portable storage medium 26, or output to a printer (not shown) or filing device (not shown) on a network 32 via a network adapter 33 (step S195).

With the conventional face image photographing apparatus, the photographer sees the image being monitored and pushes the photographing button if he or she determines that the image is a desirable one. The image input at the very time the photographing button is pushed is output as a photograph. Since it takes some time until the button is fully depressed to input the image, the image input is inevitably different from the image that the photographer has found a desirable one. Hence, the image input may not be a desirable one. If this is the case, the photographer needs to repeat the photographing process.

The seventh embodiment of the invention described above is free of the problem inherent to the conventional face image photographing apparatus. This is because, when an instruction for fetching an image is generated, the image displayed immediately before the generating of the instruction is selected and output. Hence, the seventh embodiment always outputs good images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A face image photographing method comprising the steps of:

photographing at least a face image of a to-be-photographed person;

detecting the position of pupils based on the photographed face image;

recognizing the state of the pupils based on the detected pupil position to determine whether the pupils are normally opened; and causing the face image photographing process, the pupil position detecting process and the determination process whether the pupils are normally opened to be effected again when it is determined in said determining step that at least one of the pupils is not normally opened.

2. A face image photographing apparatus comprising:

photographing means for photographing at least a face image of a to-be-photographed person;

detecting means for detecting the position of pupils based on the face image photographed by said photographing means;

determining means for recognizing the state of the pupils based on the pupil position detected by said detecting means to determine whether the pupils are normally opened; and retry control means for causing the face image photographing process by said photographing means, the pupil position detecting process by said detecting means and the process by said determining means for determining whether the pupils are normally opened to be effected again when it is determined by said determining means that at least one of the pupils is not normally opened.

3. A face image photographing method comprising the steps of:

photographing at least a face image of a to-be-photographed person;

detecting the position of pupils based on the photographed face image;

recognizing the state of the pupils based on the detected pupil position to determine whether the pupils are normally opened;

outputting the photographed face image as a photographing image or as a printed image, or to an image storage medium, when it is determined in said determining step that the pupils are normally opened; and causing the face image photographing process, the pupil position detecting process and the process for determining whether the pupil is normally opened to be effected again when it is determined in said determining step that at least one of the pupils is not normally opened.

4. A face image photographing apparatus comprising:

photographing means for photographing at least a face image of a to-be-photographed person;

detecting means for detecting the position of pupils based on the face image photographed by said photographing means;

determining means for recognizing the state of the pupils based on the pupil position detected by said detecting means to determine whether the pupils are normally opened;

image output means for outputting the face image photographed by said photographing means as a photographing image or as a printed image, when it is determined by said determining means that the pupils are normally opened; and retry control means for causing the face image photographing process by said photographing means, the pupil position detecting process by said detecting means and the process by said determining means for determining whether the pupil is normally opened to be effected again when it is determined by said determining means that at least one of the pupils is not normally opened.

5. The face image photographing apparatus according to claim 2 or 4, wherein said detecting means detects the face contour position based on the face image photographed by said photographing means, derives an approximate positional area of the pupils which lies in a relative position with respect to the detected face contour position based on the detected face contour position and extracts positions of the pupils based on the derived approximate positional area of the pupils.

6. The face image photographing apparatus according to claim 2 or 4, wherein said determining means determines whether the number of pupil positions detected by said detecting means is larger than a preset specified value, compares shapes of peripheral portions of the detected pupil positions with preset pupil sample data if it is determined that the number of detected pupil positions is larger than the specified value, determines whether the degree of similarity of one of the detected pupil positions which has the highest degree of similarity is larger than a preset threshold value, determines that the pupils are normally opened if the highest degree of similarity is larger than the preset threshold value, and determines that at least one of the pupils is not normally opened in one of a case wherein the highest degree of similarity is not larger than the preset threshold value and a case wherein the number of detected pupil positions is detected to be not larger than the specified value.

7. The face image photographing apparatus according to claim 2 or 4, wherein said retry control means effects the retry process after waiting for a preset specified period of time when said determining means determines that at least one of the pupils is not normally opened.

8. A face image photographing apparatus comprising:

photographing means for photographing at least a face image of a to-be-photographed person;

detecting means for detecting the position of pupils based on the face image photographed by said photographing means;

determining means for recognizing the state of the pupils based on the pupil position detected by said detecting means to determine whether the pupils are normally opened;

image storing means for storing the face image photographed by said photographing means when it is determined by said determining means that the pupils are normally opened; and retry control means for causing the face image photographing process by said photographing means, the pupil position detecting process by said detecting means and the process by said determining means for determining whether the pupils are normally opened to be effected again when it is determined by said determining means that at least one of the pupils is not normally opened.

* * * * *